US010945096B2

(12) United States Patent
Li et al.

(10) Patent No.: US 10,945,096 B2
(45) Date of Patent: Mar. 9, 2021

(54) MOBILITY GENE FOR VISIT DATA

(71) Applicant: Dataspark Pte Ltd, Singapore (SG)

(72) Inventors: Ying Li, Singapore (SG); The Anh Dang, Singapore (SG)

(73) Assignee: DataSpark, Pte. Ltd., Singapore (SG)

(*) Notice: Subject to any disclaimer, the term of this patent is extended or adjusted under 35 U.S.C. 154(b) by 0 days.

(21) Appl. No.: 16/470,233

(22) PCT Filed: Feb. 17, 2017

(86) PCT No.: PCT/IB2017/050892
§ 371 (c)(1),
(2) Date: Jun. 16, 2019

(87) PCT Pub. No.: WO2018/150228
PCT Pub. Date: Aug. 23, 2018

(65) Prior Publication Data
US 2020/0112835 A1    Apr. 9, 2020

(51) Int. Cl.
*H04W 4/029* (2018.01)
*H04W 72/04* (2009.01)
(Continued)

(52) U.S. Cl.
CPC ......... *H04W 4/029* (2018.02); *H04W 72/042* (2013.01); *H04W 72/10* (2013.01); *H04W 72/1231* (2013.01); *H04W 72/1278* (2013.01)

(58) Field of Classification Search
CPC ............. H04W 4/029; H04W 72/1231; H04W 72/1278; H04W 72/042; H04W 72/10
See application file for complete search history.

(56) References Cited

U.S. PATENT DOCUMENTS 6,744,383 B1   6/2004  Alfred et al.
6,882,930 B2   4/2005  Trayford et al.
(Continued)

FOREIGN PATENT DOCUMENTS

CN        10196962 A    10/2010
CN        104159189 A    5/2013
(Continued)

OTHER PUBLICATIONS

Bonchi F, et al., Trajectory Anonymity in Publishing Personal Mobility Data, ACM SIGKDD Explorations Newsletter, Aug. 31, 2011, vol. 13, No. 1, pp. 30-42.
(Continued)

*Primary Examiner* — Marisol Figueroa
(74) *Attorney, Agent, or Firm* — Krajec Patent Offices, LLC; Russell Krajec

(57) ABSTRACT

Mobility observations may be analyzed to create so-called mobility genes, which may be intermediate data forms from which various analyses may be performed. The mobility genes may include a trajectory gene, which may describe a trajectory through which a user may have travelled. The trajectory gene may be analyzed from raw location observations and processed into a form that may be more easily managed. The trajectory genes may be made available to third parties for analysis, and may represent a large number of location observations that may have been condensed, smoothed, and anonymized. By analyzing only trajectories, a third party may forego having to analyze huge numbers of individual observations, and may have valuable data from which to make decisions.

20 Claims, 33 Drawing Sheets

(51) Int. Cl.
*H04W 72/10* (2009.01)
*H04W 72/12* (2009.01)

(56) References Cited

U.S. PATENT DOCUMENTS

| | | |
|---|---|---|
| 7,161,497 B2 | 1/2007 | Gueziec |
| 7,221,287 B2 | 5/2007 | Gueziec et al. |
| 7,765,176 B2 | 7/2010 | Simmons et al. |
| 8,046,319 B2 | 10/2011 | Satir et al. |
| 8,214,883 B2 | 7/2012 | Obasanjo et al. |
| 8,331,936 B2 | 12/2012 | Alonso-Rubio et al. |
| 8,386,495 B1 | 2/2013 | Sandler et al. |
| 8,423,494 B2 | 4/2013 | Barrett et al. |
| 8,446,842 B2 | 5/2013 | Cao et al. |
| 8,478,512 B2 | 7/2013 | Nortrup |
| 8,583,659 B1 | 11/2013 | Alexandrescu et al. |
| 8,639,756 B2 | 1/2014 | Boström et al. |
| 8,666,643 B2 | 3/2014 | McBride et al. |
| 8,693,458 B2 | 4/2014 | Smartt et al. |
| 8,725,796 B2 | 5/2014 | Serena |
| 8,731,835 B2 | 5/2014 | Chidlovskii et al. |
| 8,739,016 B1 | 5/2014 | Goldman et al. |
| 8,799,461 B2 | 8/2014 | Herz et al. |
| 8,805,605 B2 | 8/2014 | Cooper et al. |
| 8,819,009 B2 | 8/2014 | Wana et al. |
| 8,825,350 B1 | 9/2014 | Robinson |
| 8,849,823 B2 | 9/2014 | Gotz et al. |
| 8,868,340 B1 | 10/2014 | Rinckes et al. |
| 8,938,500 B1 | 1/2015 | Acharya |
| 9,008,933 B2 | 4/2015 | Cooper et al. |
| 9,141,656 B1 | 9/2015 | Lopyrev et al. |
| 9,165,304 B2 | 10/2015 | Weiss et al. |
| 9,195,722 B1 | 11/2015 | Liu et al. |
| 9,196,157 B2 | 11/2015 | Hardin et al. |
| 9,494,694 B1 | 11/2016 | Dong et al. |
| 9,589,303 B2 | 3/2017 | Belov et al. |
| 9,754,485 B2 | 9/2017 | Holleczek et al. |
| 2004/0030670 A1 | 2/2004 | Barton |
| 2004/0058678 A1 | 3/2004 | deTorbal |
| 2005/0114383 A1 | 5/2005 | Beringer et al. |
| 2006/0074545 A1 | 4/2006 | Kim |
| 2006/0240841 A1 | 10/2006 | Bhattacharya |
| 2007/0088490 A1 | 4/2007 | Sutardja |
| 2007/0208497 A1 | 9/2007 | Downs et al. |
| 2008/0004789 A1 | 1/2008 | Horvitz et al. |
| 2008/0014904 A1 | 1/2008 | Crimi et al. |
| 2008/0188242 A1 | 8/2008 | Carlson et al. |
| 2009/0005002 A1 | 1/2009 | Agarwal |
| 2009/0203352 A1 | 8/2009 | Fordon et al. |
| 2009/0216704 A1 | 8/2009 | Zheng et al. |
| 2010/0007552 A1 | 1/2010 | Oda et al. |
| 2010/0120449 A1 | 5/2010 | Jakorinne et al. |
| 2011/0099046 A1 | 4/2011 | Weiss et al. |
| 2011/0099047 A1 | 4/2011 | Weiss et al. |
| 2011/0099048 A1 | 4/2011 | Weiss et al. |
| 2011/0145262 A1 | 6/2011 | Jamjoom et al. |
| 2011/0176523 A1 | 7/2011 | Huang et al. |
| 2011/0310733 A1 | 12/2011 | Tzamaloukas et al. |
| 2012/0096002 A1 | 4/2012 | Sheehan et al. |
| 2012/0215438 A1* | 8/2012 | Liu ................. G01S 19/09 |
| | | 701/409 |
| 2012/0221231 A1 | 8/2012 | Nagata et al. |
| 2012/0226522 A1 | 9/2012 | Weiss et al. |
| 2012/0245881 A1 | 9/2012 | Takaoka |
| 2012/0266081 A1 | 10/2012 | Kao |
| 2012/0296885 A1 | 11/2012 | Gontmakher et al. |
| 2013/0059607 A1 | 3/2013 | Herz et al. |
| 2013/0066548 A1 | 3/2013 | Gruen et al. |
| 2013/0073473 A1 | 3/2013 | Heath |
| 2013/0085659 A1 | 4/2013 | Bekaert |
| 2013/0103290 A1 | 4/2013 | Hardin et al. |
| 2013/0143521 A1 | 6/2013 | Hernandez et al. |
| 2013/0170484 A1 | 7/2013 | Kang et al. |
| 2013/0173633 A1 | 7/2013 | Piepgrass et al. |
| 2013/0185189 A1 | 7/2013 | Stewart |
| 2013/0191325 A1 | 7/2013 | Hatami-Hanza |
| 2013/0198188 A1 | 8/2013 | Huang et al. |
| 2013/0204525 A1 | 8/2013 | Pfeifle |
| 2013/0211706 A1 | 8/2013 | MacNaughtan et al. |
| 2013/0260791 A1 | 10/2013 | Malinovskiy et al. |
| 2014/0012498 A1 | 1/2014 | Gustafson |
| 2014/0058913 A1 | 2/2014 | Hinesley et al. |
| 2014/0088865 A1 | 3/2014 | Thies et al. |
| 2014/0108308 A1 | 4/2014 | Stout et al. |
| 2014/0122043 A1 | 5/2014 | Bellamy et al. |
| 2014/0149514 A1 | 5/2014 | Ryan et al. |
| 2014/0164390 A1* | 6/2014 | Hampapur ........... G06F 16/29 |
| | | 707/743 |
| 2014/0171104 A1 | 6/2014 | Murphy et al. |
| 2014/0189524 A1 | 7/2014 | Murarka et al. |
| 2014/0189530 A1 | 7/2014 | Anand et al. |
| 2014/0200805 A1 | 7/2014 | Modica et al. |
| 2014/0222321 A1 | 8/2014 | Petty et al. |
| 2014/0244149 A1 | 8/2014 | Relyea et al. |
| 2014/0244752 A1 | 8/2014 | Tseng |
| 2014/0278054 A1* | 9/2014 | Tidd ................... G01C 21/206 |
| | | 701/409 |
| 2014/0330548 A1 | 11/2014 | Appel et al. |
| 2014/0330819 A1 | 11/2014 | Raina et al. |
| 2015/0006247 A1 | 1/2015 | Batra et al. |
| 2015/0065159 A1 | 3/2015 | Alpert et al. |
| 2015/0148068 A1 | 5/2015 | Planas et al. |
| 2015/0172856 A1 | 6/2015 | Vanderwater et al. |
| 2015/0237596 A1* | 8/2015 | Carlsson ............ G06F 16/9535 |
| | | 455/456.1 |
| 2015/0278375 A1 | 10/2015 | Kim et al. |
| 2015/0285651 A1 | 10/2015 | Cerecke et al. |
| 2015/0285656 A1 | 10/2015 | Verheyen et al. |
| 2015/0350890 A1 | 12/2015 | Arunkumar et al. |
| 2015/0354973 A1 | 12/2015 | Wang et al. |
| 2015/0363508 A1* | 12/2015 | Nandan ............... G06F 16/29 |
| | | 707/743 |
| 2016/0021152 A1 | 1/2016 | Maguire et al. |
| 2016/0078365 A1 | 3/2016 | Baumard |
| 2016/0142378 A1* | 5/2016 | Sedayao ........... H04L 63/0421 |
| | | 726/26 |
| 2016/0327397 A1 | 11/2016 | Cordova et al. |
| 2016/0371973 A1 | 12/2016 | Holleczek et al. |
| 2017/0032291 A1* | 2/2017 | Liu ................. G06Q 10/047 |
| 2017/0039602 A1 | 2/2017 | Shi-Nash et al. |
| 2017/0064515 A1 | 3/2017 | Heikkila et al. |
| 2017/0171720 A1 | 6/2017 | Holleczek et al. |
| 2017/0195854 A1 | 7/2017 | Shi-Nash et al. |
| 2017/0212945 A1 | 7/2017 | Shankar et al. |
| 2017/0262653 A1 | 9/2017 | Dang et al. |
| 2017/0277767 A1 | 9/2017 | Dang et al. |
| 2017/0277907 A1 | 9/2017 | Dang et al. |

FOREIGN PATENT DOCUMENTS

| | | |
|---|---|---|
| CN | 102799897 B | 9/2014 |
| CN | 104751631 A | 7/2015 |
| CN | 104965913 A | 7/2015 |

OTHER PUBLICATIONS

Feng Z. & Zhu, Y., A Survey on Trajectory Data Mining: Techniques and Applications, IEEE Access, Apr. 13, 2016, vol. 4, pp. 2056-2067.
Giannotti, F., et al., Unveiling the Complexity of Human Mobility by Querying and Mining Massive Trajectory Data, The VLDB Journal, Jul. 30, 2011, vol. 20, No. 5, pp. 695-719.
Kim M. et al. Extracting a Mobility Model from Real User Traces, Proceedings of IEEE INFOCOM, Apr. 29, 2006, vol. 6, pp. 1-13.
Written Opinion of the International Search Authority, IPOS, Singapore, PCT/SG2018/050006.
Written Opinion of the International Search Authority, IPOS, Singapore, PCT/SG2018/050068.
Written Opinion of the International Search Authority, IPOS, Singapore, PCT/SG2018/050070.
Written Opinion of the International Searching Authority, PCT/SG2017/050484, dated Nov. 24, 2017.

(56) References Cited

OTHER PUBLICATIONS

Written Opinion of the International Searching Authority, PCT/SG2017/050485, dated Nov. 24, 2017.
Written Opinion of the International Searching Authority, PCT/SG2018/050006, dated Mar. 14, 2018.
Zhang, Deriving Trip Information from GPS Trajectories, PhD Thesis, English Translation of Abstract, retrieved Apr. 20, 2018 from https://www.dissertationtopic.net/doc/1544259.
Zheng Y., et al., Mining Interesting Locations and Travel Sequences from GPS Trajectories, Proceedings of the 18th International Conference on the World Wide Web., Apr. 24, 2009, pp. 791-800.
Zheng Y., Trajectory Data Mining: An Overview, ACM Transactions on Intelligent Systems and Technology, May 20, 2015, vol. 6, No. 3, pp. 29:1-41.
Ortale R., et al., A Framework for Progressive Mining and Querying of Movement Data, Information Society Technologies, Project FP6-104915, Project Deliverable D3.7.

* cited by examiner

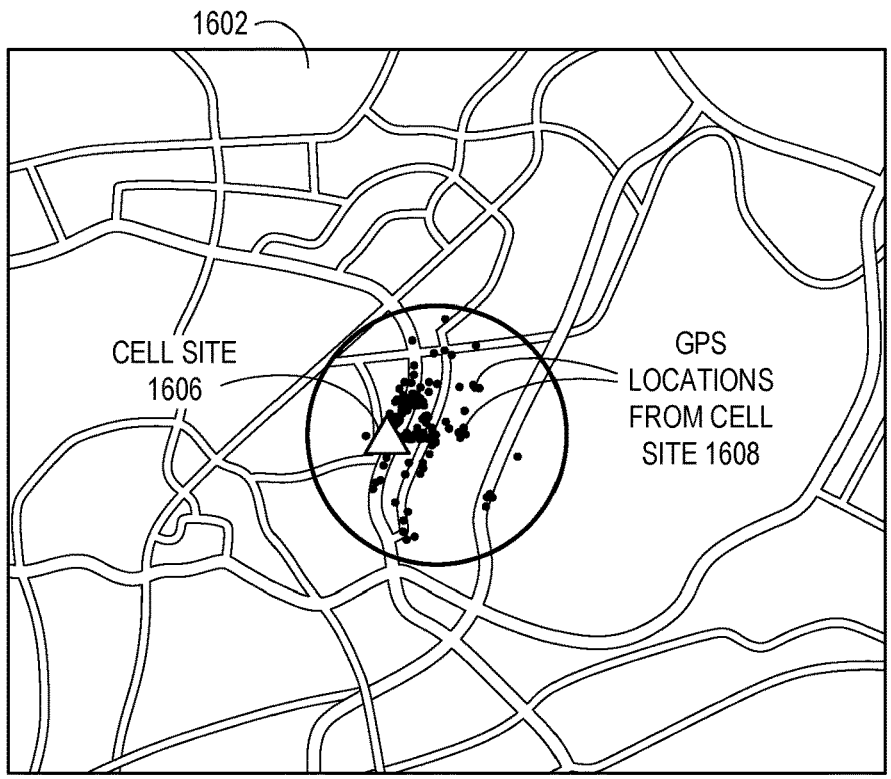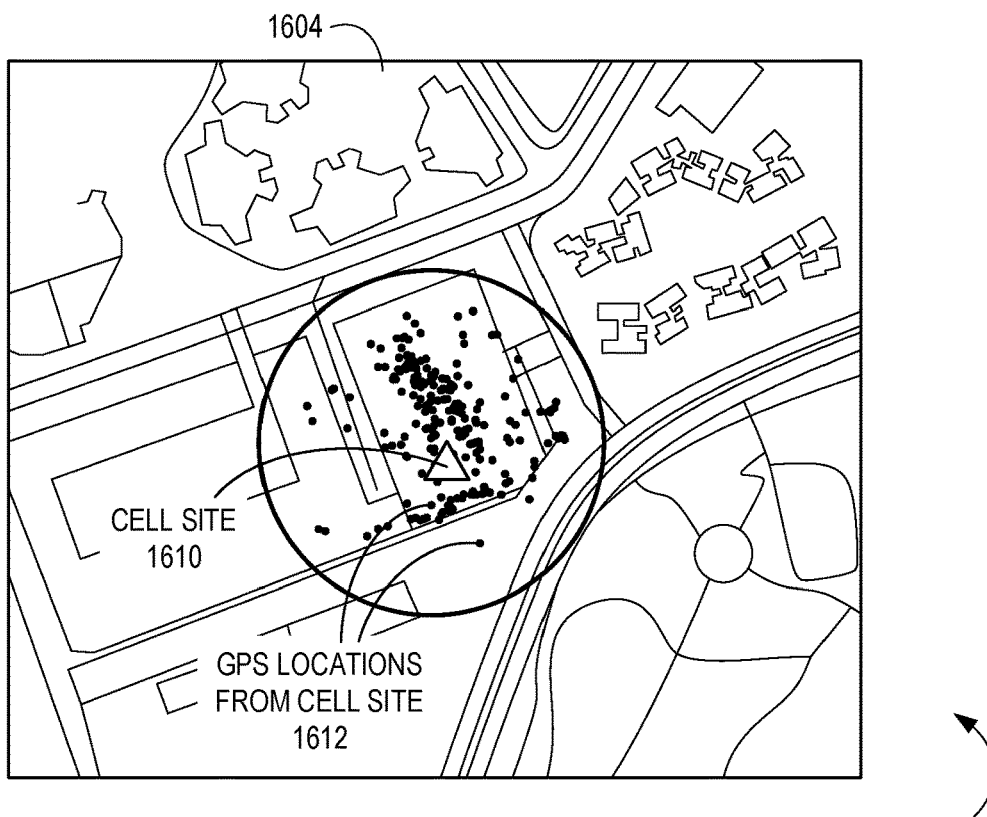
FIG. 16
1600 EXAMPLES OF GPS LOCATION DATA WITHIN A CELL BOUNDARY

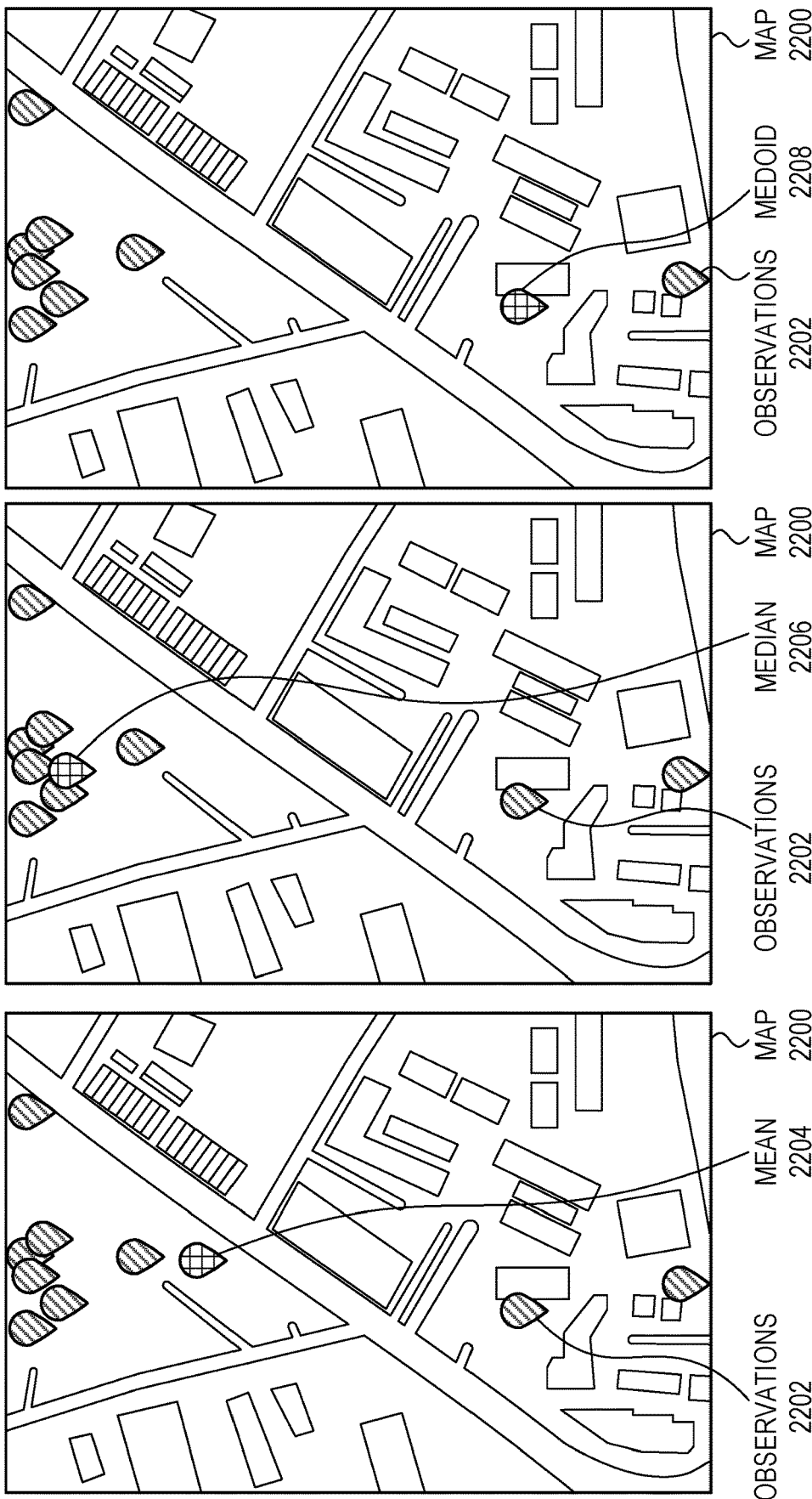

103.71866, 1.4280669, '2017-05-29 00:56:12',  
103.71866, 1.4280669, '2017-05-29 00:58:21',  } FIRST STAY 2306  
103.71866, 1.4280669, '2017-05-29 01:06:25',  
103.7435, 1.3933889, '2017-05-29 01:09:03',  
103.7435, 1.3933889, '2017-05-29 01:09:44',  
103.7435, 1.3933889, '2017-05-29 01:10:56',  } INTERMEDIATE STAY 2308  
103.7435, 1.3933889, '2017-05-29 01:12:07',  
103.71866, 1.4280669, '2017-05-29 01:15:39',  
103.71866, 1.4280669, '2017-05-29 01:16:21',  } SECOND STAY 2310  
103.71866, 1.4280669, '2017-05-29 01:19:24',

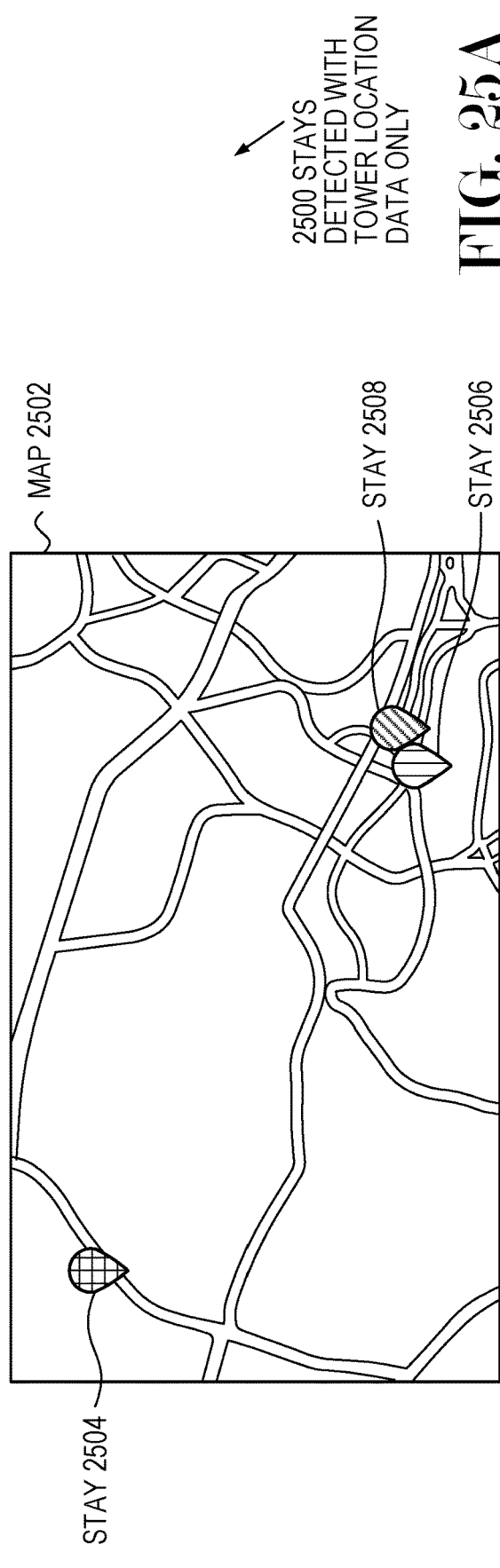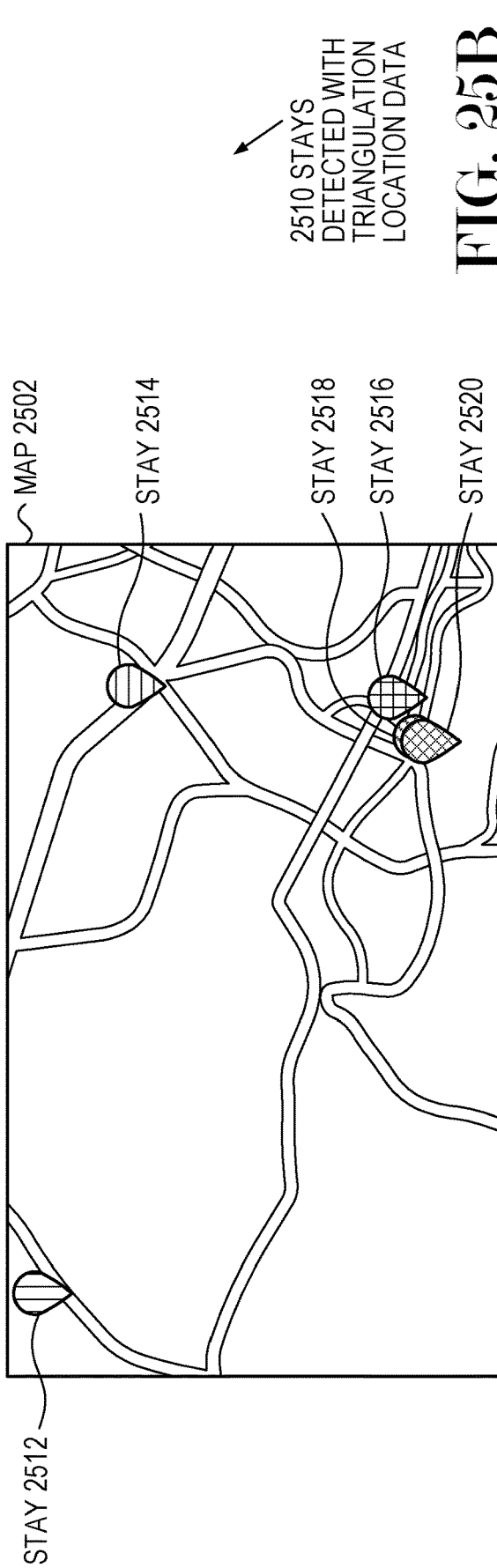

3000
STATE TRANSITION DIAGRAM FOR REAL TIME STATES

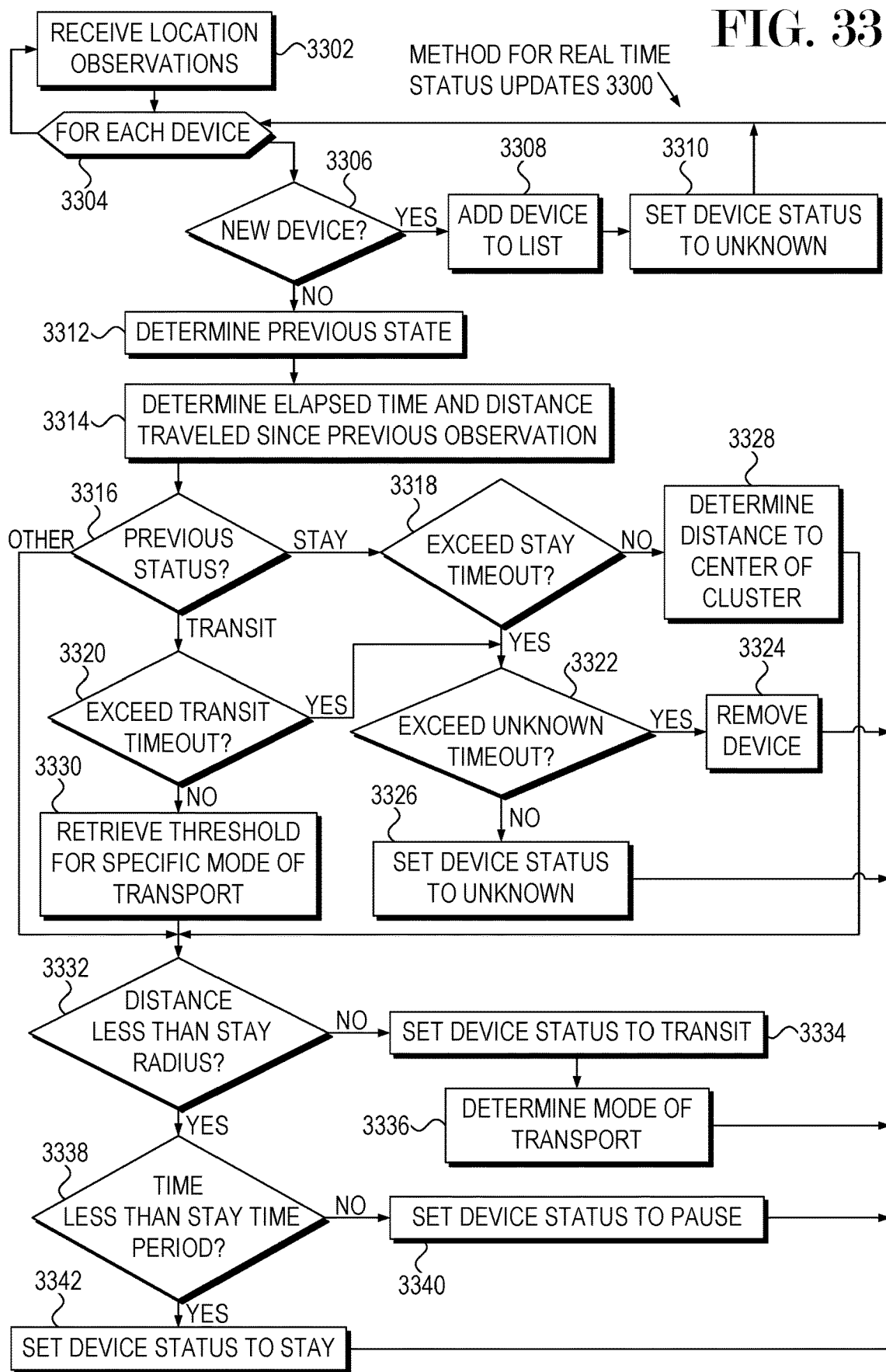

MOBILITY GENE FOR VISIT DATA

CROSS REFERENCE TO RELATED APPLICATIONS

This application claims benefit of and priority to PCT/IB2017/050891 filed 17 Feb. 2017 by DataSpark, PTE, LTD entitled "Mobility Gene for Trajectory Data," PCT/IB2017/050892 filed 17 Feb. 2017 by DataSpark, PTE, LTD entitled "Mobility Gene for Visit Data," PCT/SG2017/050485 filed 27 Sep. 2017 by DataSpark, PTE, LTD entitled "Trajectory Analysis With Mode Of Transport Analysis," and PCT/SG2017/050484 filed 27 Sep. 2017 by DataSpark, PTE, LTD entitled "Map Matching and Trajectory Analysis," PCT/SG2018/050006 filed 5 Jan. 2018 by DataSpark, PTE, LTD entitled "Trajectory Analysis Through Fusion of Multiple Data Sources," PCT/SG2018/050068 filed 14 Feb. 2018 entitled "Stay And Trajectory Identification From Historical Analysis of Communications Network Observations," PCT/SG2018/050070 filed 14 Feb. 2018 by DataSpark, PTE, LTD entitled "Real Time Trajectory Identification From Communications Network Observations," the entire contents of which are hereby expressly incorporated by reference for all they teach and disclose.

BACKGROUND

Mobility data is being gathered on a tremendous scale. Every cellular telephone connection to every mobile device generates some data about a user's location. These observations are being generated at an astonishing rate, but the sheer volume of the observations make the data difficult to analyze.

Mobility data can be generated by merely observing a location for a device connected to a wireless network. The wireless network may be a cellular network, but also may be any other network from which a device may be observed. For example, a WiFi router or BlueTooth device may passively observe nearby devices, and may note the device's various electronic identification or other signatures. In many cases, a device may establish a communications session with various network access points, which may indicate the device's location.

Many interesting uses come from analyzing mobility data. As merely one example, traffic congestion may be observed from aggregating mobility observations from cellular telephones.

As more and more uses for mobility data are developed, the complexities of analyzing and managing these large data sets are exploding. One issue is that the sources of the data, such as the telecommunications companies, may have obligations of privacy and anonymity, but there may be a large number of consumers of the data. The consumers may be a wide range of companies which may use the data in countless ways.

SUMMARY

Real time status of a device's movements may be determined from a sequence of location observations. The status may be in the form of a state, which may be "stay", "transit", "pause", and "unknown". A state transition may occur from transit to stay when the device has remained within a predefined radius for a predefined time period. Prior to being labeled a "stay", a device that may have ceased moving but has not stayed at that location for enough time may be labeled "pause". For those devices in a "transit" state, a mode of transport may be determined. The real time analysis system may be a low-overhead mechanism by which new location observations may be received and processed. The resulting data may be used by traffic analysts to monitor congestion, for real time traffic data for commuters, and other uses.

Sequences of location data points can be broken down into travel periods and stay periods through historical analysis of location data points. The noise and inaccuracies of location data points gathered from communications networks, such as mobile telephony networks, makes it difficult to accurately estimate when a user has stayed or dwelled at a particular location. The stay analysis may generate clusters of sequential location coordinates and may identify data points that appear to show movement but are likely to be noise, which can be artifacts of the communications network. Further, stay or travel sequences may initially be defined using thresholds of time and distance. Such thresholds may vary from one location to another and may be gathered and optimized over time.

Estimating a location of a device at a particular point of time may incorporate one, two, or more different location data points. The location data points may be derived from communications networks, where there may be different mechanisms for determining location. As part of the location estimation, each cellular location in a cellular network may have a different error range associated with each cell, for example. The error range for each cell may be generated by collecting precise location data from Global Positioning System or other mechanism with high accuracy, and comparing that data to location data gathered from other sources. A database of error ranges for each cell and each location mechanism may be gathered and used to estimate the actual location of a device for a given time period.

Machine learning techniques may be applied to determining a mode of transportation for a trajectory of a sequence of user locations. The mode of transportation, such as walking, bicycling, riding in a car or bus, riding in a train, or other mode, may be determined by creating a training set of data, then using classification mechanisms to classify trajectories by mode of transport. The training set may be generated by tracking then verifying a user's transportation mode. In some cases, a user may manually input or verify their transportation mode, while in other cases, a user's transportation mode may be determined through other data sources.

A trajectory may be derived from noisy location data by mapping candidate locations for a user, then finding a match between successive locations. Location data may come from various sources, including telecommunications networks. Telecommunications networks may give location data based on observations of users in a network, and such data may have many inaccuracies. The observations may be mapped to physical constraints, such as roads, pathways, train lines, and the like, as well as applying physical rules such as speed analysis to smooth the data and identify outlier data points. A trajectory may be resampled or interpolated to generate a detailed set of trajectory points from a sparse and otherwise ambiguous dataset.

Mobility observations may be analyzed to create so-called mobility genes, which may be intermediate data forms from which various analyses may be performed. The mobility genes may include a trajectory gene, which may describe a trajectory through which a user may have travelled. The trajectory gene may be analyzed from raw location observations and processed into a form that may be more easily managed. The trajectory genes may be made available to third parties for analysis, and may represent a large number of location observations that may have been condensed, smoothed, and anonymized. By analyzing only trajectories, a third party may forego having to analyze huge numbers of individual observations, and may have valuable data from which to make decisions.

A visit mobility gene may be generated from analyzing raw location observations and may be made available for further analysis. The visit mobility gene may include summarized statistics about a certain location or location type, and in some cases may include ingress and egress travel information for visitors. The visit mobility gene may be made available to third parties for further analysis, and may represent a concise, rich, and standardized dataset that may be generated from several sources of mobility data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings,

FIG. 16 is a diagram illustration of a pair of embodiments showing cell sites and actual GPS location measurements taken within the site boundaries.

FIGS. 22A, 22B, and 22C are diagram illustrations of an example showing the differences between mean, median, and mediod.

FIGS. 25A and 25B are diagram illustrations of an example showing different stays detected from different data sources for the same movement.

FIG. 33 is a flowchart illustration of an embodiment showing a method for assigning a status to a device in real time or near-real time.

DETAILED DESCRIPTION

Figure 1:
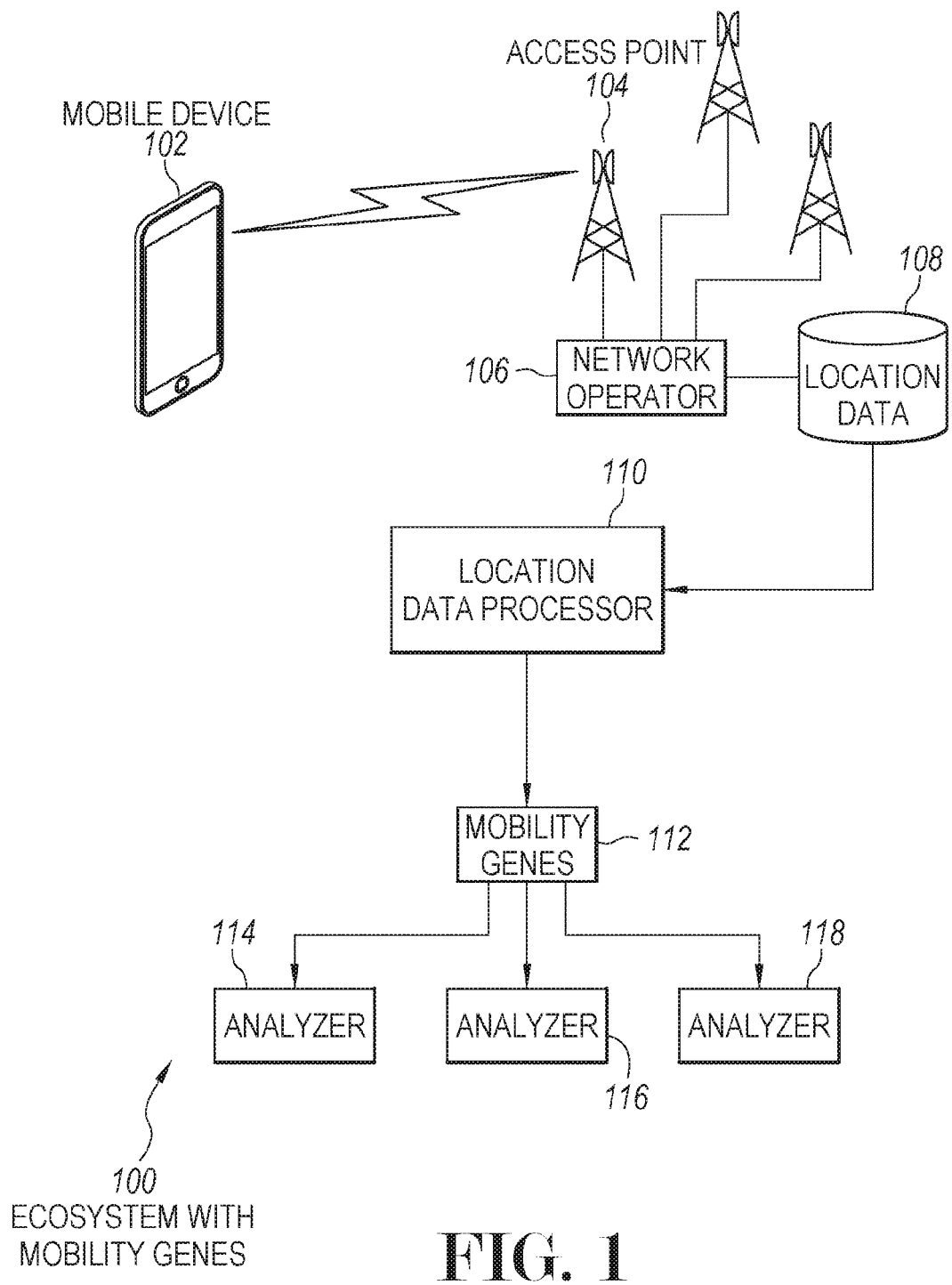
FIG. 1 is a diagram illustration of an example embodiment showing an ecosystem with mobility genes.

Real Time Status Derived From Location Observations

A real time status may be derived from location observations. The status may include "transit", "stay", "paused", and "unknown", and may be updated quickly from location observations taken from various sources, including telecommunications networks.

Many telecommunications networks may generate raw location data that merely includes the tower location to which a device may be connected. Sometimes, the same network may be able to provide raw location data that may be triangulated locations based on connections to several towers. Both sets of data may be plentiful but may have high inaccuracies. Even with the high inaccuracies, meaningful inferences about a user's mobility may be derived from the data, including real time status of the device user.

A real time status may identify those devices that may be relatively stationary verses those that may be in motion. The status may be represented by a state diagram, where status changes from transit to paused to stay, based on the length of time that successive data points indicate that the device has not moved substantially. The status may similarly change from stay to transit by showing substantial movement. Devices may be moved to an unknown status when data has not been received for the device for a predefined timeout period.

The status state diagram may have rules that use a stay radius and stay elapsed time to define a "stay". A predefined stay radius may be the geographical distance where a cluster of location observations may be considered a "stay". Such a radius may in fact be large enough that a user may move small distances, and in many cases, such a distance may be several blocks in an urban environment. Such a radius may be appropriate due to artifacts of the accuracy and resolution of the location observations provided from a telecommunications network.

Even with a stay radius of a relatively large size, a user's transit state may capture those times when a user moves via car, public transportation, or other mechanism. The movements identified with such a method, even with large predefined stay radii, may be useful for monitoring traffic on trains, subways, roads, and other major arteries. The stays identified with such a method may indicate a user's general location for major portions of the day, such as when a user is at a place of employment, recreation, shopping, or when the user may be at home to sleep. The precision of the analysis serves to capture the meaningful events within a user's day while preserving user anonymity.

Stay And Trajectory Identification From Historical Analysis of Communications Network Observations Communications networks may produce enormous numbers of observations about the physical location of devices connected to the network. As these devices move about, a stream of observations may be generated. In many cases, these observations may be quite coarse in their accuracy, but also errors or noise may be introduced into the data from the configuration and operation of the communications network itself.

For example, a typical device in a communications network may be a cellular telephone. The device may connect to a tower on a communications network and establish a basic heartbeat communication, which registers an observation. In some instances, the location information may be a triangulated location between several towers, while in other instances, the location information may merely be the coordinates of the tower. In some cases, a user may have a Global Positioning System (GPS) receiver, which may give accurate location information, but GPS receivers may only be used periodically. When GPS data may be available for a particular device, other location data may be interspersed in a sequence of locations.

One artifact of communication systems is that some towers may reach capacity and a device's connection may be changed from one tower to another even when a device has not moved. When a device is offloaded to another tower, sometimes the device may be offloaded to a different communication standard or different frequency band, and that standard may have different mechanisms for determining a location. For example, a user may be connected to a tower that uses triangulation to determine a user's location, but due to capacity issues, may be offloaded to a different tower that does not use triangulation.

The net result of this artifact is that a sequence of location points may be noisy as the location mechanisms change from one to another. There are plenty of instances when a device may change from one location determination mechanism to another while the device does not even move.

Another artifact of communication systems is that triangulation location mechanisms are inherently inaccurate. A typical cellular communications network may attempt to triangulate a device's location using time-of-flight or signal strength readings from multiple towers. Based on the geometry of the layout, a triangulated location may be calculated.

However, triangulation also has inherent inaccuracies. Multipath situations, such as when signals bounce off of buildings or other geographic features, can adversely affect time-of-flight and signal strength readings. Further, time measurement accuracies, drift, and other factors may also introduce errors into the location data.

The net result of this second artifact is that even with triangulated location data, there may be inconsistencies, oscillations, or other abnormalities in a sequence of location coordinates for a device that does not move.

When analyzing sequences of location data, the inaccuracies and artifacts of the mechanisms used to generate the location data can pose problems in determining whether a device was moving or staying in a specific location.

Mobility data may be used to monitor traffic flow and movements of people. At the coarsest level, movement data relate to traveling and staying. By separating staying segments from traveling segments, an analyst may be able to better monitor road congestion, train capacities, and a myriad of other uses. However, a typical person may only spend a small amount of their time during the day in motion. A person spends time asleep, at work, at home, and at other activities.

Determining staying verses traveling appears to be a basic element of analyzing a device's movement. However, determining what is a "stay" can be difficult problem heightened by the various artifacts of the data, not to mention the behavior of a user who may be carrying a device. The data from communications networks can make it appear that a user may be moving far more than the user actually does. This inaccuracy may be so severe as to render the motion data useless in some circumstances.

Stays may be identified by first grouping sequences of location data points based on a distance and time threshold. Sequential data points that do not move outside of the distance threshold and show that a user stayed within the location for a predefined period of time may be considered a "stay."

The predefined distance threshold and time threshold may change from one situation to another. For example, in a dense urban environment, cell towers may be placed very close to each other as opposed to more rural environments, where cell towers may be many miles or kilometers apart. In these situations, the proximity of cell towers may affect how accurate the location data may be. In the urban environment, the location accuracy and the location resolution may be much higher, allowing for a smaller distance threshold for detecting a stay.

Further, cultural, economic, or other factors may change the appropriate time threshold for detecting a stay. For example, in the evening when many people are home or asleep, a larger time threshold may be used to detect a stay, as opposed to a busy time during the day when many people may be moving about, shopping, or visiting various locations. In the latter case, a smaller window for identifying a stay may identify individual stays. In another example, some cultural or economic factors may affect the time and distance thresholds. For example, in a busy urban environment many people may visit grocery stores or other shops for short periods of time, may be for 10 minutes or so. In more rural environments, a typical visit to a store or other location may be 15 or 20 minutes or longer.

The effect of a longer or shorter distance and time thresholds may change when a stay is detected. A shorter time threshold with a shorter distance threshold may combine to identify small stays from the data that may actually be part of a travel segment. Such a situation may be a false positive condition. Conversely, a longer time threshold and a further distance threshold may combine to miss or ignore actual stays, causing the analysis to show longer travel segments that may have actually included meaningful stays. Such a situation may be a false negative condition.

Determining an accurate threshold for stays makes any subsequent analysis more meaningful. False positive conditions may obscure longer travel segments, for example, while false negative conditions may miss out on stays that may be meaningful to an analyst.

Throughout this specification and claims, the terms "stay" and "visit" as used in the noun form, are synonymous and used interchangeably.

Trajectory Analysis Through Fusion of Multiple Data Sources

A user's trajectory may be computed from multiple data sources, each of which may have different accuracies. In many cases, an accuracy may vary from one location to another. For example, location data derived from cellular telephony networks may have different accuracies or errors for each cell site or base station, and often from one antenna or cell attached to a base station to another antenna or cell attached to the same base station.

The differences in errors or accuracies may come from the design of the cellular networks, such as when one cell may be laid out to cover a much larger area than another cell. The smaller cell may be designed to cover an area that may be more densely populated than a larger cell. Consequently, a location data point gathered from the larger cell may be less accurate or have a higher error and location data gathered from the smaller cell. In some cases, the accuracies or errors may vary based on the geography, such as the interference or limitations due to high rise buildings, hills, or other obstructions.

To compute a user's location at a particular point of time, a more accurate estimation of the location may be determined by combining multiple data sources and determining a location. For example, location data may come from the location of a cell tower or antenna to which a device may communicate, as well as a triangulated location from two, three, or more antennas, as well as Global Positioning System (GPS) location, as well as WiFi data, and other sources. When multiple location data sources may be available at a particular point of time, the user's estimated location may be the intersection of each data source defined with an estimated error for each data source.

Some data sources may have small errors, which correspond to high accuracy. An example may be GPS location data, which may have an error range of single digit meters or feet. Other data sources, such as triangulated cellular locations, may have accuracies in the tens or hundreds of meters or feet. By overlapping the locations and a radius with the error range of a data point, a more accurate location estimation may be received.

When calculating a trajectory, each step in the trajectory may have different available data sources. A user's mobile device may use GPS only in certain situations, such as when the user might be using a navigation app. Other times, the GPS may be unavailable. Similarly, as a user traverses a cellular network, some cells may provide location data based on triangulation between multiple cells while other cells may provide location data that may only be the location of the cell. In the latter case, the cell size may be many hundreds of meters or ever kilometers or miles wide, meaning that the location data may have a potential error of on the order of kilometers or miles.

One method for calculating a trajectory may be Bayesian tracking or using a Kalman filter. Both such mechanisms use an error term to represent or estimate the confidence of the data being analyzed. Data with small error terms may be more reliable or more accurate than data with large error terms. For such analyses to perform well, an accurate estimation of error terms may improve overall accuracy.

A database of error terms may be determined by gathering high accuracy location data, such as GPS locations, that may be observed by mobile devices in a cell. For each GPS location, the corresponding cellular location or other, less accurate location data may be obtained. By comparing the highly accurate GPS location with the observed cellular location data, an estimate of the cellular location data may be computed. This database may be gathered over time to gather a specific error factor for each cell.

For many trajectory calculations, highly accurate GPS location data may not be available, but less accurate cellular location data may be available. This may be because GPS receivers may consume battery power on a mobile device, so such services may not be used in all cases. However, the fixed network architecture may continuously gather location data using triangulation or other location mechanisms.

Throughout this specification and claims, the terms "error" and "accuracy" are used to denote the amount of variance of a data point. Such terms may also denote the trustworthiness or reliability of a data point. For example in one embodiment, the term "error" may be represented as a radius or variance equivalent to an estimated standard deviation of observations. A larger error term may represent a lower accuracy, and vise versa.

Transportation Mode Determination Through Machine Learning Classification

A mode of transport for a user's trajectory may be analyzed using machine learning from a set of training data. Trajectory data may be sequential location data that contains a timestamp and location information, which may typically be a latitude and longitude.

A mode of transport may be very useful in classifying trajectories within location data. Once classified, further analysis may be performed on individual classes. For example, trajectories that may represent pedestrians may be very useful for retail store owners in high traffic areas, whereas nearby trajectories for passengers of a train system may not be useful. A retail store owner may be able to analyze the demographics of the pedestrians, as well as other traits or behaviors to adapt their retail offerings to match the pedestrians that walk past the store.

A journey may have several modes of transport. For example, a commuter in a big city may begin by walking to a bus station, taking a bus to a train station, then riding a train to a city center. The commuter may walk from a train station to their place of employment. In another example, a person in a more rural area may drive a car to a local shopping district, park the car, and walk around the shopping area. The person may continue by driving from one store to another before returning home.

Trajectory data may be classified into modes of transport by building a set of training data, then applying machine learning and classification techniques to analyze data. The set of training data may include a set of location data containing latitude and longitude, a time stamp, and a mode of transport. The set of training data may be collected over a representative sample population, and then used to classify a set of unanalyzed location data.

The training set may be generated for a given area, such as a city. The factors that may be highly correlated for a given mode of transport may include the geography of the area and the speed of a person's movement. Densely populated pedestrian thoroughfares may generally have pedestrians and possibly bicyclists, but probably rarely train riders. Proximity to train stations and train tracks may indicate that a user may be traveling by train.

The training set may be generated by having a set of users move through a city or other area using their normal transportation modes, then capturing the transportation modes for each journey. In some cases, a set of users may manually input their transportation modes, such as indicating when they may be walking or riding a bus.

Mobility Genes as Representations of Location Observations

Mobility genes may represent large numbers of location observations into a compact, meaningful, and easily digestible dataset for subsequent observations. The mobility genes may be one way for telecommunications service providers may aggregate and process their location observations into various formats that may be sold and consumed by other companies to provide meaningful and useful analyses.

The mobility genes may be a second tier of raw location data. Raw location data may come in enormous quantities, the volume of which may be overwhelming. By condensing the raw location data into different mobility genes, the subsequent analyses may be much more achievable, while also maintaining anonymity of the users whose observations may be protected by convention or law.

Raw location data may be produced in enormous volumes. In modern society, virtually every person has at least one cellular telephone or other connected device. The devices continually ping with a cellular access point or tower, where each ping may be considered a location observation. In a single day in a medium sized city, billions of location observations may be collected.

Making meaningful judgments from these enormous datasets can be computationally expensive. In many cases, small samples of the larger dataset may be used to estimate various factors from the data.

By pre-processing the raw location observations into a set of mobility genes, a data provider may make these enormous datasets available for further analysis without the huge computational complexities. In many cases, the mobility genes may be anonymized, smoothed, augmented with additional data, and may be succinct enough and rich enough to make meaningful analyses without violating a telecommunications network's obligation of privacy to their customers. Further, the pre-processing of the data into mobility genes may transfer much of the computational cost to the data provider, which may unburden the data consumers from expensive data handling.

Mobility Gene for Trajectory Data

Location observations may be condensed into trajectory data that may be made available for various secondary analyses. Location observations may come from many different sources, including location observations made by telecommunications companies, such as cellular telephony providers, wireless access providers, and other communications providers.

The trajectory data may be useful for many different analyses, such as traffic patterns, behavioral studies, customer profiling, commercial real estate analyses, anomaly detection, and others. The trajectory mobility gene may condense millions or billions of location observations into a form that may be easily digested into meaningful analyses and decisions.

The mobility gene may represent a mechanism by which a data supplier may digest large numbers of observations into a dense, useful, and anonymous format that may be consumed by a third party. The third party may be a separate company that may further process the mobility gene into a decision-making tool for various applications.

By using a mobility gene, a data provider, such as a telecommunications service provider, may be able to pre-process large numbers of data into an intermediate format for further analysis. The mobility gene may be a format for making data available through an application programming interface (API) or some other mechanism.

The trajectory mobility gene condenses many location observations into a series of points or trajectories where a device was observed. This pre-processing may increase the value of the trajectory data, as well as make the trajectory data easier to analyze and digest. In many cases, the pre-processing may also attach various demographic information about the users associated with the trajectories.

The trajectories may be smoothed, which may be useful in cases where the observations may have location or time variations or tolerances. For example, many location observations may be made using an access point location or some form of triangulation between multiple access points. Such location observations may have an inherent level of tolerance or uncertainty, which may lead to trajectories that may be physically impossible, as the speed between each point may be unattainable using conventional transportation mechanisms.

Demographic information about the users may be added to the trajectory data. In many cases, a data provider may have secondary information about a user, such as the user's gender, actual or approximate age, home and work locations, actual or approximate income, family demographics, and other information. Such demographics may be associated with each trajectory, and may be used for supplying subsets of trajectories for third party analysis.

Trajectories may be anonymized in some cases. A user's trajectory may reveal certain personally identifiable information (PII) about a user. For example, a user's commuting trajectory may identify the user's home and work locations. With such information, a specific user may be identified. Anonymization of this data may be performed in several different ways.

One way to anonymize a trajectory may be to truncate the trajectory to omit an origin, destination, or both, while keeping a portion of a trajectory of interest. For example, a set of trajectories may be truncated to only show movement trajectories through a specific portion of a road or train station. Such truncations may omit the user's origin and destinations, but may give a third traffic analysis service meaningful and useful trajectories from which the service may show local traffic patterns.

Another way to anonymize a trajectory may be to generalize or randomize an origin or destination of a trajectory. In many cases, a trajectory may have location observations with a certain accuracy range or tolerance. Such accuracy may help identify a person's home or other destination very specifically. One way to anonymize the trajectory may be to identify an origin or destination with a general area, such as a centroid of a housing district. All trajectories beginning or ending at the housing district may be assigned to be the centroid of the housing district, and thereby an individual trajectory cannot be used to identify a specific resident of the housing district.

Mobility Gene for Visit Data

A mobility gene for visits may be one mechanism to aggregate and condense location observations into an intermediate form for further analysis. A visit gene may represent summarized location data that reflect user behavior with respect to a certain location or location type.

The visit mobility gene may be derived from telecommunications observations and other sources, and may be an intermediate form of processed data that may be made available to third parties for analysis. In many cases, the visit mobility gene, as well as other mobility genes, may be made available for sale or consumption by third parties, and may be a revenue source for telecommunications companies and other companies that may gather location observations.

A visit mobility gene may represent a rich set of data that may be derived from location observations. In many cases, a visit mobility gene may represent movements relating to a specific location, such as a train station, store, recreational location, or some other specific location. In some cases, a visit mobility gene may represent an aggregation of visits to a specific type of location, such as a user's home, work, or recreational location.

A visit may be determined by a user's location observations being constant or within a certain radius for a period of time. In some cases, a visit may be derived by analyzing location observations to find all location observations that may be within a specific area, then analyzing user's behavior to determine if the users remained in the area for a period of time. In other cases, a visit may be derived by computing a user's trajectory and analyzing the trajectory for periods where the user's movements have stopped or remain within a small area. In such cases, a visit mobility gene may be a secondary analysis of a trajectory mobility gene.

A visit gene may include time of day, length of stay, and various other statistics. A visit gene may also include information before and after a person's visit. For example, a visit gene may include trajectories before and after a person's visit to a location. A visit gene may be supplemented with demographic information about visitors, such as actual or approximate age, gender, actual or approximate home and work locations, actual or approximate income, as well as hobbies, common other locations visited, and other information.

Throughout this specification, like reference numbers signify the same elements throughout the description of the figures.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is an illustration showing an example embodiment 100 of an ecosystem with mobility genes. A mobile device 102 may connect to various access points 104, which may be managed by a network operator 106. Each communication with the mobile device 102 may be stored as raw location data 108.

A location data processor 110 may analyze the raw location data 108 to generate a set of mobility genes 112. The mobility genes 112 may be transferred to various analyzers 114, 116, and 118 for subsequent analysis.

The location data processor 110 may process the raw location observations into mobility genes 112, which may be sold or transferred to third parties who may perform various analyses. The mobility genes 112 may be a condensed, succinct, and useful intermediate data format that may be consumed by third parties while keeping user anonymity. In many cases, the location data processor 110 may augment the raw location data with secondary data sources, as well as provide smoothing and other processing that may increase data usefulness and, in some cases, improve data accuracy.

The various mobility genes 112 may be a standardized mechanism by which third party data analyzers may access a very rich and very detailed set of location data 108. A location data processor 110 may analyze billions of raw location observations and distill the data into mobility genes 112 that may be easily consumed without the high data handling costs and high data processing costs of analyzing enormous numbers of location observations.

The mobility genes 112 may be an industrial standard format that may preserve user anonymity yet may be increase the value of specific data that may be used by third party analyzers. The mobility genes 112 may come in many formats, including trajectories and visits.

The mobility genes 112 may come in historical and real time data formats. A historical data format may include mobility genes that may have been derived over a relatively long period of time, such as a week, month, or year. A real time format may present mobility genes that may be occurring currently, or over a relatively short period of time, such as over a minute, hour, or day. Each use case and each system may have a different definition for "historical" and "real time." For example, in some systems, real time may be mobility genes derived in the last several seconds, while another system may define real time as data collected in the last week.

Real time data formats may be useful for providing alerts, providing current data, or making real time decisions about people's mobility. One use for real time data may be to display traffic congestion on a road or to estimate travel time through a city. Another use of real time data may be to predict the number of travelers that may be at a taxi stand in the next several minutes or in the next hour.

Real time data formats may be used to compare current events to historical behaviors. Historical analysis may provide an estimate for events that may happen today or some period in the future, and by comparing historical estimates with real time data, an anomaly may be detected or an estimate for future traffic may be increased or decreased accordingly.

Figure 2:
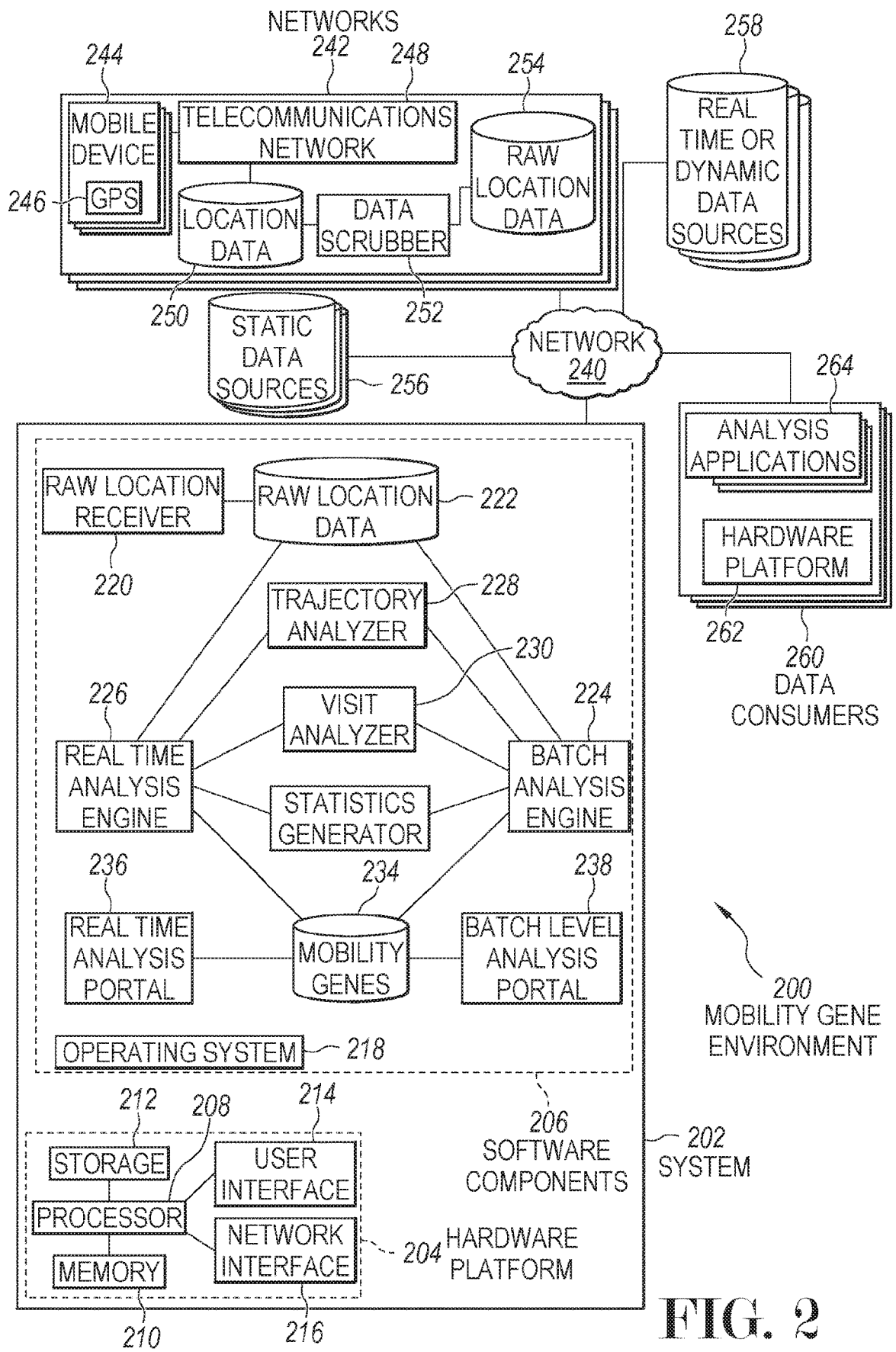
FIG. 2 is a diagram illustration of an embodiment showing a network environment with systems for generating mobility genes.

FIG. 2 is a diagram of an embodiment 200 showing components that may analyze raw location data and provide mobility genes for subsequent analyses. The example of embodiment 200 is merely one topology that may be used to analyze raw location data.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device. In some embodiments, the device 202 may be implemented on a cluster of computing devices, which may be a group of physical or virtual machines.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate.

A raw location receiver 220 may receive raw location data from one or more networks 242 or other sources. The raw location receiver 220 may have a push or pull communication model with a raw location data source, and may receive real time or historical data for analysis. The raw location receiver 220 may store information in a raw location database 222.

A batch analysis engine 224 or a real time analysis engine 226 may route the raw location data 222 into various analyzers for processing. The analyzers may include a trajectory analyzer 228, a visit analyzer 230, and a statistics generator 232. The analysis may result in mobility genes 234, which may be served to various analyzers through a real time analysis portal 236 or a batch level analysis portal 238.

In the example of embodiment 200, a batch analysis engine 224 may analyze historical data to create historical mobility genes. The results of batch-level analysis may be available through a batch level analysis portal 238, where other analyzers may download and use mobility genes. A batch-level analysis may be analyses that may not have a real-time use case. For example, a commercial developer may wish to know the demographics of people who travel near a commercial shopping mall. Such an analysis may be performed in batch mode because the data may not be changing rapidly.

A real time analysis engine 226 may perform real-time analysis of location observations, and may be tuned to process data quickly. In many cases, the real time analysis engine 226 may generate comparison versions of a mobility gene. A comparison version may be a difference or comparison between a set of real time observations and a predefined, historical mobility gene. This difference may be useful for generating alerts, for example. In some cases, the difference information may be much more compact than having to access an entire set of mobility genes.

A trajectory analyzer 228 may create trajectories from raw location data 222. The trajectories may include sequences of locations traveled by a user, including timestamps for each of the observed locations. The trajectories may be processed into a useable form by scrubbing and smoothing the data, as well as removing duplicate or superfluous observations.

A visit analyzer 230 may identify visits for a given location. In some cases, the visits may be inferred or determined from subsequent analysis of trajectories. In other cases, visits may be identified by finding all location observations for a given location, then finding data associated with those visits.

A statistics generator 232 may generate various statistics for a given mobility gene. In some cases, the statistics generator 232 may access various static data sources 256 or real time or dynamic data sources 258 to augment a mobility gene.

The real time analysis portal 236 and batch level analysis portal 238 may be a computer or web interface through which data may be queried and received. In a typical use case, a third party analyzer may send a request to one of the portals 236 or 238 for a set of mobility genes. After verifying the requestor's credentials, the portal may cause the data to be generated if the mobility genes have not been calculated, then the mobility genes may be transmitted to the requestor.

The system 202 may be connected to various other devices and services through a network 240.

One or more telecommunications networks 242 may supply raw location data to the system 202. The telecommunications networks 242 may be cellular telephony networks, wireless data networks, networks of passive wireless sniffers, or any other network that may supply location information.

In a typical network, a wireless mobile device 244, which may have a Global Positioning System (GPS) receiver 246, may connect to with a telecommunications network 248 through a series of access points. Various location data 250 may be generated from the mobile device interactions, including GPS location data that may be generated by the mobile device 244 and transmitted across the telecommunications network 242.

The location data 250 may be cleaned and scrubbed with a data scrubber 252 to provide raw location data 254 that may be processed by the system 202. In many cases, the location data 250 may include device identifiers and other potentially personally identifiable information. The data scrubber 252 may replace device identifiers with other, non-traceable identifiers and perform other pre-processing of the location data.

One form of telecommunications location data may include location data that may be gathered from monitoring a device location in a cellular telephony system. In some such systems, the location data may include the location coordinates of an access point, which may be close to but not exactly the location of the device. Some cellular networks may have cells that span large distances, such as multiple kilometers or miles, and the accuracy of the location information may be very poor. Other telecommunications systems may use triangulation between two, three, or more access points to determine location with a higher degree of accuracy.

In some cases, a GPS receiver in a mobile device may generate coordinates and may transmit the coordinates as part of a data message from the mobile device 244. Such GPS coordinates may be much higher accuracy than other location mechanisms, but GPS coordinates may not be transmitted with as often as other location mechanisms. In some systems, some location observations may have different degrees of accuracy, such that some observations may be generated by GPS and other observations may be determined through triangulation or merely access point locations. Such accuracy differences may be used during mobility gene calculations.

Static data sources 256 and dynamic data sources 258 may represent any type of supplemental data sources that may be used to generate mobility genes. An example of a static data source 256 may be a map of highways, roads, train systems, bus systems, pedestrian paths, bicycle paths, and other transportation routes. Another example may be the name and location of various places of interests, such as shopping malls, parks, stores, train stations, bus stops, restaurants, housing districts, factories, offices, and other physical locations.

Another set of static data sources 256 may be demographic information about people. Such information may be known by a telecommunications network 242 because the network may have name, address, credit card, and other information about each of its subscribers. In some cases, a telecommunications network 242 may augment its raw location data 254 with demographic information.

An example of dynamic data sources 258 may be current train, bus, airplane, or ferry schedule, the current number of taxis available, or any other data source.

The static and dynamic data sources 256 and 258 may augment a mobility gene. For example, a data analyzer may request mobility gene information for fast food restaurants in a specific city. The system 202 may identify each of the fast food restaurants from a secondary data source, the identify visits and trajectories that may relate to each of the fast food restaurants.

A set of data consumers 260 may be third party organizations that may consume the mobility gene data. The data consumers 260 may have a hardware platform 260 on which various analysis applications 262 may execute. In some cases, the data consumers 260 may be third party services that may consume the mobility genes and provide location-based services, such as traffic monitoring and a host of other services.

Figure 3:
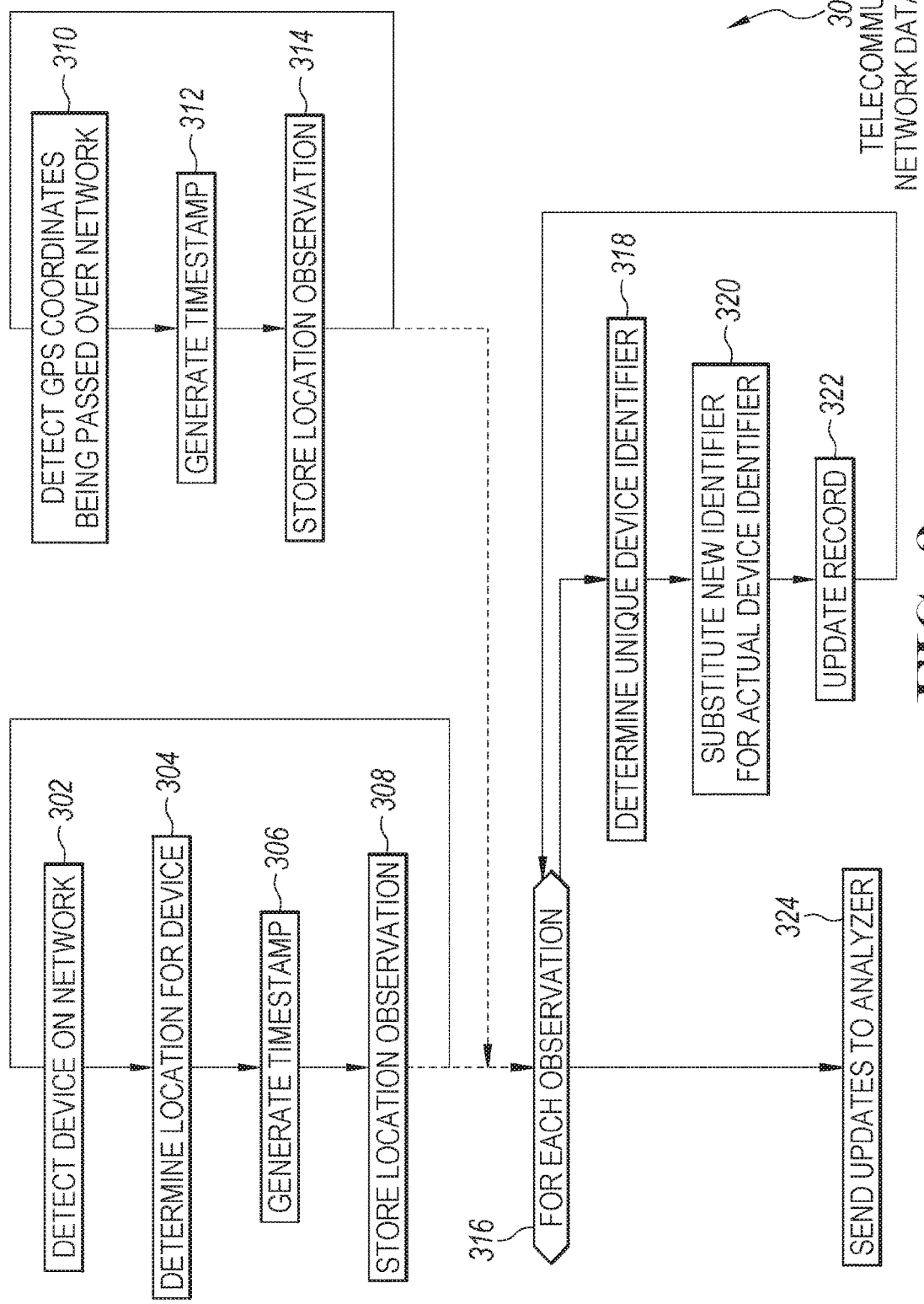
FIG. 3 is a flowchart illustration of an embodiment showing a method for collecting data by a telecommunications network.

FIG. 3 is a flowchart illustration of an embodiment 300 showing a method of generating location observations. Embodiment 300 is a simplified example for a sequence of generating location observations that may be performed by a telecommunications network.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates two ways of determining a location observation, along with a way to scrub the observations from device-specific identifiers.

One way to create a location observation may be to detect a device on the network in block 302. A location for the device may be determined in block 304, along with a timestamp in block 306. The resultant location observation may be stored in block 308.

Each location may be determined by the network. In some cases, a network may establish an approximate location for the device, which may be sufficient for managing the traffic on the network. However, in many cases, such location coordinates may be inaccurate. For example, some networks may provide a location as the location of the access point, cell tower, or other fixed node on the network. Any device detected by that node may be located anywhere within the range of the access point, which may be several kilometers or miles. Such location information may have a large tolerance or variation from the actual location.

Some networks may provide a location estimate based on triangulation of a device with two, three, or more access points or other receivers. Such a location may be more accurate than the example of providing merely the access point physical location, but may not be as accurate as GPS location.

In block 310, a network may detect that GPS location information may be transmitted over the network. Such information may be captured, a timestamp generated in block 312, and a location observation may be stored in block 314. Such an example may be one method by which GPS information may be captured and stored as a location information.

In some systems, certain applications may execute on a device and may generate GPS location information. For example, navigation applications typically send a stream of GPS location data to a server, which may update directions for a user. Such applications may be detected, and the GPS locations may be used as highly accurate location observations.

A typical location observation may include a device identifier, a set of location coordinates, and a timestamp. The device identifier used in a wireless network may depend on the network. Typically, a device may have some type of electronic identification, such as a Media Access Control (MAC) address, Electronic Identification Number (EIN), or other device identifier. In many cases, such identifiers may be a mechanism by which other systems may also identify the device.

A device identifier may be one mechanism by which a mobility gene may be directly linked to a specific user. In general, the raw data for mobility genes may be collected by one group of actors who may have strict privacy regulations to which they have to adhere, but may sell mobility genes to a third party. A device identifier may be one way that a third party may connect specific mobility data to specific users.

In order to obfuscate identifiable information from the location observations, each observation may be analyzed in block 316, and a unique identifier for the device may be generated in block 318 and substituted for the actual device identifier in block 320. The location observation may be updated in block 322.

The unique identifier may be the same identifier for that device in the particular dataset being analyzed. In some cases, a lookup table may be created that may have the device identifier and its unique replacement. Such a system may use the same substituted device identifier for observations over a long period of time.

After updating all of the observations, the updates may be sent to a mobility gene analyzer in block 324.

Figure 4:
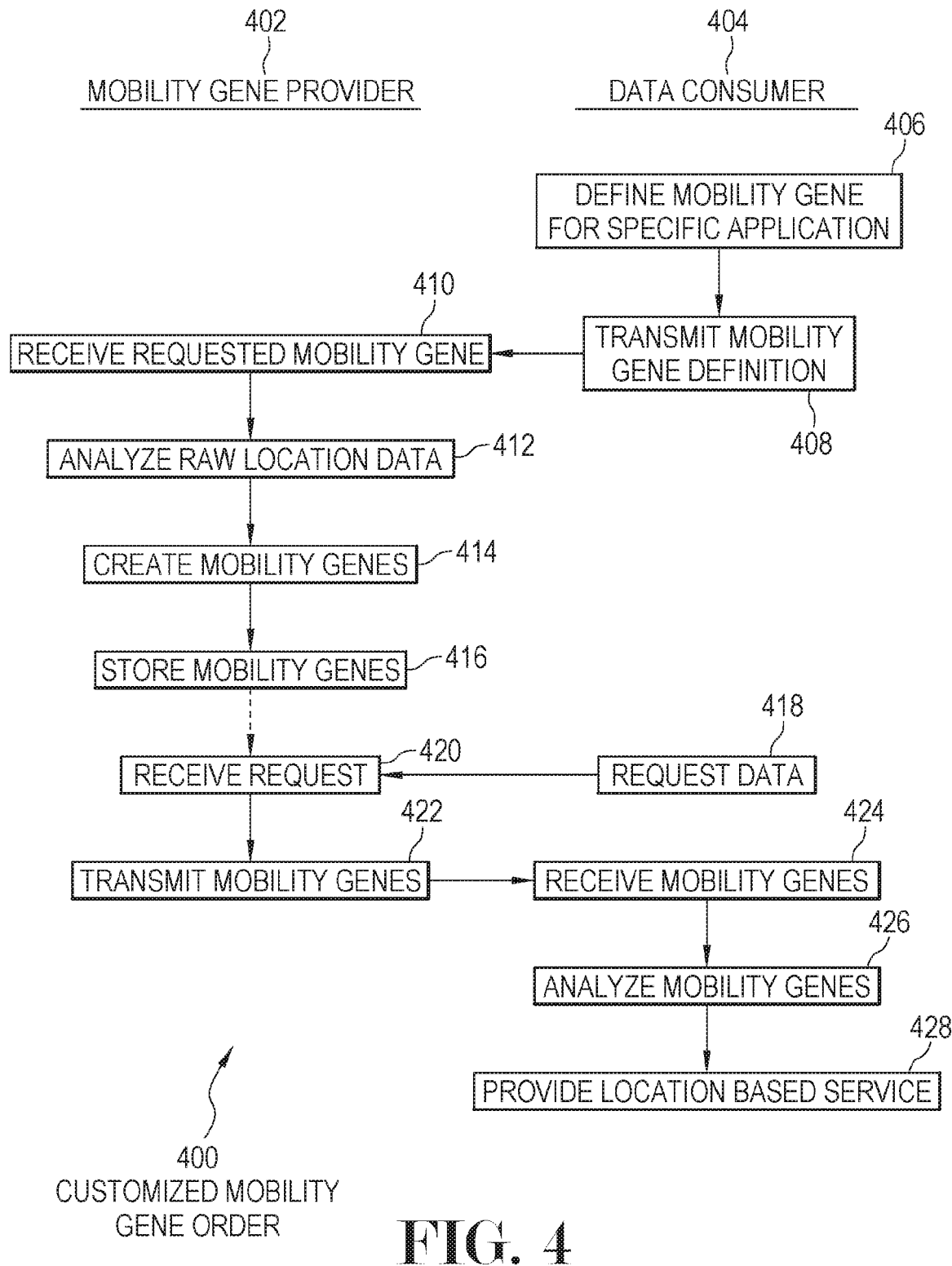
FIG. 4 is a flowchart illustration of an embodiment showing a method for requesting and responding to a customized mobility gene order.

FIG. 4 is a flowchart illustration of an embodiment 400 showing interactions between a mobility gene provider 402 and a data consumer 404. The operations of the mobility gene provider 402 are illustrated in the left hand column, while the operations of the data consumer 404 are illustrated in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is one method by which a mobility gene may be requested and provided. A mobility gene provider 402 may be a system that may process raw location observations into a set of mobility genes. The mobility genes may be consumed by the data consumer 404. In many situations, the mobility genes may be a compact form of location observations that may be ready for further processing by a data consumer 404.

The mobility genes may represent many thousands, millions, billions, or even trillions of individual observations that may be condensed into various mobility genes. By pre-processing the location observations into a set of mobility genes, the high cost and complexity of analyzing enormous numbers of observations may be avoided. Further, a set of mobility genes may be anonymized or summarized such that the data may be handled without worry of disclosing personally identifiable information. Such restrictions may be imposed by law or convention, and the cost of implementing the restrictions may be borne by the mobility gene provider 402 and may not be passed to the data consumer 404.

In the example of embodiment 400, a data consumer 404 may define a mobility gene in block 406, then transmit that definition in block 408 to the mobility gene provider 402.

The mobility gene provider 402 may receive the definition in block 410, analyze raw location data in block 412, and create the mobility genes in block 414 and store the mobility genes in block 416.

In many cases, the mobility gene may be processed from historical data. Such mobility genes may be processed in a batch mode. Some requests may be for real time data, and such mobility genes may be continually processed and updated.

In the example of embodiment 400, a data consumer 404 may request data in block 418, which may be received in block 420 by the mobility gene provider 402 in block 422. The mobility gene provider 402 may transmit the mobility genes in block 422, which may be received by the data consumer in block 424. The mobility genes may be analyzed in block 426 to provide various location based services in block 428.

The example of embodiment 400 in blocks 418-428 may be one example of a pull-style communication protocol, where the data consumer 404 may initiate a request. Other systems may use a push-style communication protocol, where the mobility gene provider 402 may initiate a data transfer. Still other systems may use other types of communication protocols for transferring mobility genes from a mobility gene provider 402 to a data consumer 404.

Figure 5:
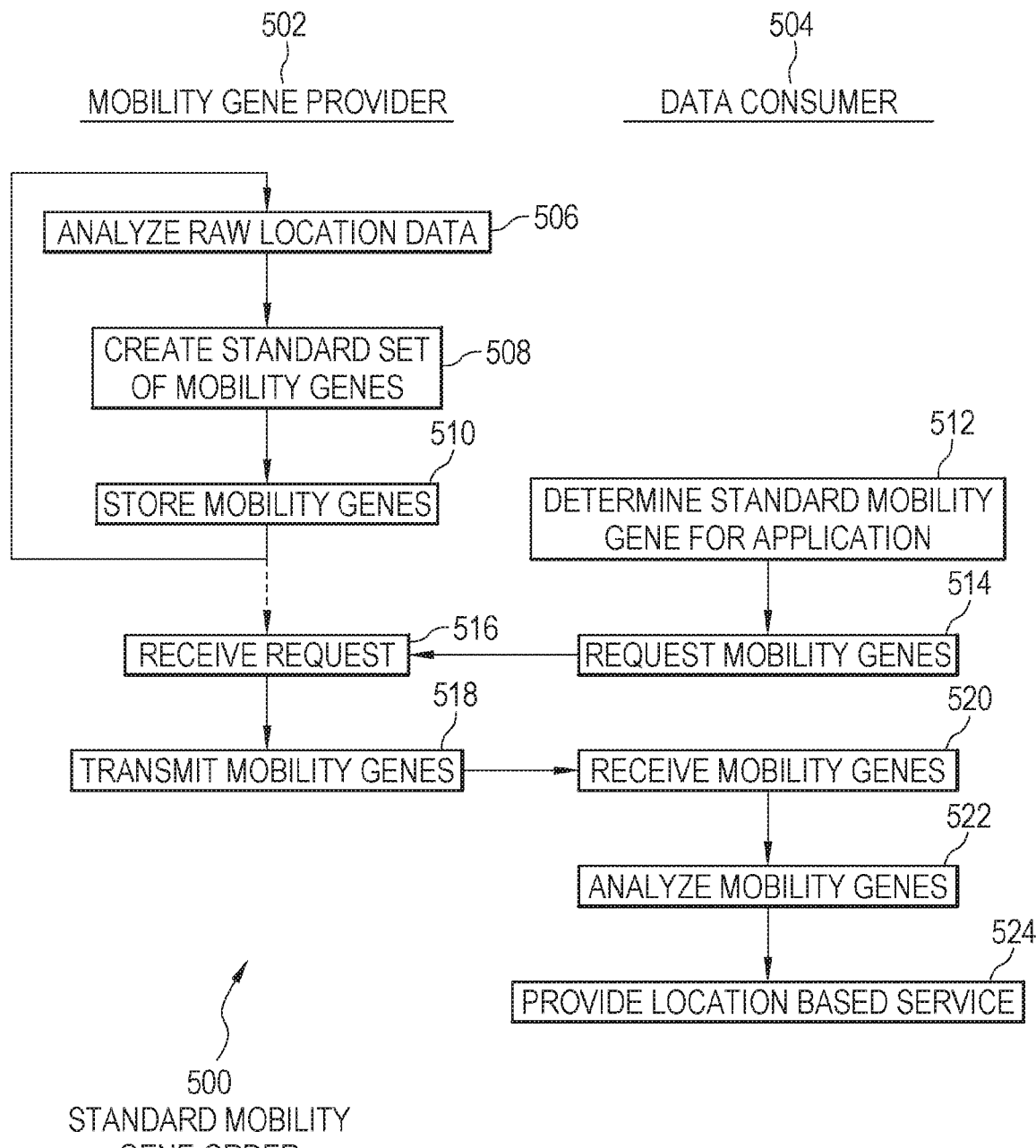
FIG. 5 is a flowchart illustration of an embodiment showing a method for generating and responding to a standardized mobility gene order.

FIG. 5 is a flowchart illustration of an embodiment 500 showing interactions between a mobility gene provider 502 and a data consumer 504. The operations of the mobility gene provider 502 are illustrated in the left hand column, while the operations of the data consumer 504 are illustrated in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 is an example of an interaction where a data consumer 504 may use a standard, pre-computed mobility gene. A mobility gene provider 502 may analyze raw location data in block 506, create a standardized set of mobility genes in block 508, and store the mobility genes in block 510. Such a process may loop over and over as new data may be received.

A standardized set of mobility genes may be pre-defined and may be ready to use. One form of such genes may be a subscription service or a data marketplace, where many different data consumers 504 may purchase or consume a pre-defined set of mobility genes.

Such a system may compare with the example of embodiment 400, where a data consumer may define various parameters about a requested mobility gene.

A data consumer 504 may determine a standard mobility gene for an application in block 512. In many cases, a mobility gene provider 502 may provide a catalog of mobility genes that may be useful for various applications. Such mobility genes may be standardized and may be offered on a subscription or other basis to one or more data consumers.

The data consumer 504 may request mobility genes in block 514, and the request may be received in block 516 by the mobility gene provider 502. The mobility genes may be transmitted in block 518 and received in block 520. A data consumer 504 may analyze the mobility genes in block 522 and provide a location based service in block 524.

Figure 6:
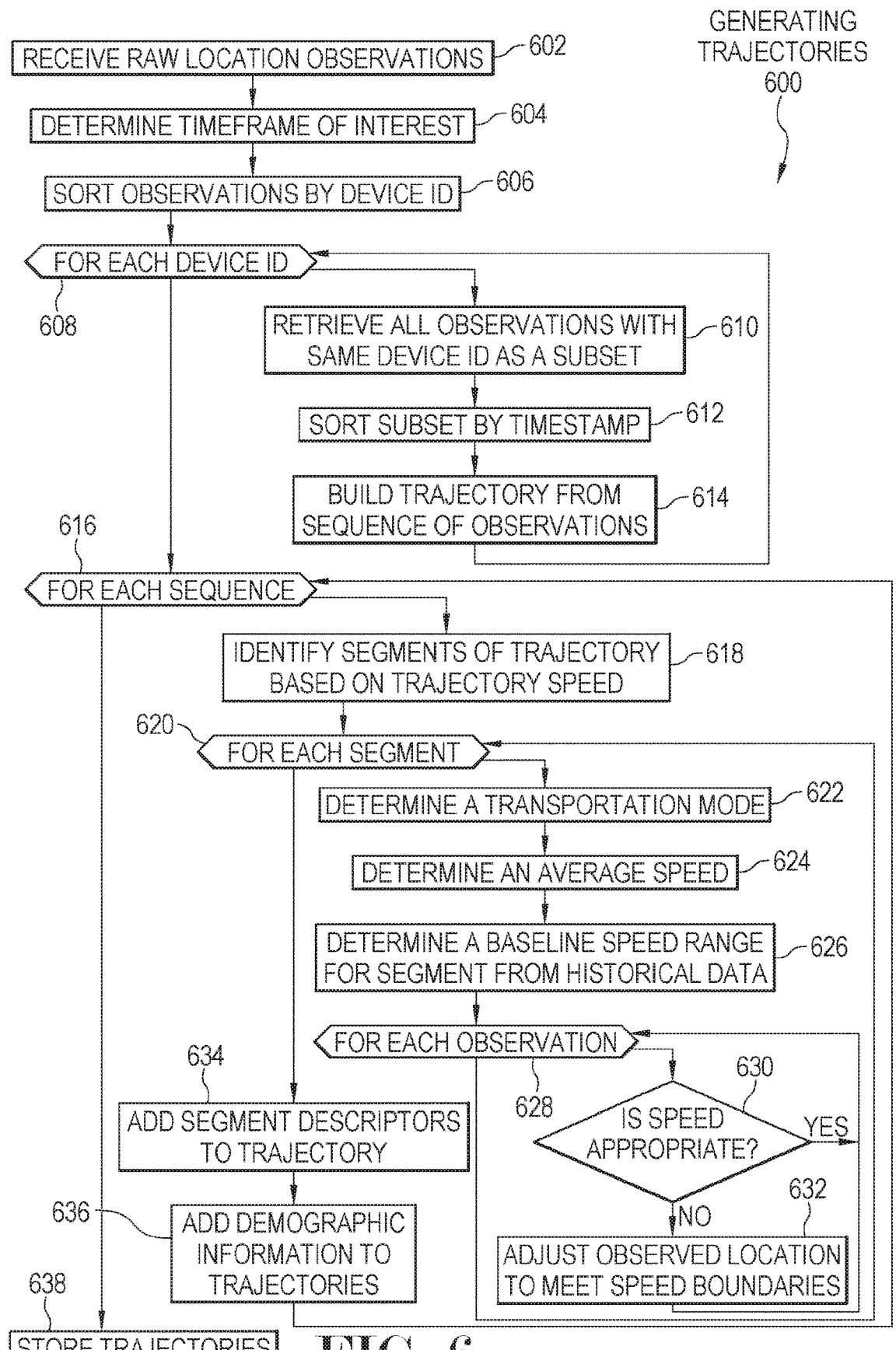
FIG. 6 is a flowchart illustration of an embodiment showing a method for generating a trajectory mobility gene.

FIG. 6 is a flowchart illustration of an embodiment 600 showing a method for creating trajectory mobility genes. The method of embodiment 600 may be merely one example of how trajectories may be created from raw location observations.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 is one example of how trajectory mobility genes may be generated. A trajectory gene may define a path that a user may have traveled. In many cases, a trajectory gene may include a transportation mode.

Trajectory genes may be smoothed. In many cases, location observations may not be very precise. For example, some raw location data may give a user's location as the location of an access point, which may be a large distance from the actual location. In some cases, such variation may be on the order of tens or hundreds of feet, or in some cases miles or kilometers of inaccuracies.

A smoothing algorithm may adjust a trajectory such that the movement may make physical sense. Some such smoothing algorithms may increase a trajectory's accuracy.

Some smoothing or post processing algorithms may adjust a trajectory as part of an anonymizing process. Trajectories can contain information that may identify people specifically. For example, a trajectory from a person's home address to their work address may indicate exactly who the person may be. By obfuscating one or both of the origin or destination, the trajectory may be made anonymous, while preserving useful portions of the trajectory for analysis.

Many mobility genes may include demographic information about a user. The demographic information may be any type of descriptor or categorization of the user. Many systems may classify users by gender, age or age group, income, race, education, and so on. Some systems may include demographics that may be derived from location observation data, such as predominant mode of transport, recreational sites visited, types of restaurants visited, and the like.

Raw location observations may be received in block 602.

A timeframe of interest may be determined in block 604. In some analyses, a time frame may be defined by trajectories in the last hour, day, or week. In other analyses, a time frame may be defined by trajectories at a specific recurring time, such as between 9:15-9:30 am on Tuesdays that are not holidays. Location observations meeting the timeframe of interest may be gathered for the analysis.

The observations may be sorted by device identification in block 606. For each device identification in block 608, a subset of observations may be retrieved in block 610 that have the device identification. The subset may be sorted by timestamp in block 612 and a raw trajectory may be created by the sequence of location observations in block 614.

For each sequence in block 616, the trajectory may be broken into segments based on the trajectory speed in block 618. In other words, a trajectory segment may be created by identifying locations where the trajectory may have paused for an extended time. An example may be a trajectory that may pause while a person is at work, at home, at a recreational event, or visiting some location.

For each segment in block 620, a transportation mode may be determined in block 622 and an average speed determined in block 624. The transportation mode may be inferred by the specifics of a trajectory. For example, a person who progresses slowly at a walking pace to a train station, then moves quickly at a train's speed may be assumed to have walked to the train station and ridden a train. Another person who lingers at a bus stop for a period of time, then travels at a common speed of vehicular traffic may be assumed to be riding a bus. Yet another person who travels on a motorway but begins and ends a journey away from bus stops may be assumed to travel by car or taxi.

In some embodiments, a user's previous history may be used as an indicator for their preferred transportation mode. Some systems may look back to previous transportation analyses for hints or indicators as whether a specific user often uses a car or train.

The following several steps may be one way to smooth the trajectory and, in some cases, increase its accuracy. Some location observations may have positional data that may be highly inaccurate. The inaccuracies may come from the method used to determine a user's location, which may include giving only the coordinates of an access point or cell tower, even though the user may be a long distance away from the access point or cell tower. In such cases, the trajectory information may give unrealistic movements, such as lingering for a period of time at one access point, then instantaneously moving a long distance to a second access point. Such movements are not physically possible, so by smoothing the trajectory, the trajectory may become more accurate and more useful for further analyses.

Once a transportation mode is determined in block 622, an average speed may be determined in block 624. The average speed may be calculated from the end points of a trajectory segment.

A baseline speed range for the travel segment may be determined from historical data in block 626. The baseline speed may be used as a comparison to determine whether the observed speeds appear appropriate. For each observation in block 628, a speed comparison may be made in block 630. If the speed appears appropriate in block 630, no changes may be made. If the speed does not appear to be appropriate in block 630, the observed location may be adjusted in block 632 to meet the speed limits determined from the historical data.

After analyzing each segment in block 620, descriptors may be added to each segment in block 634. The descriptors may include transportation mode, averages speed, and other metadata. Demographic information may be added in block 636 describing the user.

After analyzing each sequence in block 616, the trajectories may be stored in block 638.

Figure 7:
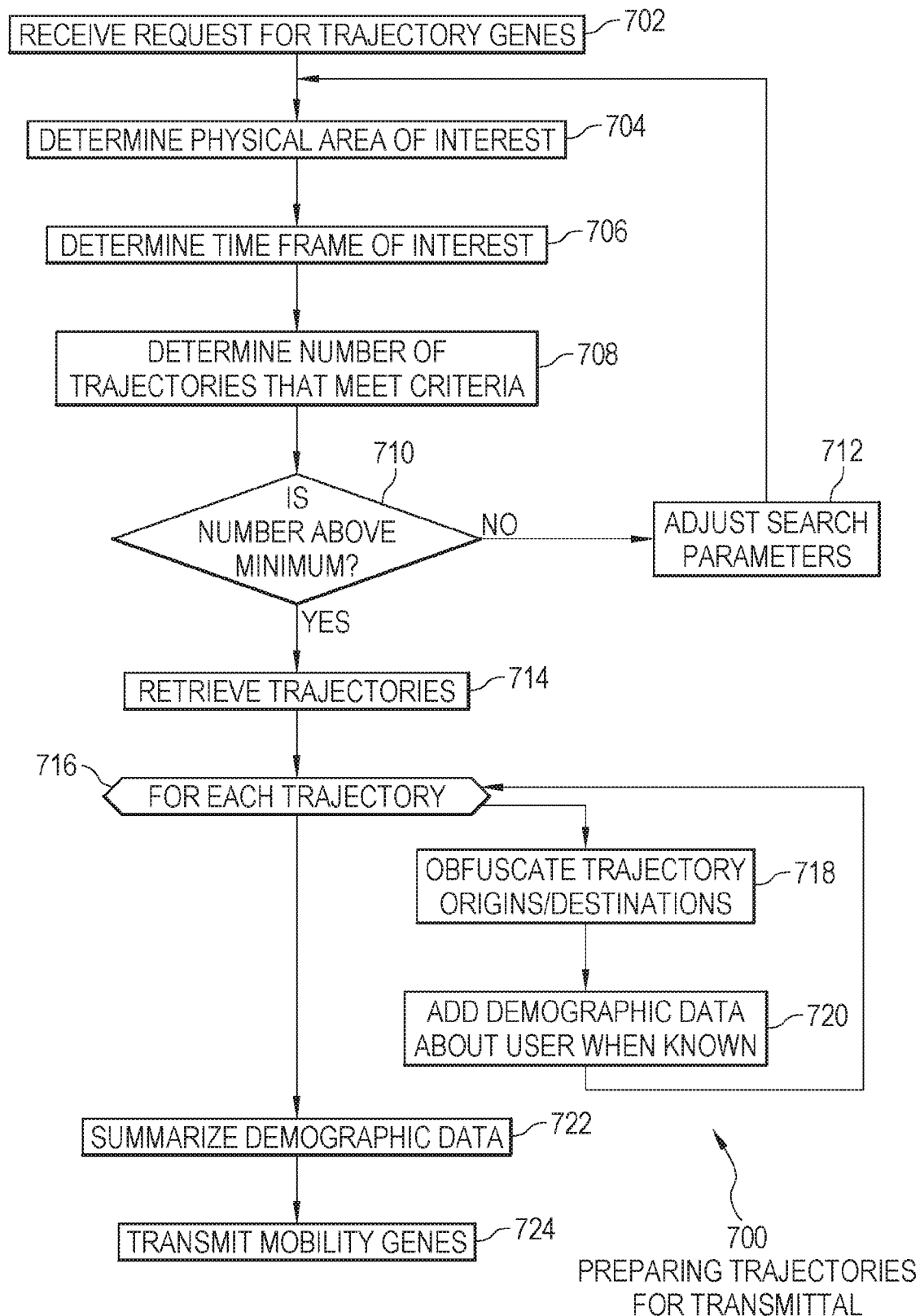
FIG. 7 is a flowchart illustration of an embodiment showing a method for preparing trajectory mobility genes for transmittal.

FIG. 7 is a flowchart illustration of an embodiment 700 showing a method for preparing trajectory mobility genes for transmittal. The method of embodiment 700 may be merely one example of how trajectories may be prepared for use.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 700 may illustrate one method by which a request for trajectory mobility genes may be fulfilled. The fulfillment method may ensure that there may be a sufficient number of trajectories such that individual trajectories may not be separately identifiable. In some cases, the trajectories may also be obfuscated.

A request for trajectory genes may be received in block 702.

The request may define a physical area of interest in block 704. The physical area of interest may be a specific physical location, such as people traveling along a highway or people traveling towards a sporting event. In some cases, the physical area of interest may be a category, such as people going out to eat, where the category may define the destination as any restaurant.

A time frame of interest may be defined in block 704. The number of available trajectories that meet the physical location and time frame criteria may be determined in block 706. If the number is below a predefined minimum number of trajectories in block 708, the search parameters may be adjusted in block 710 to include additional trajectories.

The minimum number of trajectories may be selected for any of many reasons. In some cases, a minimum number of trajectories may allow a mobility gene to anonymize the data such that a single trajectory may not be individually identified. In many cases, a summarized demographic profile may be provided with the trajectories, and when a low number of trajectories may be provided, it may be possible to single out a trajectory as possibly belonging to an outlier in the demographic profile.

Another reason for using a minimum number of trajectories may be to ensure relatively accurate subsequent analyses. A small set of trajectories may give highly skewed results in some cases, and by having larger datasets, more meaningful results may be calculated with higher confidence intervals.

The trajectories meeting the criteria may be retrieved in block 714. For each trajectory in block 716, the trajectory origins or destinations may be obfuscated in block 718, and demographic data may be collected in block 720.

The obfuscation of the trajectory may be accomplished in several different methods. One way to obfuscate a trajectory may be by truncating a trajectory. One use case may be to use trajectories to determine the density of riders on a subway system. The density may be derived from the number of trajectories from one train station to the next, but the analyses does not need to include origin and destination. By truncating the trajectories to just the portion from one train station to the next, anonymity may be preserved.

One way to obfuscate a trajectory may be to summarize an origin or destination. A person may be personally identified when that person begins or ends their journey from their home address. In such cases, a trajectory may be anonymized by using a centralized location as a substitute for a home address. For example, a centralized location in a housing district may be substituted for a user's home address in their trajectory. Such a substitution may be made with a work address or some other origin or destination.

Another way to obfuscate a trajectory may be to truncate a trajectory at a common location near the origin or destination. For example, a person why may travel by subway to their home may have their trajectory truncated at the train station where they alight.

After analyzing all of the trajectories in block 716, the demographic data may be summarized for the group of trajectories in block 722. The mobility genes may be transmitted in block 724.

Figure 8:
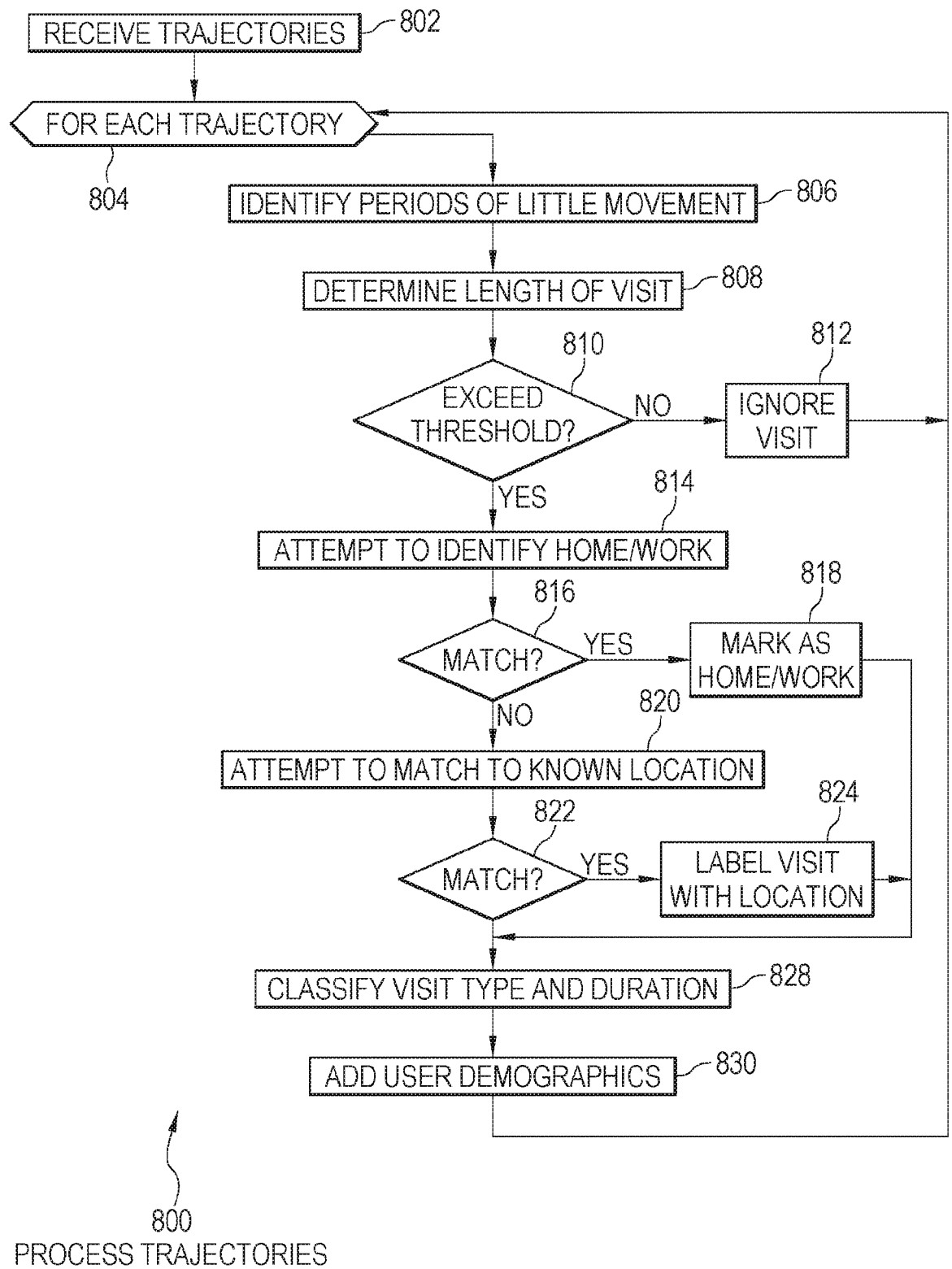
FIG. 8 is a flowchart illustration of an embodiment showing a method for processing trajectories into visit mobility genes.

FIG. 8 is a flowchart illustration of an embodiment 800 showing a method for creating visit mobility genes from trajectory genes. The method of embodiment 800 may be merely one example of how visit genes may be created.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 800 may be one example of how to create a visit mobility gene. A visit mobility gene may give various information and statistics about people's visits to certain locations. In some cases, a data consumer may wish to find information about people's visits to a specific location, such as a shopping mall, recreational venue, a specific coffee shop, or other location.

In other cases, a data consumer may wish to find information about people's visits to certain classes of locations, such as fast food restaurants, grocery stores, or some other category.

Embodiment 800 may be one way to identify visits from trajectories. In this method, places where a person's trajectory pauses or remains within a certain area may be considered visits. Once a visit may be identified, the visit may be matched to a known physical location, then the visit may be classified, and demographics may be added.

The operations of embodiment 800 may be an example of an analysis that may be performed any time a trajectory may be generated. In some systems, trajectory mobility genes may be constantly generated from recently generated data. As each trajectory may be created, a visit analysis such as embodiment 800 may be performed to identify, classify, and store visits in a database.

Trajectories may be received in block 802. For each trajectory in block 804, a period of little movement may be identified in block 806. The period of little movement may be analyzed in block 808 to determine a length of visit. If the visit does not exceed a minimum threshold in block 810, the visit may be ignored in block 812.

When the visit exceeds a threshold in block 810, an attempt may be made to identify home or work location in block 814. The home or work location of a person may be visited very frequently, typically every day.

The home and work location of a person may be a special category of locations for several reasons. For example, many movement studies may involve people's movements to and from work or home. As another example, home and work locations may be a way to identify a trajectory as belonging to a specific person.

If a match for home or work is made in block 816, the visit may be marked as home or work in block 818. When the visit is not to home or work, an attempt may be made in block 820 to match the visit to a known location. If there is a match in block 822, the visit may be marked with the location in block 824.

The matching in block 820 may be to attempt to match a visit to a business, organization, physical feature such as a park, or some other metadata about a location. Such metadata may enrich the data stored for a visit. For example, a visit near a grocery store that takes 20 minutes or so may be classified as a visit to the grocery store. Such grocery store visits may be searched and aggregated into a visit mobility gene for further analysis.

The visit type and duration may be classified in block 826 and demographic information may be added in block 828. The visit mobility gene information may be stored in block 830.

Figure 9:
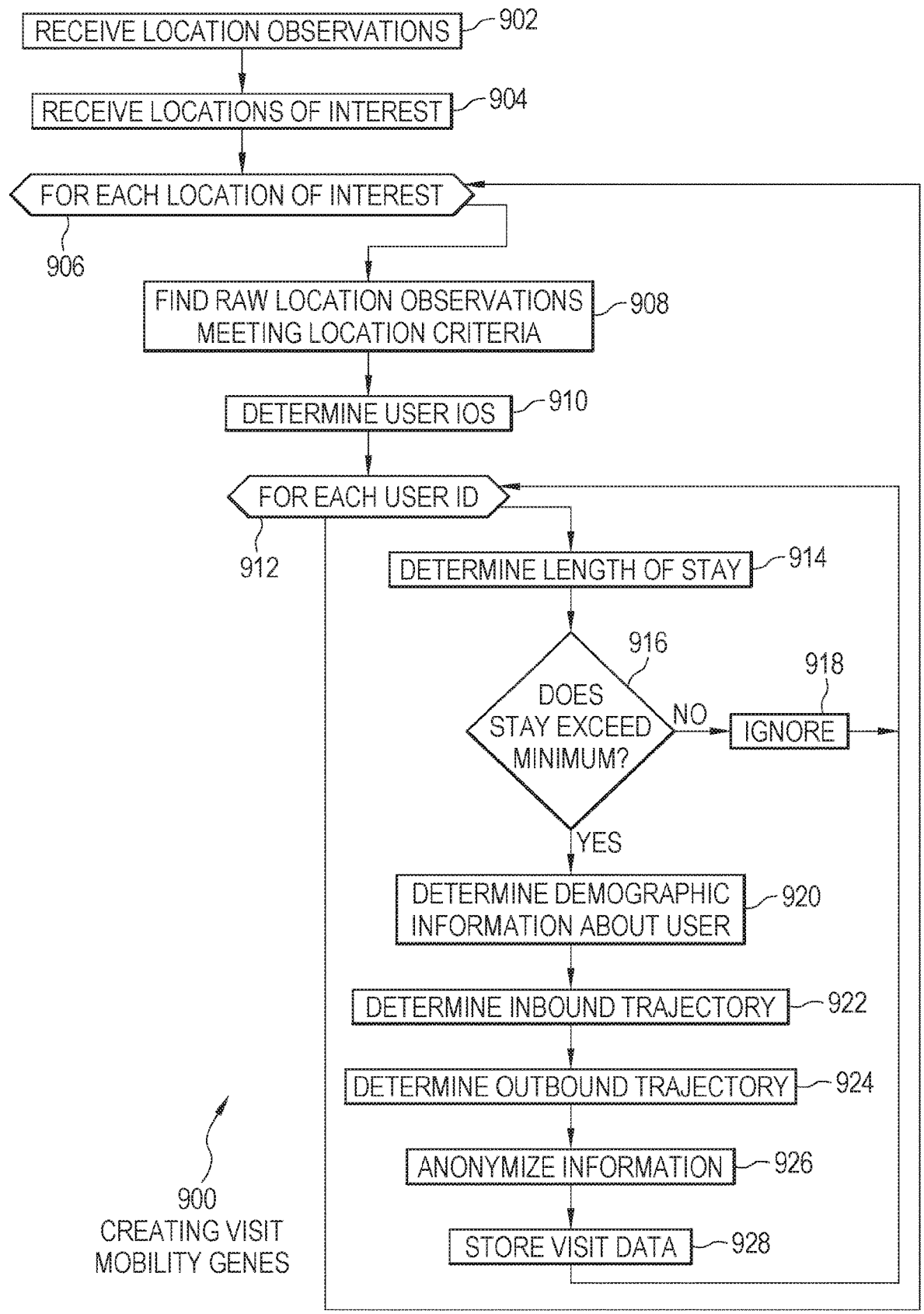
FIG. 9 is a flowchart illustration of an embodiment showing a method for processing raw location observations into visit mobility genes.

FIG. 9 is a flowchart illustration of an embodiment 900 showing a second method for creating visit mobility genes. The method of embodiment 900 may be merely one example of how visit mobility genes may be created from raw location observations.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 900 may be another way of identifying and classifying visits as part of a visit mobility gene. In this method, a set of locations is given, and the raw observation data may be searched to find occasions where the location was visited. From these data points, various aspects of a visit mobility gene may be derived.

Raw location observations may be received in block 902, as well as a set of locations of interest in block 904.

For each location of interest in block 906, raw location observations meeting the location criteria may be found in block 908. The user identifications for those observations may be found in block 910.

For each user identification in block 912, a length of stay may be determined in block 914. If the stay does not exceed a minimum value in block 916, the visit may be ignored in block 918.

When the visit does exceed the minimum value in block 916, the demographic information about the user may be gathered in block 918.

An inbound trajectory may be calculated in block 920 and an outbound trajectory may be determined in block 922. The inbound and outbound trajectories may be useful to help understand visitor's movements before and after the visit.

In some cases, the visit information may be anonymized. For example, inbound and outbound trajectories may be truncated or otherwise obfuscated. The visit data may be stored in block 928.

Figure 10:
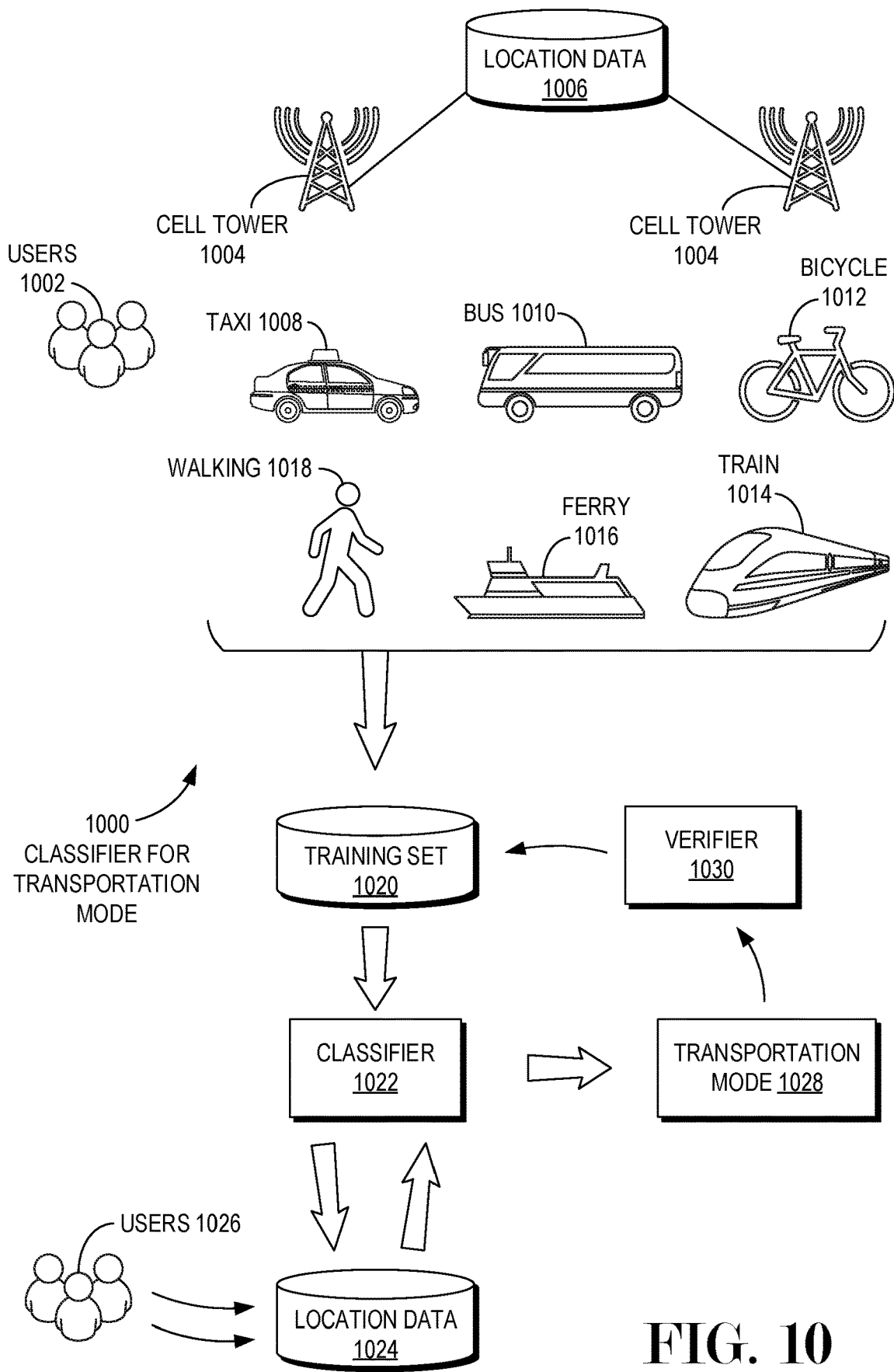
FIG. 10 is a diagram illustration of an embodiment showing a classification engine for transportation mode determination.

FIG. 10 is a diagram illustration of an embodiment 1000 showing a module that may classify trajectory segments by transportation mode. A group of users 1002 may generate location data 1006 that may be collected from various cell towers 1004 as the users 1002 travel by taxi 1008, bus 1010, bicycle 1012, train 1014, ferry 1016, walking 1018, or any other transportation mode.

The location data 1006 may be processed into a training set 1020. The training set 1020 may contain trajectory segments with known or verified transportation modes associated with the segments. The training set 1020 may be used by a classifier 1022 to analyze unknown trajectory segments and location data 1024 generated by unknown users 1026 to determine their transportation mode 1028.

The transportation mode 1028 may be stored along with a trajectory gene for analysis. The transportation mode 1028 may be stored as metadata or some other type of data.

A verifier 1030 may analyze some or all of the transportation modes 1028 to determine if the classification was correct. When the classification may be verified, the training set 1020 may be updated.

Figure 11:
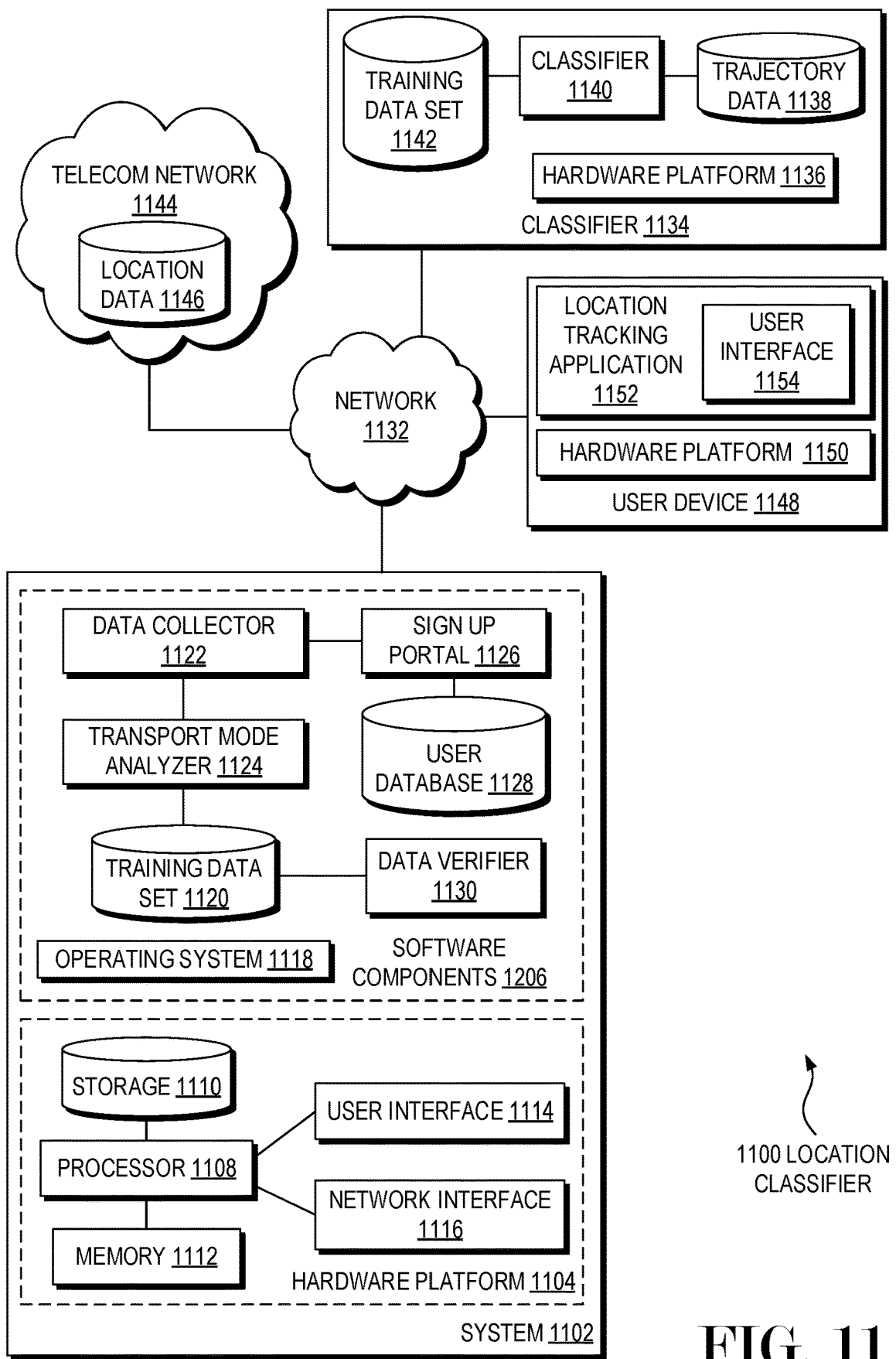
FIG. 11 is a diagram illustration of an embodiment showing a network architecture for systems that classify trajectory segments by transportation mode.

FIG. 11 is a diagram of an embodiment 1100 showing components that may classify trajectory data by transportation mode. The example of embodiment 1100 is merely one topology that may be used to analyze location data.

The diagram of FIG. 11 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 1100 illustrates a device 1102 that may have a hardware platform 204 and various software components. The device 1102 as illustrated represents a conventional computing device, although other embodiments may have different configurations, architectures, or components.

In many embodiments, the device 1102 may be a server computer. In some embodiments, the device 1102 may still also be a desktop computer, laptop computer, netbook computer, tablet or slate computer, wireless handset, cellular telephone, game console or any other type of computing device. In some embodiments, the device 1102 may be implemented on a cluster of computing devices, which may be a group of physical or virtual machines.

The hardware platform 1104 may include a processor 1108, random access memory 1110, and nonvolatile storage 1112. The hardware platform 1104 may also include a user interface 1114 and network interface 1116.

The random access memory 1110 may be storage that contains data objects and executable code that can be quickly accessed by the processors 1108. In many embodiments, the random access memory 1110 may have a high-speed bus connecting the memory 1110 to the processors 1108.

The nonvolatile storage 1112 may be storage that persists after the device 1102 is shut down. The nonvolatile storage 1112 may be any type of storage device, including hard disk, solid state memory devices, magnetic tape, optical storage, or other type of storage. The nonvolatile storage 1112 may be read only or read/write capable. In some embodiments, the nonvolatile storage 1112 may be cloud based, network storage, or other storage that may be accessed over a network connection.

The user interface 1114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 1116 may be any type of connection to another computer. In many embodiments, the network interface 1116 may be a wired Ethernet connection. Other embodiments may include wired or wireless connections over various communication protocols.

The software components 1106 may include an operating system 1118 on which various software components and services may operate.

A training set 1120 may contained verified transportation modes for trajectory segments. The verified transportation modes may come from a data collector 1122, which may interact with users to collect transportation mode data. A transportation mode analyzer 1124 may also create verified transportation mode information by using secondary data sources to verify transportation mode.

A data collector 1122 may operate with a sign up portal 1126 and a user database 1128 to manage an application that may collect transportation modes for the users. An application may operate on a user device 1148, which may have a hardware platform 1150 on which a location tracking application 1152 may operate with a user interface 1154.

The location tracking application 1152 may collect a user's location information, then ask the user to confirm their transportation mode. The location tracking application 1152 may obtain permission to track the user's location through a sign up portal 1126. As location information may be collected, a user may enter their transportation mode through the user interface 1154.

For example, a user may sign up to participate through the sign up portal 1126 and may be entered into a user database 1128. The user may download and install the location tracking application 1152 onto their user device 1148. As the user begins traveling, such as commuting to work, going to a recreational activity, going shopping, or traveling to another location, the user's motion may be captured in a series of location data. Typically, the location data may be location coordinates along with timestamps of each coordinate.

The user's location coordinates may be analyzed to identify trajectories. In many cases, a user's trajectory may be further analyzed to identify trajectory segments where each segment may represent a different mode of transportation. For example, a commute to work may include riding a bicycle to a train station, taking a train into a central business district, then walking to their final destination.

The data collector 1122 may collect the user's trajectory, then the transport mode analyzer 1124 may identify and separate the trajectory into separate segments. The user may be queried through the user interface 1154 to verify whether they were walking, riding a bicycle, riding a train, or some other transportation mode.

In some cases, the transport mode analyzer 1124 may make a guess or assumption about the transportation mode, then ask the user to verify the transportation mode. In our example, the user's speed while riding a bicycle may indicate that the user may be traveling faster than a pedestrian but less than a car or taxi. The assumption may be that the user rode a bicycle during the segment, and the user may be presented with a map showing their route, then solicit input to verify that they user was riding a bicycle.

As the user verifies a trajectory segment, that segment and the classified transportation mode may be stored in the training data set 1120. Over time, the training data set 1120 may be populated with many hundreds, thousands, or even millions of classified trajectory segments. As the training data set 1120 is populated and updated, it may be published for use by a classifier system 1134.

A classifier system 1134 may be connected over a network 1132 to the device 1102. The classifier system 1134 may operate on a hardware platform 1136 and may analyze trajectory data 1138 using a classifier 1140 to compare to the training data set 1142. The classifier 1140 may compare a given trajectory segment to classify the segment with a transportation mode. In many cases, a classifier 1140 may determine a classification with a probability or closeness to a match.

A classifier system 1134 may operate in real time by classifying trajectories as those trajectories are captured from location data 1146 provided by a telecom network 1144. In other uses, a classifier system 1134 may operate in batch mode by analyzing historical trajectory segments that may be identified for analysis.

Some systems may have a data verifier 1130 which may compare the machine-classified trajectory segments with an alternate data source. For example, a user's trajectory may be classified as traveling by car or taxi. The user may be contacted afterwards to verify that the segment was indeed taken by car. If the user corrects the trajectory, such as by identifying the segment as by bus, the training data set may be updated accordingly.

Some systems may verify classification by accessing auxiliary or third party data. For example, a user may use a mass transit pass to travel by bus or train. Such transits may be cross referenced with the user's trajectory segments and the segments may be classified or verified using the auxiliary data.

Figure 12:
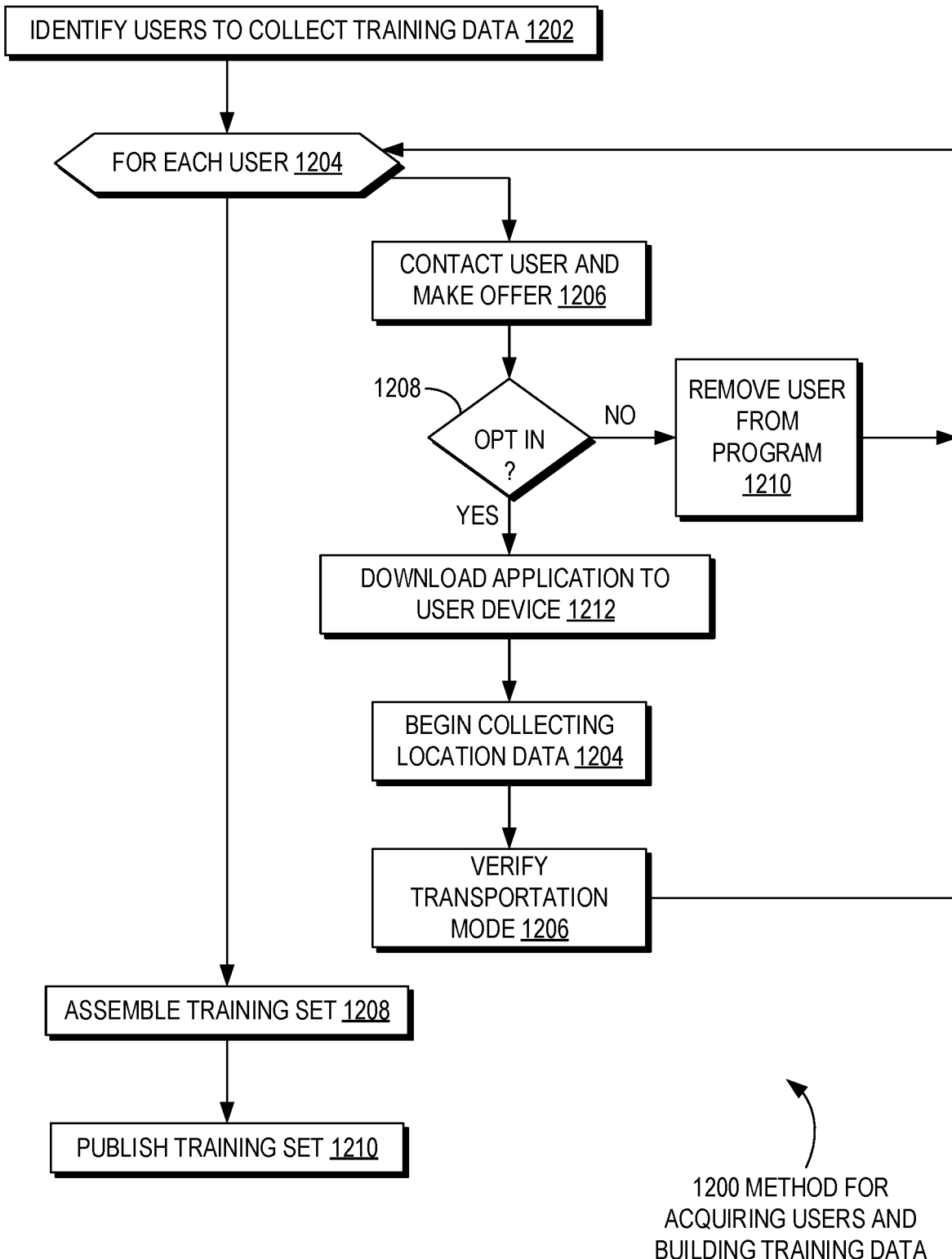
FIG. 12 is a flowchart illustration of an embodiment showing a method for acquiring users and building training data.

FIG. 12 is a flowchart illustration of an embodiment 1200 showing a method for acquiring users and building training data. The method of embodiment 1200 may be merely one example of how training data may be collected.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1200 may illustrate one method for collecting location data along with transportation mode data to create a training data set.

Users may be identified in block 1202 that may be interested in participating in a data collection operation. In many cases, users may be recruited and offered a discount, free items, or other incentives to participate.

For each user in block 1204, the user may be contacted and made an offer in block 1206. If the user does not elect to participate in block 1208, the user may be removed from the program in block 1210. Those that may elect to participate may also agree to have their locations tracked and may agree to answer questions about the transportation mode.

When a user opts in to participate in block 1208, an application may be downloaded in block 1212 and installed on the user's device. Location data may begin to be collected in block 1214 and the user may verify the transportation mode in block 1216.

As the users are contacted and begin data collection and verification in block 1204, a training data set may be assembled in block 1208 and published in block 1210.

Figure 13:
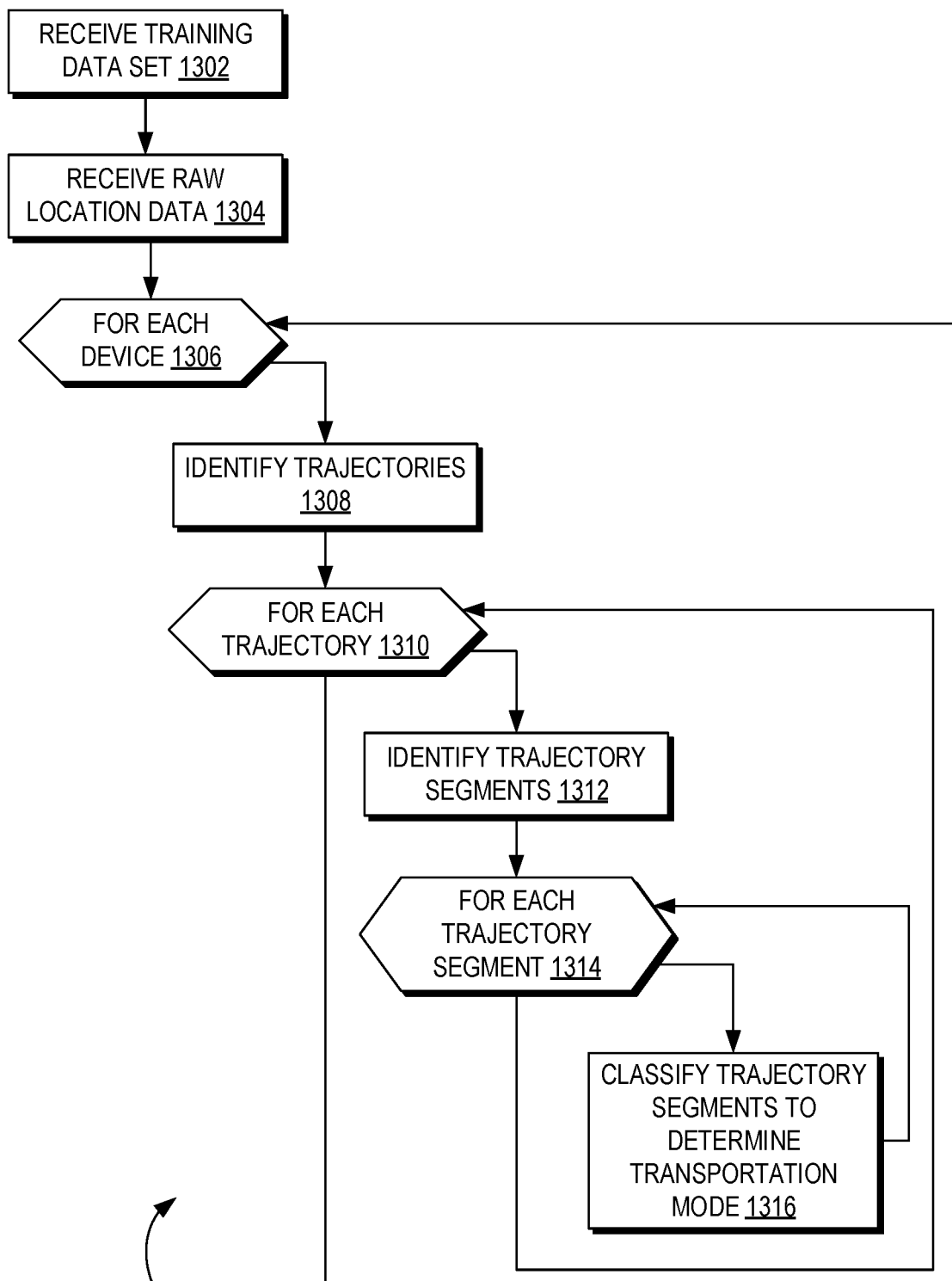
FIG. 13 is a flowchart illustration of an embodiment showing a method for classifying location data to determine transportation mode.

FIG. 13 is a flowchart illustration of an embodiment 1300 showing a method for classifying location data to determine transportation mode.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A training data set may be received in block 1302 along with raw location data in block 1304. In many cases, the raw location data may have device identifier associated with the data.

For each device in block 1306, trajectories may be identified in block 1308. A trajectory may be a sequence of location coordinates with timestamps that shows movement of a device through a network, such as a telecom network.

Each trajectory may be analyzed in block 1310 and trajectory segments may be identified in block 1312. A trajectory segment may be a portion of a trajectory that may indicate a separate mode of transportation. For example, a trip may include driving to a location and walking from a parking structure to a final destination, or another trip may include walking to a bus stop, riding a bus for a period of time, and walking the remaining portion of a journey. Each trajectory segment may be analyzed in block 1314 to determine the transportation mode in block 1316.

The analysis of block 1316 may use machine classification techniques to compare a training data set to an unknown or new trajectory. The classification analysis may find a closest match between the training data set and the unknown trajectory segment, resulting in an estimated transportation mode. In many cases, such classification engines may return an estimated classification match along with a probability or confidence indication.

Figure 14:
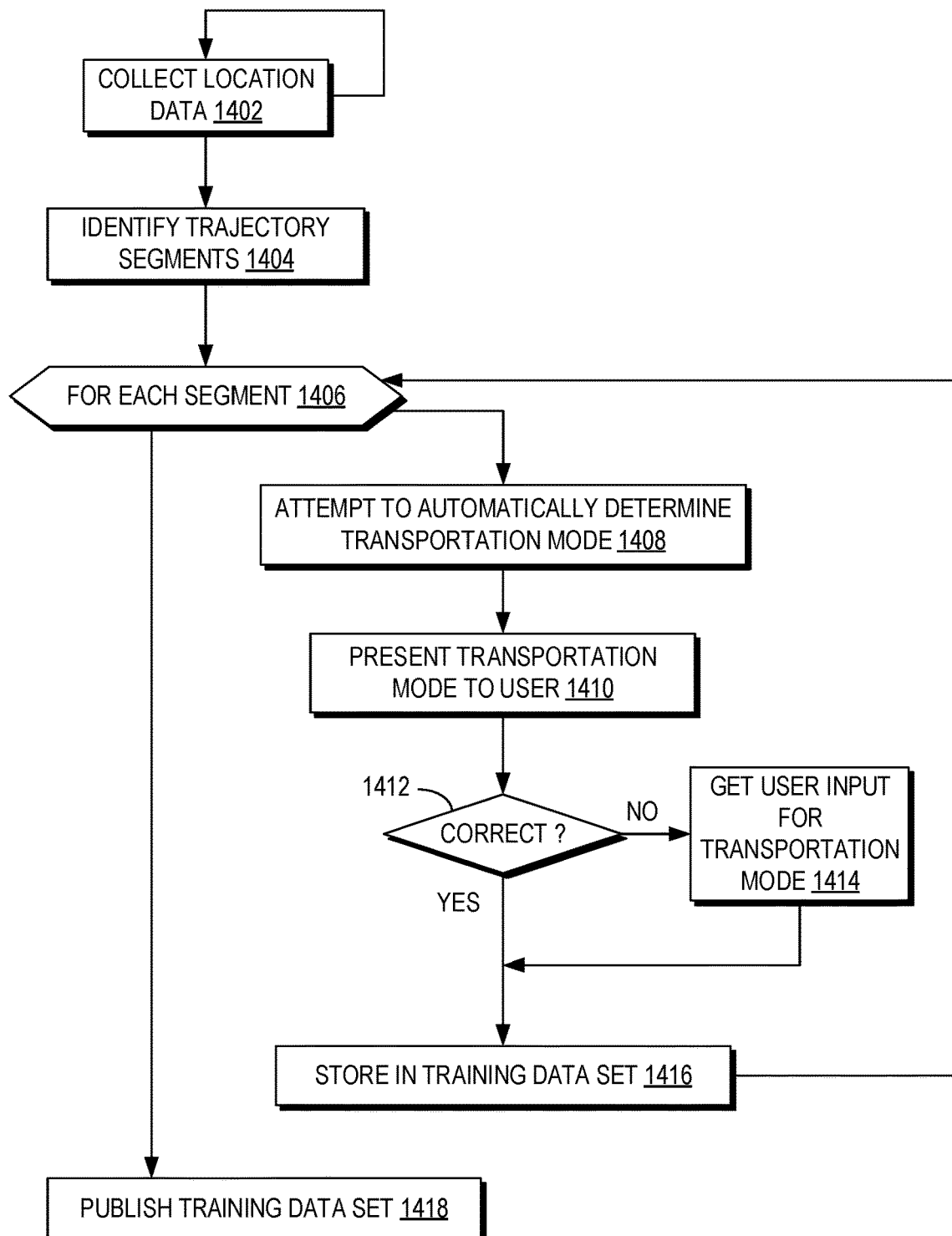
FIG. 14 is a flowchart illustration of an embodiment showing a method for generating training data from users.

FIG. 14 is a flowchart illustration of an embodiment 1400 showing a method for generating training data from users.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1400 may represent the operations that may occur with a user to collect trajectory segment data, then query the user to verify the transportation mode associated with the trajectory segment.

Location data may be collected in block 1402. Location data may be coordinates with a timestamp from which trajectory segments may be identified in block 1404.

For each segment in block 1406, an attempt may be made in block 1408 to automatically determine a transportation mode. The automated attempt may be to compare a transportation segment to existing segments in a training data set to classify the segment.

In other cases, an automated attempt may use heuristics or other mechanisms to attempt to determine a transportation. One example of a heuristic may involve determining a maximum speed observed for the segment, then determining a subset of transportation modes. For example, a fast and sustained movement may eliminate walking or bicycle riding as candidate modes. In another example, some locations may indicate that the user may be traveling by subway, such as when a user's device may be detected inside a subway tunnel.

The user may be presented with options for the transportation mode in block 1410. When an automated determination may be made for the transportation mode, such information may be presented to the user to confirm or correct the transportation mode. When a suggested mode may be presented, the user may only need to confirm in most cases.

If the transportation mode may be not be correct in block 1412, the user may respond with the correct mode in block 1414. When the transportation mode is correct in block 1412, or when the user responds with the correct mode in block 1414, the transportation segment and mode may be added to a training set in block 1416.

The training set may be published for use by classification engines in block 1418.

Figure 15:
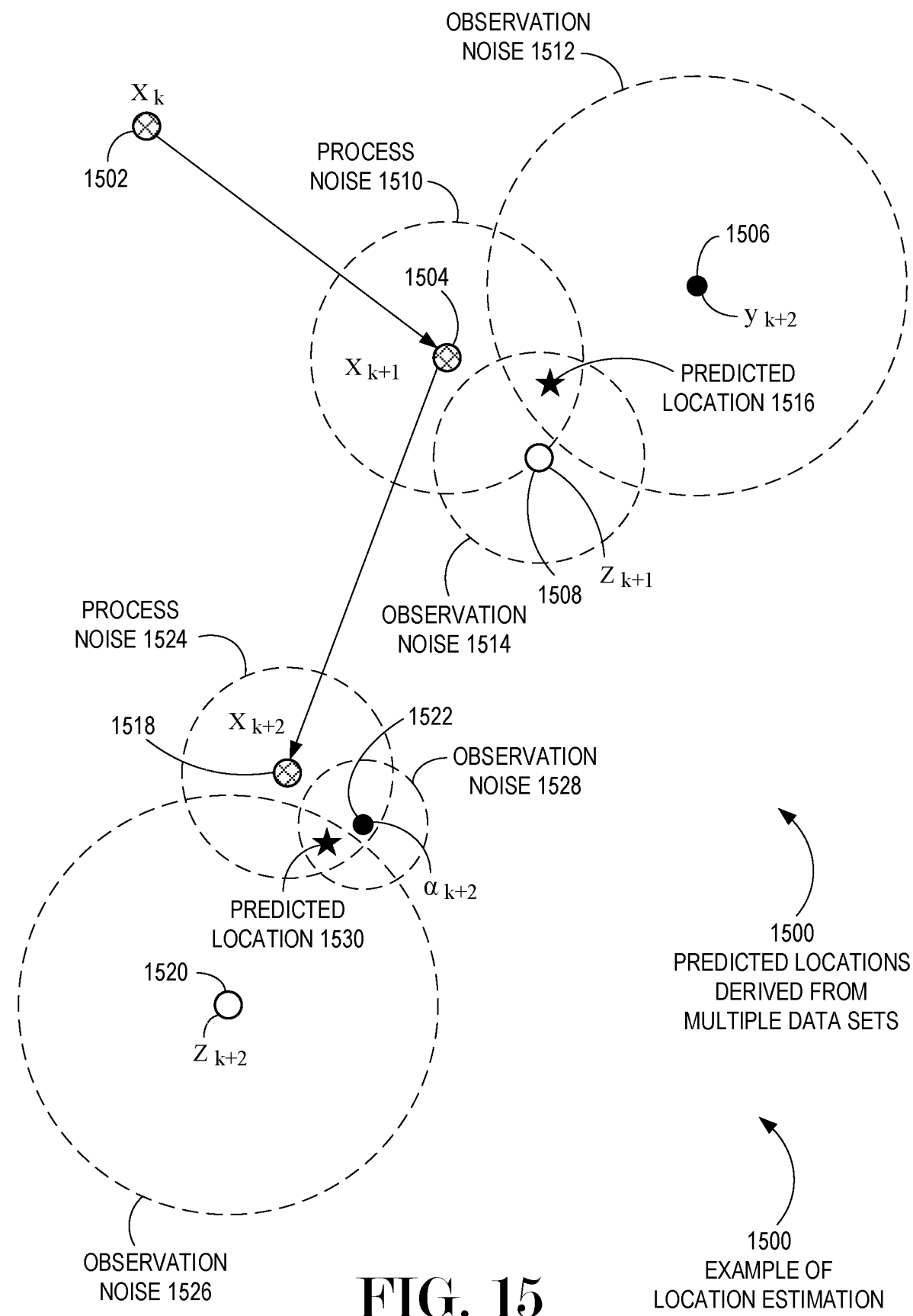
FIG. 15 is a diagram illustration of an embodiment showing a sequence of trajectory steps and calculations for them.

FIG. 15 is a diagram illustration of an example embodiment 1500 showing location estimation. With each location in a trajectory, multiple data sources may be combined to yield a predicted location. The predicted location may be a more accurate estimation of a device's location than if a single data source may have been used.

Location data gathered for mobile devices may come from multiple sources, including location coordinates gathered from wireless networks. Each data source may have different characteristics, such as accuracy or error ranges. Some sources may be more accurate than others, but some of the sources may not be available for each step of a trajectory.

For example, many wireless networks may track the movement of a device by recording the cell, antenna, or other connection point. Such a data point may indicate that the device was within the range of the connection point and therefore such a data point may represent one set of coordinates from which a location may be estimated. In many cases, a wireless network may store the coordinates of the antenna, tower, or other device as an approximate location for the device. Such coordinates may be relatively inaccurate because the device may be anywhere inside the coverage area of the connection point.

Some networks may be able to triangulate the location of a device through two, three, four, or more connection points. Such coordinates may be significantly more accurate than using the raw location of the connection point.

The accuracy or error range of a given device may be affected by geography, weather, and other factors. For example, wireless signals may reflect off of buildings or may be obscured in some manner. Cells may be designed with different sizes and geometries based on the anticipated traffic as another example.

Global Positioning System (GPS) receivers may be found in many mobile devices. However, GPS receivers may not be used at all times due to the power consumption of the receivers. In many cases, GPS receives may be used only when specific applications may be executing on a device, such as when a user may be accessing a map application that may be providing directions for example. During other times, the GPS receiver may be turned off.

In the example of such a calculation may be illustrated in embodiment 1500. A location 1502 may be at time k. At time k+1, a set of coordinates x at 1504 may be illustrated. The x coordinates may be predicted coordinates based on the estimated speed and direction of the device. At the same time period, two other observations may be present, y at k+1 1506 and z at k+1 at 1508. Each of the observations may have different process noise 1510, 1512, and 1514. The process noise in this illustration is an example of an error range for the observations.

Each error range or process noise may give a relative value of the reliability of the observation. Observations with high error ranges or process noise may be less reliable than those with smaller error ranges or process noise.

Taking into account the relative positions of the observations along with the error ranges or process noise, a calculated predicated location 1516 may be shown.

In the next step, k+2, the x observation 1518 is shown, along with the z observation at k+2 at 1520 and a at k+2 at 1522. The respective process noise is shown at 1524, 1526, and 1528. A calculated predicted location 1530 may be shown as well.

In a typical trajectory using cellular telephone data, one time period may have a cell tower location and a triangulated position available, while the next one may have GPS and a triangulated position available. Since GPS coordinates may be more accurate than many other location data sources, the accuracy or reliability of each trajectory location may vary from one time period to the next. In many cases, some time periods may be known with much more accuracy or reliability than others.

FIG. 16 is a diagram illustration of an embodiment 1600 showing two illustrations 1602 and 1604 of cell sites.

The examples of embodiment 1600 are derived from actual observations of GPS coordinates taken while in contact with a cell site. In illustration 1602, the cell site 1606 is illustrated along with several GPS locations 1608. Similarly, illustration 1604 shows cell site 1610 and GPS observations 1612.

The illustrations show that within a cell site, there may be a large range of actual locations where a device may connect to the cell site. For the purposes of this discussion, the accuracy of the GPS data may represent the actual, physical location of devices that may be connected to the respective cell sites.

The examples show that if a cell site location were used as an observation for the location of a device, the device may be at any point within the service area of the cell. The service area, for these examples, may be inferred from the location of the GPS observations. This analysis may visibly show the approximate error range or accuracy when using cell site locations as the location coordinates of a trajectory.

Figure 17:
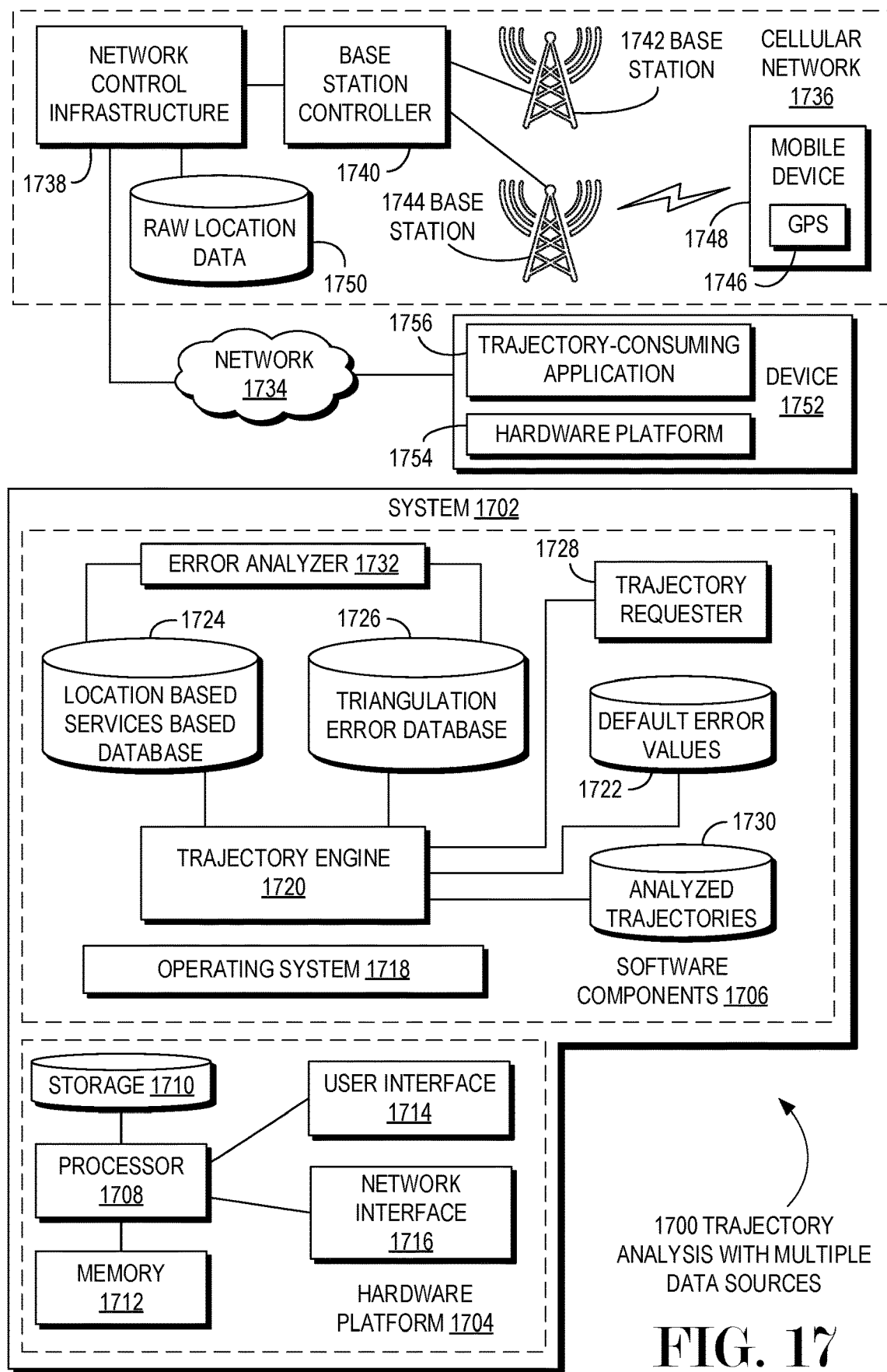
FIG. 17 is a diagram illustration of an embodiment showing a network architecture for analyzing errors and calculated trajectories.

FIG. 17 is a diagram of an embodiment 1700 showing components that may analyze raw location data and produce trajectories. The example of embodiment 1700 is merely one topology that may be used to analyze raw location data.

The diagram of FIG. 17 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 1700 illustrates a device 1702 that may have a hardware platform 204 and various software components. The device 1702 as illustrated represents a conventional computing device, although other embodiments may have different configurations, architectures, or components.

In many embodiments, the device 1702 may be a server computer. In some embodiments, the device 1702 may still also be a desktop computer, laptop computer, netbook computer, tablet or slate computer, wireless handset, cellular telephone, game console or any other type of computing device. In some embodiments, the device 1702 may be implemented on a cluster of computing devices, which may be a group of physical or virtual machines.

The hardware platform 1704 may include a processor 1708, random access memory 1710, and nonvolatile storage 1712. The hardware platform 1704 may also include a user interface 1714 and network interface 1716.

The random access memory 1710 may be storage that contains data objects and executable code that can be quickly accessed by the processors 1708. In many embodiments, the random access memory 1710 may have a high-speed bus connecting the memory 1710 to the processors 1708.

The nonvolatile storage 1712 may be storage that persists after the device 1702 is shut down. The nonvolatile storage 1712 may be any type of storage device, including hard disk, solid state memory devices, magnetic tape, optical storage, or other type of storage. The nonvolatile storage 1712 may be read only or read/write capable. In some embodiments, the nonvolatile storage 1712 may be cloud based, network storage, or other storage that may be accessed over a network connection.

The user interface 1714 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 1716 may be any type of connection to another computer. In many embodiments, the network interface 1716 may be a wired Ethernet connection. Other embodiments may include wired or wireless connections over various communication protocols.

The software components 1706 may include an operating system 1718 on which various software components and services may operate.

A trajectory engine 1720 may process a series of location coordinates into a trajectory. The trajectory may be a sequence of coordinates that may represent the approximate path by which a device may have been observed to have moved. In many cases, a trajectory may be a time series of coordinates, although some embodiments may or may not have a time series with a fixed time interval.

A trajectory engine 1720 may take data from multiple sources when calculating location coordinates for each time step. A set of default error values 1722 may be used as approximation of the error values for locations where more specific error data may not exist. When such error data may exist, the trajectory engine 1720 may use error data from location based services 1724 or from triangulation 1726. Such error databases may be calculated for individual cell sites or other segments.

The trajectory engine 1720 may receive a trajectory request from a trajectory requestor 1728, and may store the results in a database of analyzed trajectories 1730.

An error analyzer 1732 may take raw observations and determine error estimations for location based services as well as triangulated location coordinates. Location based services may refer to location data that gives the location of a cell site or antenna to which a device may connect. Location bases services may be adequate for many location-consuming applications, but may not be as accurate as other data sources.

The error analyzer 1732 may compare GPS coordinates with the coordinates from a location based service or a triangulated location. In general, GPS coordinates may be received with an estimated error or tolerance, which may be significantly more accurate than location based services or triangulated coordinates.

By comparing the GPS locations to coordinates received from location based services or triangulation, an error factor may be calculated for specific cell sites or areas within a geography. Some cell sites or other areas may have very large error factors, while other areas may have smaller error factors. By calculating a predicted location with higher accuracy data, the confidence in the predicted location may be higher.

A network 1734 may be any type of communication network whereby device 1702 may communicate with a cellular network 1736 or other device 1752.

A cellular network 1736 may have a control infrastructure 1738 which may control several base station controllers 1740. Each base station controller 1740 may control several base stations 1742 and 1744. A mobile device 1746 is illustrated as communicating with base station 1744. The mobile device 1746 may have a GPS receiver 1748, which may generate relatively accurate location coordinates.

The network control infrastructure 1738 may collect raw location data 1750 for devices connected to the network. The error analyzer 1732 may analyze the raw location data 1750 to populate the error databases 1722, 1724, and 1726. The trajectory engine 1720 may use the raw location data 1750 to generate trajectories.

A device 1752 may illustrate any type of device operating on a hardware platform 1754 which may consume trajectories in any type of application 1756.

Figure 18:
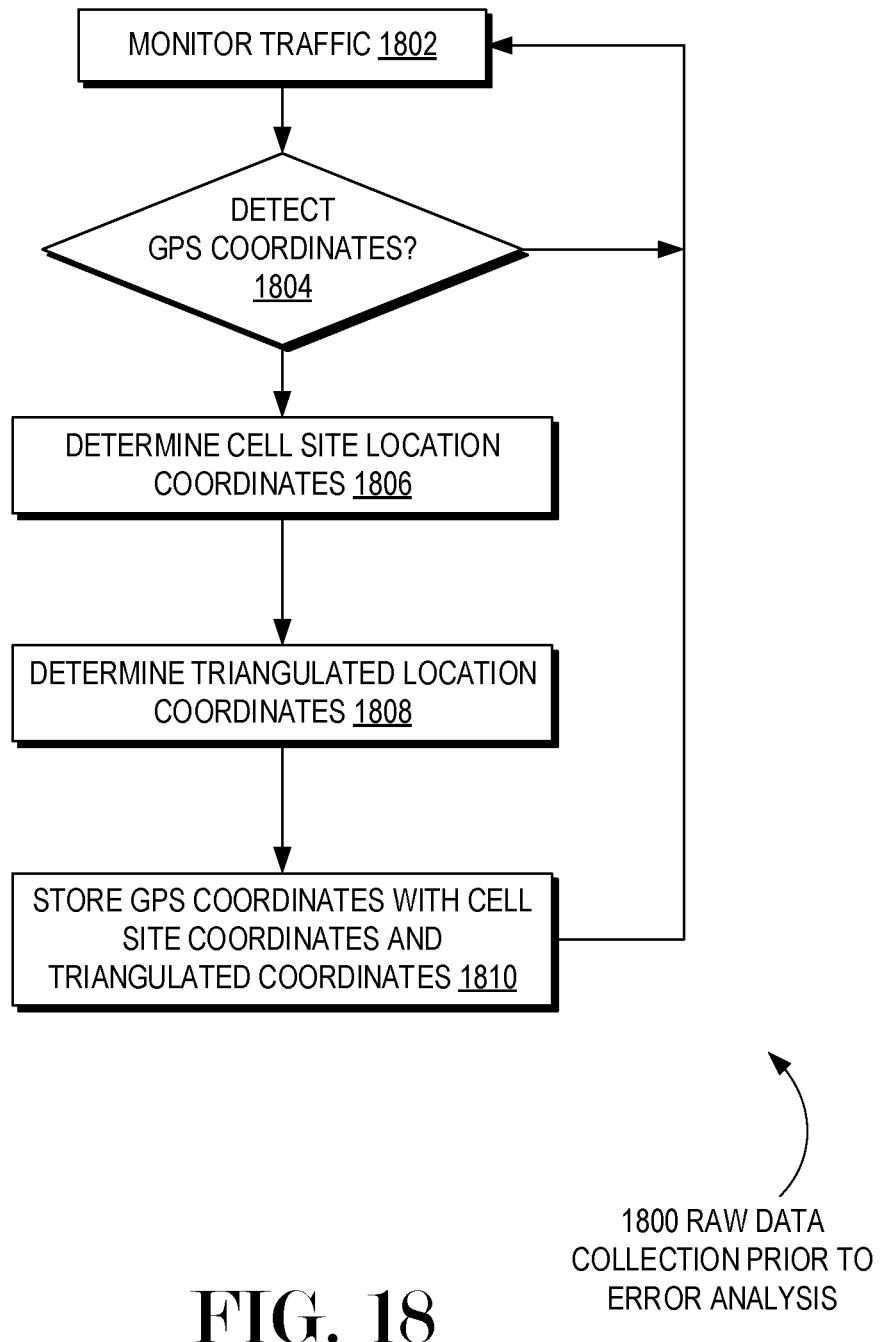
FIG. 18 is a flowchart illustration of an embodiment showing a method for raw data collection prior to error analysis.

FIG. 18 is a flowchart illustration of an embodiment 1800 showing a method for collecting raw data prior to error analysis. The method of embodiment 1800 may be merely one example of how raw data may be collected.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Prior to determining error factors for individual cell sites, a network operator may collect raw data. The raw data may be based on highly accurate though not comprehensive GPS location coordinates. GPS location data may be created by applications running on a mobile device, and GPS location data may be identified by monitoring data traffic through the network. When GPS location is identified, the GPS coordinates may be stored with the available location data provided by the network. These data sets may be correlated into error factors for each cell site, as will be discussed in a later process.

Traffic monitoring may occur in block 1802. Telecommunications networks may routinely monitor data traffic for various administrative functions. When the data include GPS coordinates in block 1804, the cell site location coordinates may be retrieved in block 1806. The cell site location coordinates may be part of a location based service or other mechanism by which a network operator may track the devices that may be attached to the network. Additionally, if a set of triangulated location coordinates are available, such triangulated coordinates may be determined in block 1808.

The GPS coordinates may be stored in block 1810 along with the cell site coordinates and the triangulated coordinates. Such raw data may be processed using a method illustrated in the following figure.

Figure 19:
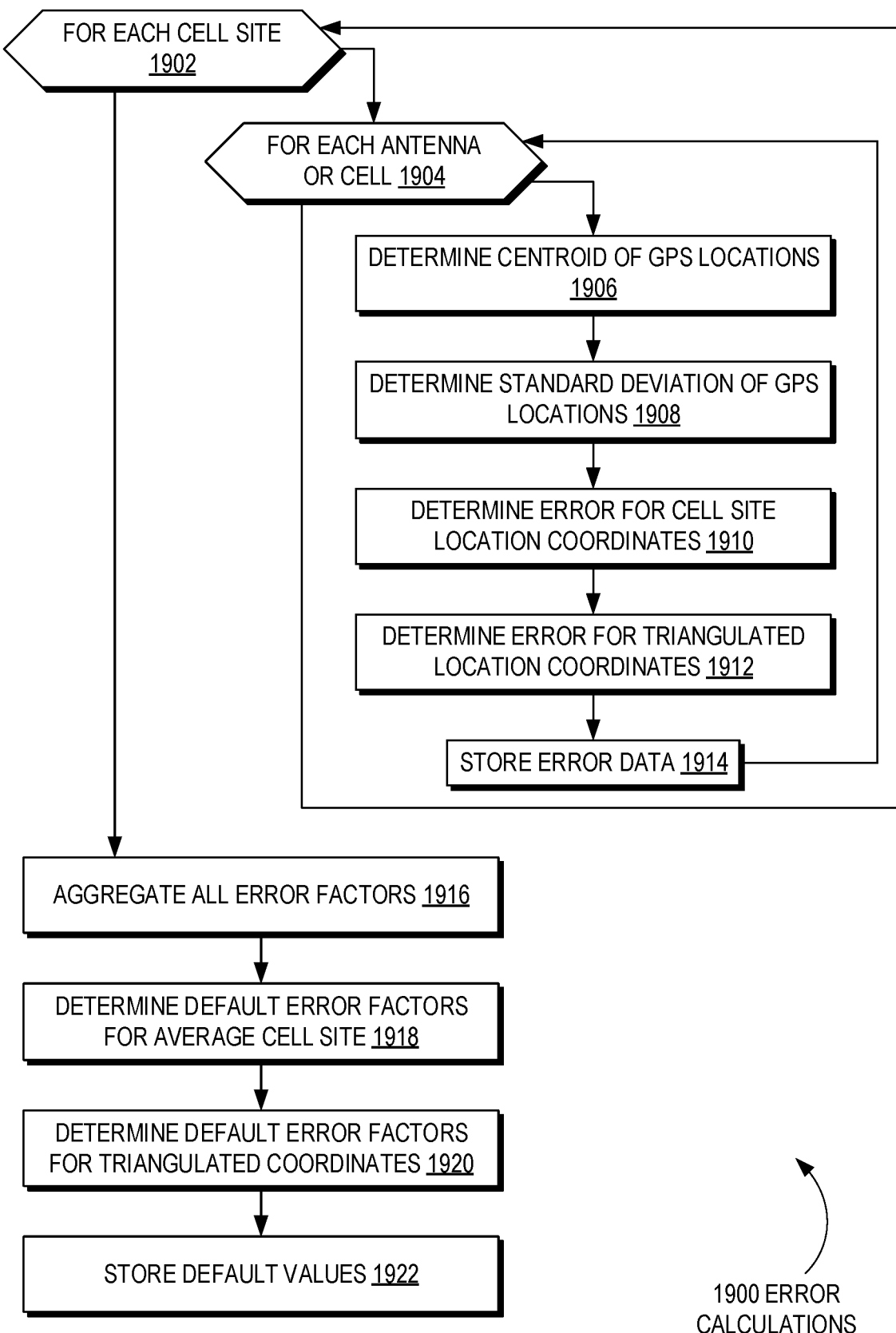
FIG. 19 is a flowchart illustration of an embodiment showing a method for analyzing errors for cell site location coordinates.

FIG. 19 is a flowchart illustration of an embodiment 1900 showing a method for processing raw GPS and other location data to determine error factors for individual cell sites and for triangulated location coordinates. The method of embodiment 1900 may be merely one example of how raw location data may be converted into error factors for individual cell sites and triangulated coordinates.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1900 is one method for determining the error factors that may be associated with the location coordinates associated with individual cell sites. Each cell site may have different geometries, different geographies, different reflections or other physical obstacles, and other factors that may change the accuracy or reliability of location coordinates obtained when monitoring movement of devices in the area.

The method of embodiment 1900 generates error factors for individual cells in a cellular network. The method may operate under the assumption that GPS location coordinates are very accurate and represent the actual location of a device connected to the network inside a cell. By analyzing the GPS location coordinates within the cell, an error factor may be generated for each cell. The error factors may represent the accuracy, tolerance, or error that may be associated with location based services for that cell, or for triangulated location coordinates generated inside the cell.

Each cell site may be analyzed in block 1902, and for each cell site, each antenna or cell may be analyzed in block 1904. For each antenna or cell inside a cell site or tower, the GPS locations and the associated location based services and triangulated data may be analyzed. Such data may have been collected in the method of embodiment 1800.

A centroid of the GPS locations may be determined in block 1906, along with a standard deviation of those coordinates in block 1908. Using these data points, an error factor for the cell site may be generated in block 1910.

For triangulated location coordinates in block 1912, the GPS coordinates may be compared to the coordinates generated by triangulation to generate error factors for triangulated coordinates.

The error data may be stored in block 1914.

After processing all the cells for each cell site, the error factors may be aggregated in block 1916. A default error factor may be determined in block 1918 for an average cell site. A default error factor may be determined in block 1920 for the average set of triangulated coordinates. The values may be stored in block 1922.

In some cases, there may not be enough data points to reliably calculate error factors for certain cells. An example may be a new cell that may be recently put into service and for which no GPS coordinates may be gathered. Another example may be for cells that have little traffic and for which few GPS coordinates may have been gathered. In such cases, a set of default error factors may be used when calculating a predicted location.

Figure 20:
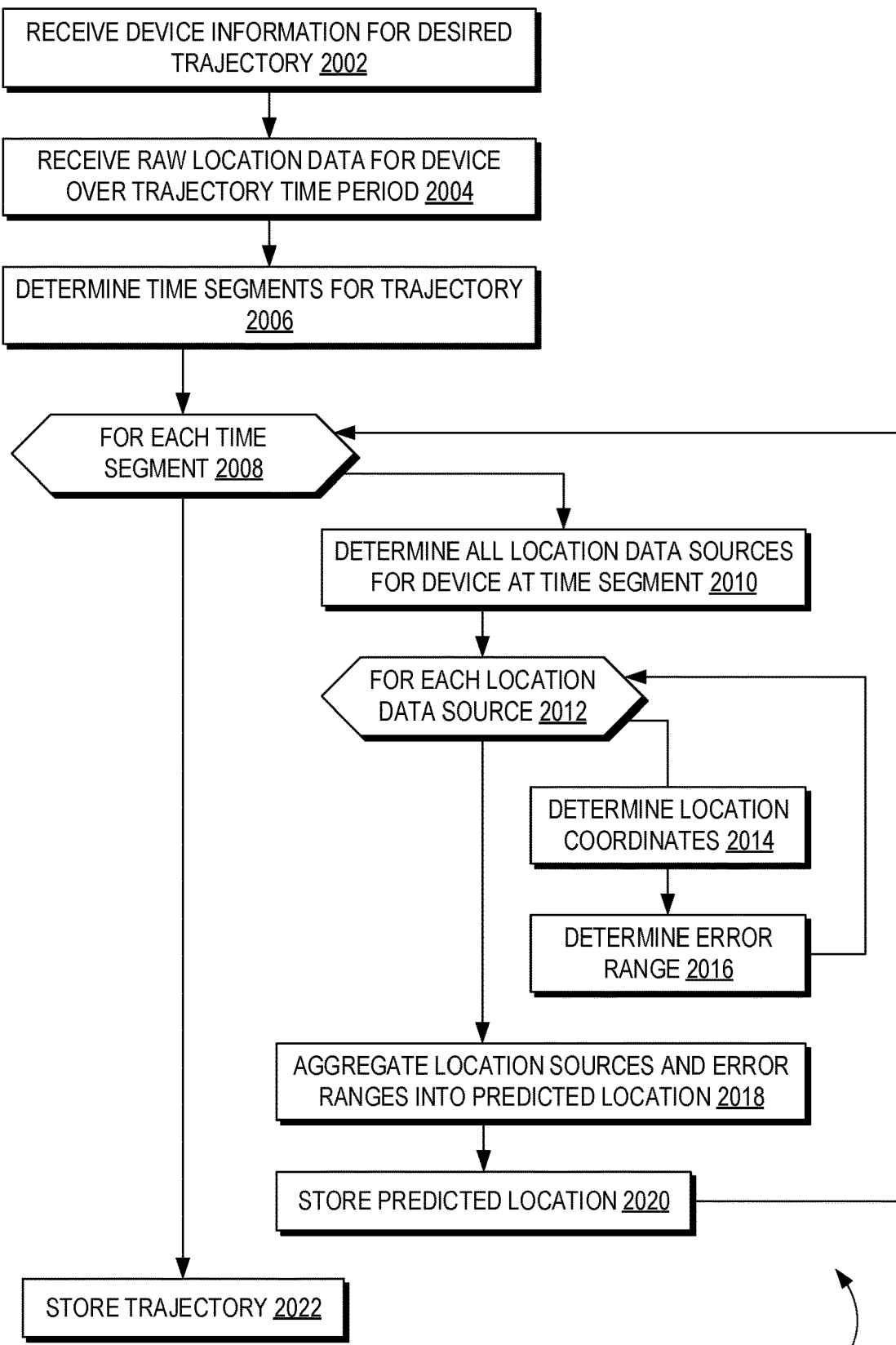
FIG. 20 is a flowchart illustration of an embodiment showing a method for computing a trajectory.

FIG. 20 is a flowchart illustration of an embodiment 2000 showing a method for computing a trajectory using multiple data sources. The method of embodiment 2000 may be merely one example of how a trajectory may be computed.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 2000 illustrates one method of computing a trajectory using multiple data sources. In a typical mobile network, the data sources may include location based services, triangulated coordinates, GPS coordinates, as well as other data sources.

A typical method for estimating motion may be to use a Kalman filter as well as Bayesian tracking. Such methods use error factors that may indicate the reliability or accuracy of a data point.

Information relating to a desired trajectory may be received in block 2002, which may include the raw location data for a device's movements in block 2004. The time segments for the trajectory may be determined in block 2006, and each time segment may be analyzed in block 2008.

For each time segment, all available location data sources may be determined for the device during that segment in block 2010. For each location data source in block 2012, the location coordinates may be determined in block 2014 as well as the error range in block 2016. All the available coordinates and error factors may be aggregated in block 2018 to generate a predicted location, which may be stored in block 2020.

A more detailed method for such an analysis may be shown in a later figure.

After analyzing each time segment in block 2008, the trajectory may be stored in block 2022.

Figure 21:
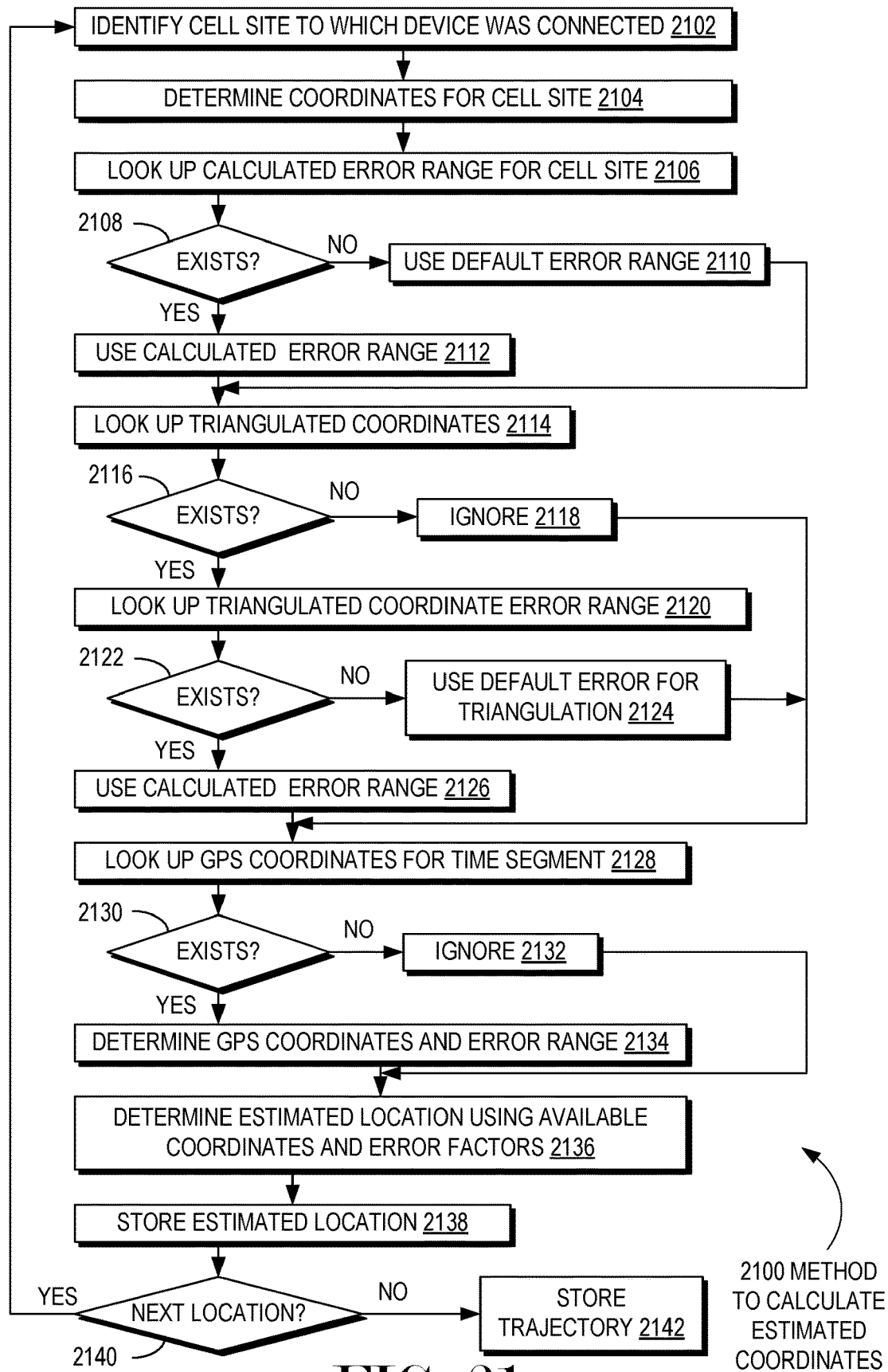
FIG. 21 is a flowchart illustration of an embodiment showing a method for computing an estimated location for a given step in a trajectory.

FIG. 21 is a flowchart illustration of an embodiment 2100 showing a method for calculating estimated coordinates for a trajectory from multiple data sources. The method of embodiment 2100 may be merely one example of how estimated locations may be calculated.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The process of embodiment 2100 may represent a method that may use as many as three different data sources to determine a predicted location for a time period in a trajectory. Other embodiments may use four, five, or more different data sources, or may substitute different data sources for the ones listed. As illustrated, a predicted location may be derived from a location based service, which may provide merely the coordinates for a cell tower or antenna. The location may also be determined from triangulated coordinates, which may be derived from two, three, or more cell sites that may triangulate a position for a device on the network. Additionally, GPS coordinates may also be used.

The cell site to which a device may be connected during the time period of interest may be identified in block 2102 and the coordinates of the cell site may be determined in block 2104.

The error range for the specific cell site may be looked up in block 2016, and if a customized error range is not present in block 2108, the process may use the default error range for all cell sites in block 2110. If the customized error range exists in block 2108, the calculated or customized error range may be used in block 2112.

A look up may occur in block 2114 for triangulated coordinates. If the triangulated coordinates do not exist for the device at the time period of interest in block 2116, the process may ignore triangulated coordinates in block 2118 and the process may proceed to block 2128.

When the triangulated coordinates exist in block 2116, a look up may be performed in block 2120 to determine whether calculated error ranges exist for the cell site for triangulated coordinates. If such an error range does not exist in block 2122, a default error range may be used in block 2124. If the calculated or customized error range does exist in block 2122, the calculated error range may be used in block 2126.

A look up may occur in block 2128 for GPS coordinates. If the GPS coordinates do not exist in block 2130, the GPS coordinates may be ignored in block 2132 and the process may proceed to block 2136.

If the GPS coordinates exist in block 2130, the GPS coordinates and error range may be used in block 2134. In many cases, GPS coordinates may be generated with a calculated error range for the specific GPS reading.

The estimated location may be calculated using all available data sources and either a customized or calculated error range for the specific data source and location, or using default error ranges in block 2136. The estimated location may be stored in block 2138 and if additional locations are available for processing in block 2140, the process may return to block 2102. When all locations have been processed in block 2140, the trajectory may be stored in block 2142.

FIGS. 22A, 22B, and 22C are illustrations showing the difference between selection of a mean, median, and medoid of a cluster of data points. The figures each show map 2200 with the same set of observations 2202.

In FIG. 22A, the mean 2204 is illustrated. In FIG. 22B, the median 2206 is illustrated, and in FIG. 22C, the mediod 2208 is illustrated.

The mean, median, and mediod are three different methods to determine a "center" or representative point for a cluster or group of points. The mean 2204 may be calculated as the centroid or mathematical midpoint of the points. The mean 2204 may be a calculated value and may not represent a specific observation.

The median 2206 may also be a mechanism for representing a cluster or group of observations, but the median 2206 may be the geometric median, which may be a middle point of a cluster, once outliers are removed.

The mediod 2208 may be a third mechanism for representing a cluster or group of observations, but the mediod 2208 may be restricted to a member of the dataset.

The three different mechanisms may be examples of generating a point that may represent a cluster of observations. The mechanisms may be used, for example, to represent the observations of GPS data within a cell, represent the location of a stay point, or for any other case where a cluster of observations or location data points may be referenced.

Figures 23A, 23B:
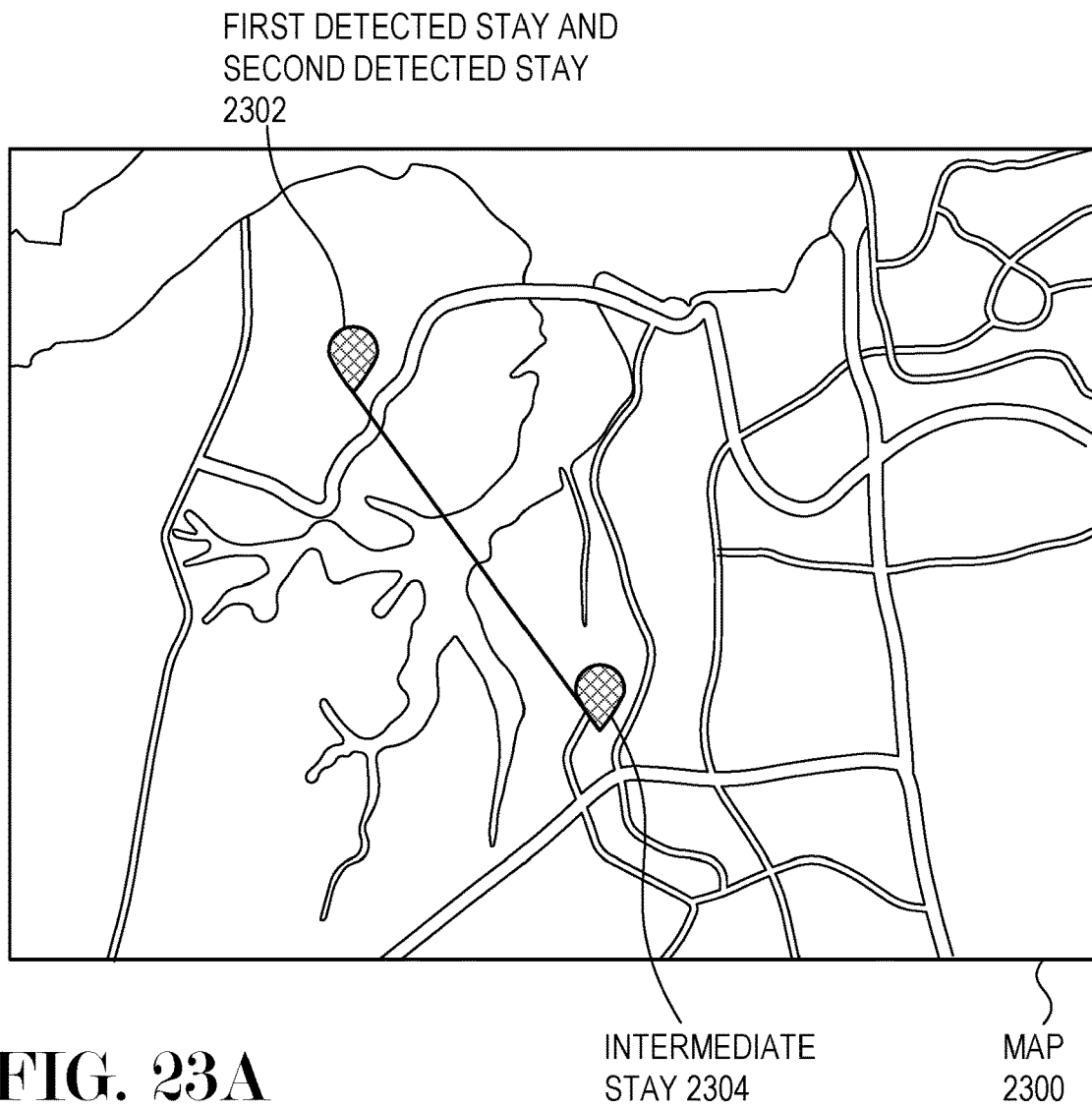
FIGS. 23A and 23B are diagram illustrations of an example showing detected stays with an intermediate stay that does not make physical sense.

FIGS. 23A and 23B may illustrate an example of stay observations that may be combined due to an intermediate stay point. In the example, the intermediate stay point may be an anomaly that may be the result of various artifacts of a cellular telephony network.

FIG. 23A may illustrate a map 2300 with a first and second detected stay point 2302 and an intermediate point 2304.

FIG. 23B may illustrate raw observation data for the observations shown in map 2300. The raw observation data is a sequence of latitude and longitude, as well as a date and time for the observation. The first three observations were classified as a first stay 2306, but then an intermediate stay 2308 was observed, then back to a second stay 2310. The observations are for cellular towers to which a user may be connected, which is a very coarse type of location data.

From a casual observation of the data, one can see that the movement from stay 2302 to stay 2304 occurred from 1:06:25 to 1:09:03, which is merely three minutes. From the map 2300, this movement appears to be over a kilometer in distance. Similarly, the movement from intermediate stay 2304 back to stay 2302, shows an observation of 1:12:07 to 1:15:39. These movements do not appear to be physically possible, but they are representative of the data that are routinely observed in cellular telephony network location observations.

The phenomena observed in this example is termed an oscillation. Oscillations occur with great regularity in raw location data gathered from cellular telephony systems.

One explanation of this phenomena is that a cellular network may cause devices to disconnect with one tower and reconnect with another tower for various reasons. For example, when one tower may be overloaded, a device may be transferred to another tower to relieve the overloading condition. The device may be re-connected to the original tower when the overloading condition is eased.

In another explanation of this phenomena, the device may be at the edge of the serviceable area of one tower, and when the signal strength drops a small amount, the network may move the device to another tower. When that connection's signal strength drops a small amount, the network may switch the user back.

Oscillation is also observed with triangulated location data. A triangulated location may be determined by gathering a signal strength observation from each of several towers, or by measuring a time-of-flight for a signal between several towers, then calculating a likely location for the device. Such a location determination may be subject to multipath interference, reflections, slight errors in timing or signaling, or other variations that may cause one observation to vary from the next, even when the device has not moved between observations.

In the example of FIGS. 23A and 23B, an analysis engine may remove the intermediate stay 2308 and combine the first stay 2306 with the second stay 2310. Such a combination makes intuitive sense, as the user was most likely at the first location the entire time of the observations. Further, by combining the two stays together into a single stay, an erroneous transit sequence may be avoided and the most likely length of stay will be calculated.

Such an analysis may be performed on historical data. In other words, by observing the total set of observations, a spurious or unlikely intermediate stay may be identified and removed from the observations. This method of cleaning the data may reduce the noise or inaccuracies when the stay and travel data may be used in later processing. For example, when a user may analyze the movement patterns within a road network, the spurious movements between the first detected stay 2302, the intermediate stay 2304, and return to the second detected stay 2302 may be removed and therefore not clutter or introduce errors into the movement pattern analysis.

Figure 24:
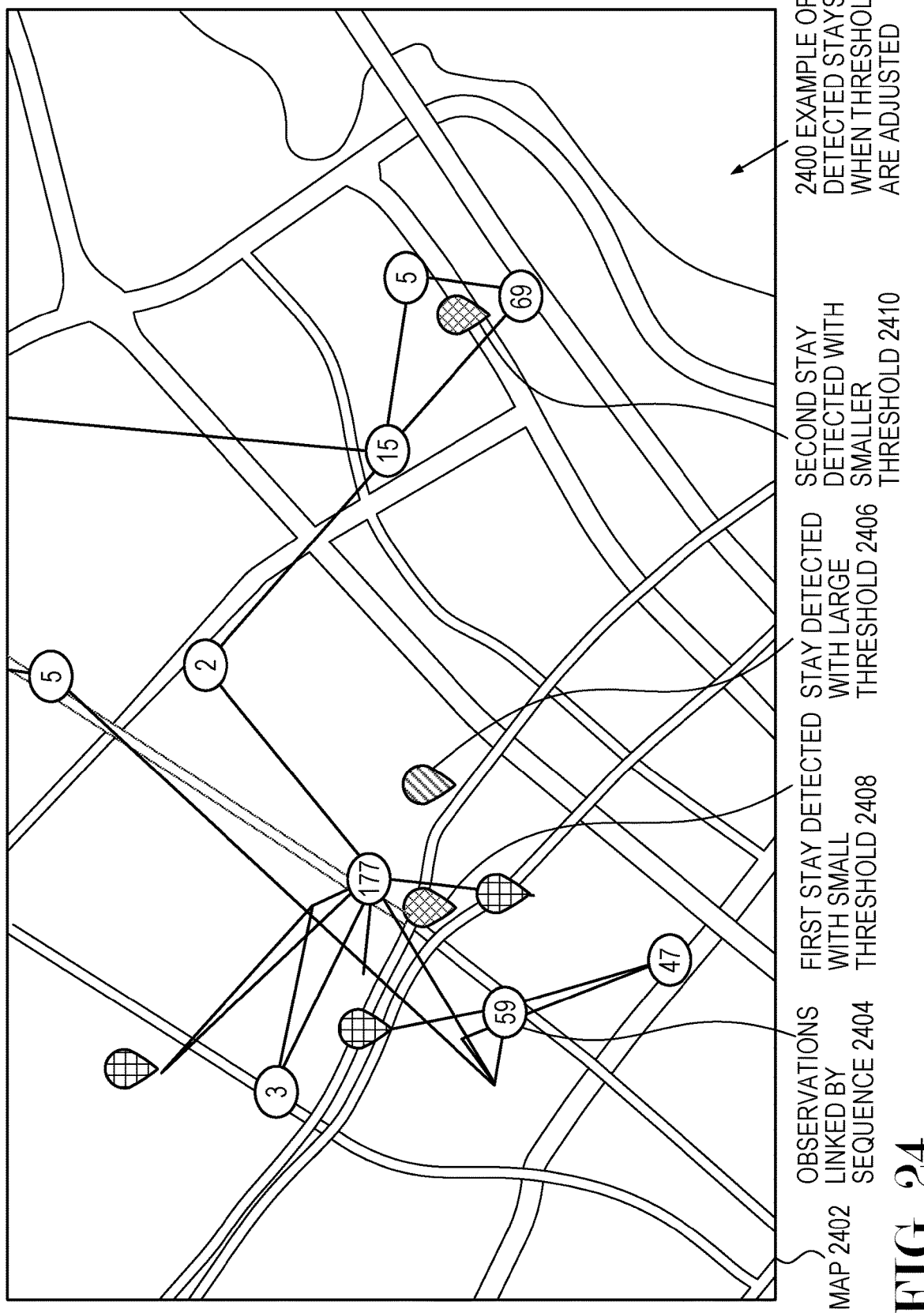
FIG. 24 is a diagram illustration of an example showing different stays detected with different thresholds using the same data.

FIG. 24 is an illustration of an example 2400 where different sets of detected stays are found when the stay thresholds may be adjusted. The example 2400 may represent real data observed from a cellular network.

The map 2402 is shown with a set of observations 2404 linked by sequence. In the sequence, where multiple observations are observed for the same location, a number is shown to represent the number of observations for that point. The set of observations 2404 represents approximately 375 observations taken in sequence.

When a large threshold of distance and time is used to identify a stay, a single stay may be identified from the observations. The stay 2406 may be the mean or centroid of the observations.

When a smaller threshold of distance and time is used to identify a stay, two stays may be identified from the observations. The stays 2408 and 2410 may be identified as the centroid of the observations relating to the different stays. Stay 2408 may represent the observations on the left side of the map, which stay 2410 may represent the observations on the right side of the map.

This example illustrates that the selection of time and distance thresholds for identifying a stay can affect the accuracy of the results. In the illustration, the coarseness of the observations may represent the actual data available to be analyzed. Even with the data being so coarse and noisy, meaningful analyses can come when the data are cleaned and analyzed.

FIGS. 25A and 25B illustrate two different sets of stays that may be detected using two different types of data. FIG. 25A may illustrate a set of stays detected using tower location data only, while FIG. 25B may illustrate a set of stays detected using triangulated location data. The illustrations show the stay analysis using the same movement of a single device, but analyzed with different data sources.

Tower location data may be, for example, Location Based System (LBS) data that may provide merely the tower location as an approximate set of location coordinates. Triangulated data may be, for example, General Performance Event Handling (GPEH) location data.

FIG. 25A shows a map 2502 with stays 2504, 2506, and 2508. Due to the resolution and accuracy of the tower-only location data, an algorithm may detect only three stays.

FIG. 25B shows map 2502 with stays 2512, 2514, 2516, 2518, and 2520. The triangulated data may be more accurate than tower-only data, which allows a stay detection mechanism to identify more stays with greater accuracy. In the example of the triangulated data, stays 2512, 2516, 2518, and 2520 are similar to the stays 2504, 2506, and 2608 detected from the tower-only data. However, stay 2514 may be detected from the triangulated data and was not detected from the tower-only data.

This illustration shows that increasing the data accuracy may improve the stay detection, but even with coarse and noisy data, reliable stay detection is possible.

Figure 26:
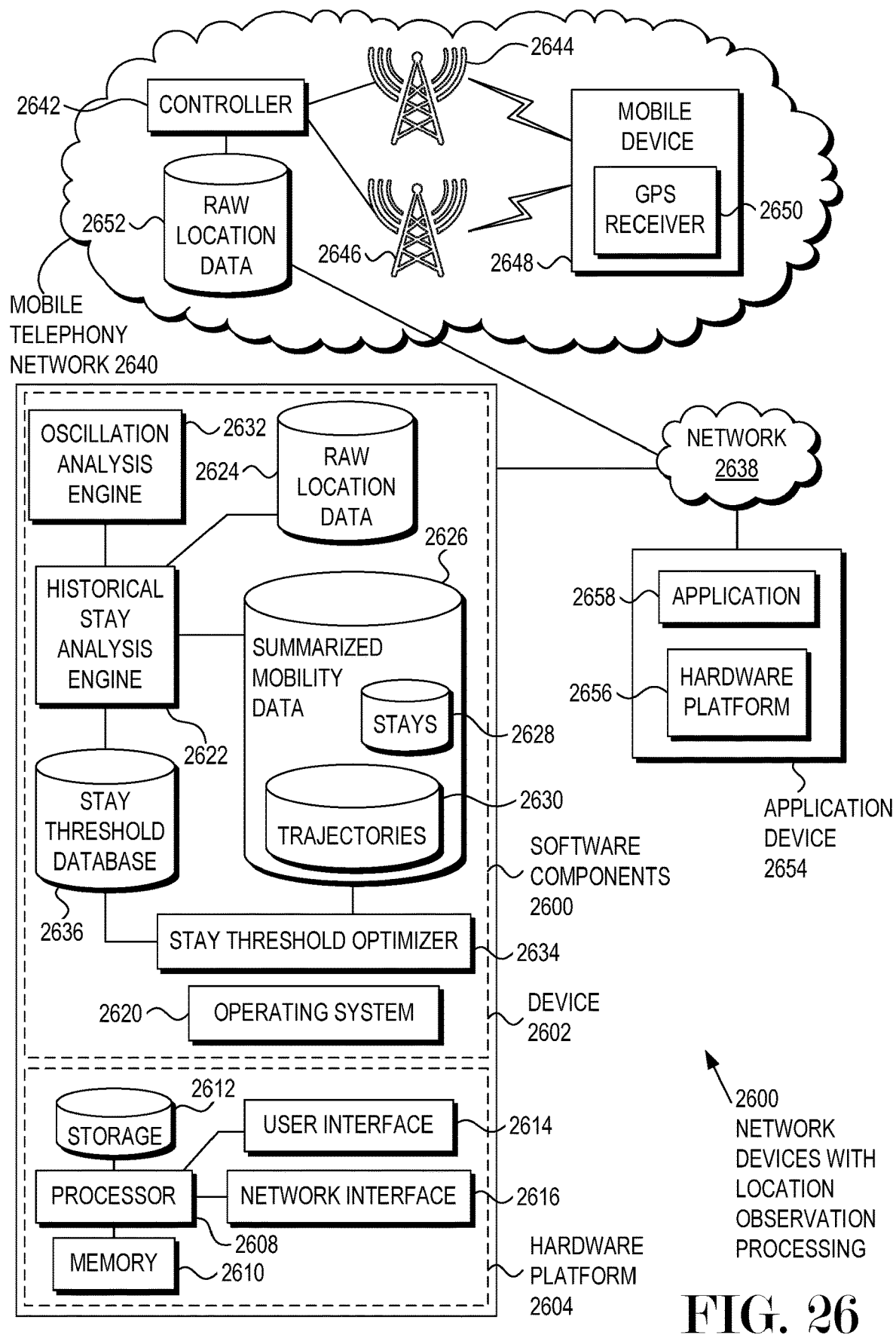
FIG. 26 is a diagram illustration of an embodiment showing a network environment with a system for processing location data.

FIG. 26 is a diagram of an embodiment 2600 showing components that may analyze raw location data and identify stays and trajectories for subsequent analyses. The example of embodiment 2600 is merely one topology that may be used to analyze raw location data.

The diagram of FIG. 26 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 2600 illustrates a device 2602 that may have a hardware platform 2604 and various software components. The device 2602 as illustrated represents a conventional computing device, although other embodiments may have different configurations, architectures, or components.

In many embodiments, the device 2602 may be a server computer. In some embodiments, the device 2602 may still also be a desktop computer, laptop computer, netbook computer, tablet or slate computer, wireless handset, cellular telephone, game console or any other type of computing device. In some embodiments, the device 2602 may be implemented on a cluster of computing devices, which may be a group of physical or virtual machines.

The hardware platform 2604 may include a processor 2608, random access memory 2610, and nonvolatile storage 2612. The hardware platform 2604 may also include a user interface 2614 and network interface 2616.

The random access memory 2610 may be storage that contains data objects and executable code that can be quickly accessed by the processors 2608. In many embodiments, the random access memory 2610 may have a high-speed bus connecting the memory 2610 to the processors 2608.

The nonvolatile storage 2612 may be storage that persists after the device 2602 is shut down. The nonvolatile storage 2612 may be any type of storage device, including hard disk, solid state memory devices, magnetic tape, optical storage, or other type of storage. The nonvolatile storage 2612 may be read only or read/write capable. In some embodiments, the nonvolatile storage 2612 may be cloud based, network storage, or other storage that may be accessed over a network connection.

The user interface 2614 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 2616 may be any type of connection to another computer. In many embodiments, the network interface 2616 may be a wired Ethernet connection. Other embodiments may include wired or wireless connections over various communication protocols.

The software components 2606 may include an operating system 2618 on which various software components and services may operate.

A historical stay analysis engine 2622 may take raw location data 2624 and may identify stays 2628 and trajectories 2630, which may be summarized mobility data 2626. The summarized mobility data 2626 may be used for subsequent analysis, such as analyzing passenger movement through a transit system, for example.

In many use cases, the stays 2628 and trajectories 2630 may summarize large amounts of data. For example, a stay that may occur for four hours may summarize hundreds or thousands of location observations into a single summary. The summary may include the geographical center of the stay, plus the beginning time and ending time. Such a summary may be very useful for analyses involving many hundreds or thousands of people, each having a handful of stays and transits per day.

A stay may be defined, at least in part, by identifying a group of location data points that are within a predefined stay radius for at least a predefined amount of time. The various thresholds that may define a stay may be stored in a stay threshold database 2636.

The stay thresholds may be optimized using a stay threshold optimizer 2638, which may analyze the stays 2628 to determine whether or not the selected thresholds produced a meaningful distinction between a stay and a trajectory. As discussed above, selecting a very large stay radius and time threshold may not identify smaller moves that may occur when smaller stay radii and time thresholds may be used.

An oscillation analysis engine 2632 may analyze the initial classification of "stay" and "trajectory" to determine if stays might be combined, as well as to perform other analyses of the data to clean up or optimize the data.

The device 2602 may be connected to a network 2638, which may be any type of communications network.

A mobile telephony network 2640 may generate raw location data 2652, which may be transmitted over the network 2638 to the device 2602 for analysis.

The mobile telephony network 2640 may include a controller 2642 which may communicate with many different towers, such as towers 2644 and 2646. The towers may communicate with a mobile device 2648. In many cases, a device 2648 may include a Global Positioning System (GPS) receiver 2650.

An application device 2654 may consume the various stays 2648 and trajectories 2630 to perform various analyses. The device 2654 may operate on a hardware platform 2656, which may run an application 2658 which may process the data.

Figure 27:
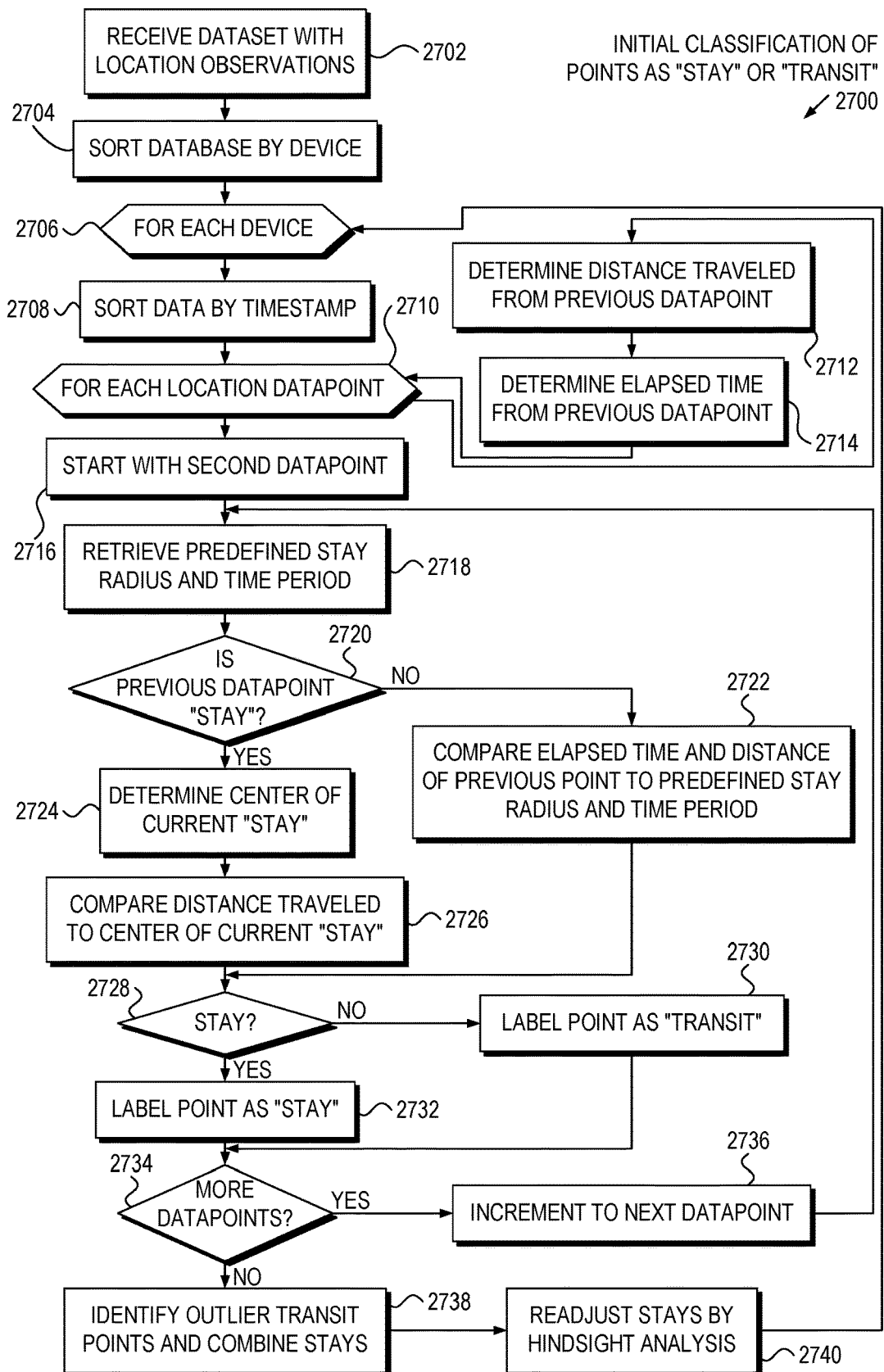
FIG. 27 is a flowchart illustration of an embodiment showing a method for labeling location observations as "stay" or "transit".

FIG. 27 is a flowchart illustration of an embodiment 2700 showing a method for initial classification of location data points into "stay" and "transit". The method of embodiment 2700 may be merely one example of how location data points may be processed.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The method of embodiment 2700 may be an example of how location observations may be classified into "stays" and "transits". In the example, as well as the claims and this specification, the nouns "stays" and "stay" and "visits" or "visit", respectively, are used interchangeably. Similarly, the terms "transits" or "transit" and "trajectories" or "trajectory", respectively, and also used interchangeably.

In the method of embodiment 2700, location observations are grouped together by device, then analyzed in time sequence. A stay may be defined whenever a series of location observations are within a similar geographical location and for at least a designated period of time. The geographical location may be defined by a predefined stay radius and the time period may be defined by a predefined stay time period.

If a sequence of location observation data points do not remain within a designated radius for the designated period of time, the data points may be labeled as "transit". After an initial classification, the labeled observations may undergo further analysis to clean up the data. The data clean up may involve combining stays that may be separated by an errant transit label, as well as shifting the labeling to compensate for inherent delay in identifying a stay or a transit.

A data set with location observations may be received in block 2702. The data set may be organized by device in block 2704, and each device's data may be analyzed in block 2706.

For each device in block 2706, the location observations may be sorted by timestamp in block 2708. For each location data point in block 2710, the distance traveled from the previous data point may be calculated in block 2712, and in block 2714, the elapsed time from the previous data point may be determined.

The second data point in the sequence may be selected in block 2716.

The predefined stay radius and predefined time period may be determined in block 2718. The stay radius may be a geographic distance in which a stay may be defined. The predefined time period may be the minimum length of time for which a stay may be identified.

In some systems, the stay radius and stay time period may change from one situation to another. For example, a densely populated urban environment with many cell towers may have a smaller stay radius than a sparsely populated rural environment. In block 2718, a system may look up the stay radius and stay time in a threshold database.

If the previous data point is not labeled a stay in block 2720, the elapsed time and distance traveled since the previous point may be compared to the stay radius and time threshold in block 2722. If the current point does not meet the criteria for a stay in block 2728, the current point is labeled "transit" in block 2730 and the process may continue in block 2734.

If the previous data point is labeled a stay in block 2720, the center of the current stay may be determined in block 2724. Some embodiments may use mean, median, mediod, or some other mechanism to calculate the center of the group of data points that make up a stay. The distance traveled from the center of the stay to the current data point may be calculated in block 2726. If the data point does not meet the stay criteria in block 2728, the point may be labeled as "transit" in block 2730.

If the data point in block 2728 does meet the definition of a "stay", the point may be labeled as a stay in block 2732.

If more data points remain to be processed in block 2734, the next data point may be selected in block 2736 and the process may return to block 2718.

If no more data points remain in block 2734, two post processing analyses may be performed: identifying outlier transit points and combining stays in block 2738 and readjusting stays by hindsight analysis in block 2740.

Figure 28:
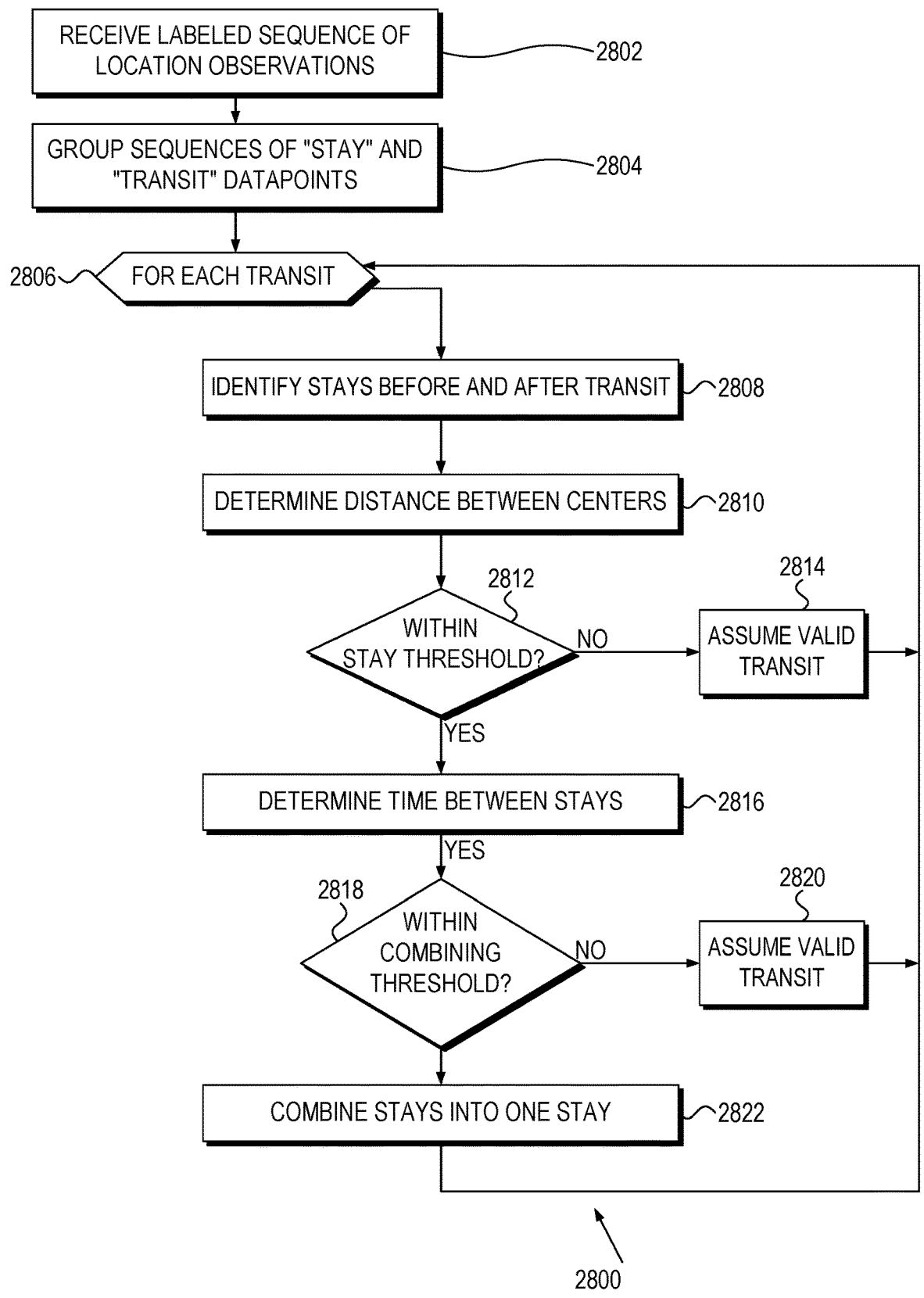
FIG. 28 is a flowchart illustration of an embodiment showing a method for identifying outlier transit data points and consolidating stays.

FIG. 28 is a flowchart illustration of an embodiment 2800 showing a method for post processing stays and transits by determining whether two stays might be combined. The method of embodiment 2800 may be merely one example of how stay and location data points may be cleaned and processed.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 2800 may attempt to combine stays where two stays may be separated by one or more spurious transit observations. Stays may be combined due to artifacts present in the location observations that may come from a mobile telecommunications network, such as a cellular telephony network. In many cases, a set of location observations may switch from one data source to another, such as capturing Location Based Services location data to triangulated location data to Global Positioning System location data. Each of these data sources may have widely varying characteristics. In some situations, a stay may be being observed but the network may switch from one type of location data gathering to another, causing an apparent move in the device's location. By analyzing two subsequent stays, an errant transit point may be removed and the two stays may be joined into a longer stay.

A labeled sequence of location observations may be received in block 2802. An example of a method to create such a sequence may be found in embodiment 2700.

Within the sequence of data points, the data points may be grouped in to "stay" and "transit" groups in block 2804. For each group of "transit" data points in block 2806, the stays before and after the transit group may be identified in block 2808.

The distance between the two stay centers may be determined in block 2810. If the distance between the two stays are not within the stay threshold in block 2812, the transit may be considered valid in block 2814 and the process may return to block 2806.

If the distance between the two stay centers are within the stay radius in block 2812, the time difference between the stays may be determined in block 2816. If the time difference is greater than a stay combining threshold in block 2818, the transit may be considered valid in block 2820.

The stay combining threshold may be a length of time for which two stays may be combined. The use case may be to identify situations where the sources for location data may be changed or where errors in triangulation or other data collection issues may cause spurious transit data to interrupt an otherwise contiguous stay.

If the stays are outside the combining threshold in block 2818, the transit may be assumed to be valid in block 2820. If the stays are within the combining threshold in block 2818, the stays may be combined in block 2820. One method for combining the stays may be merely to remove the spurious transit data points and recalculate the stay center and length of time.

Figure 29:
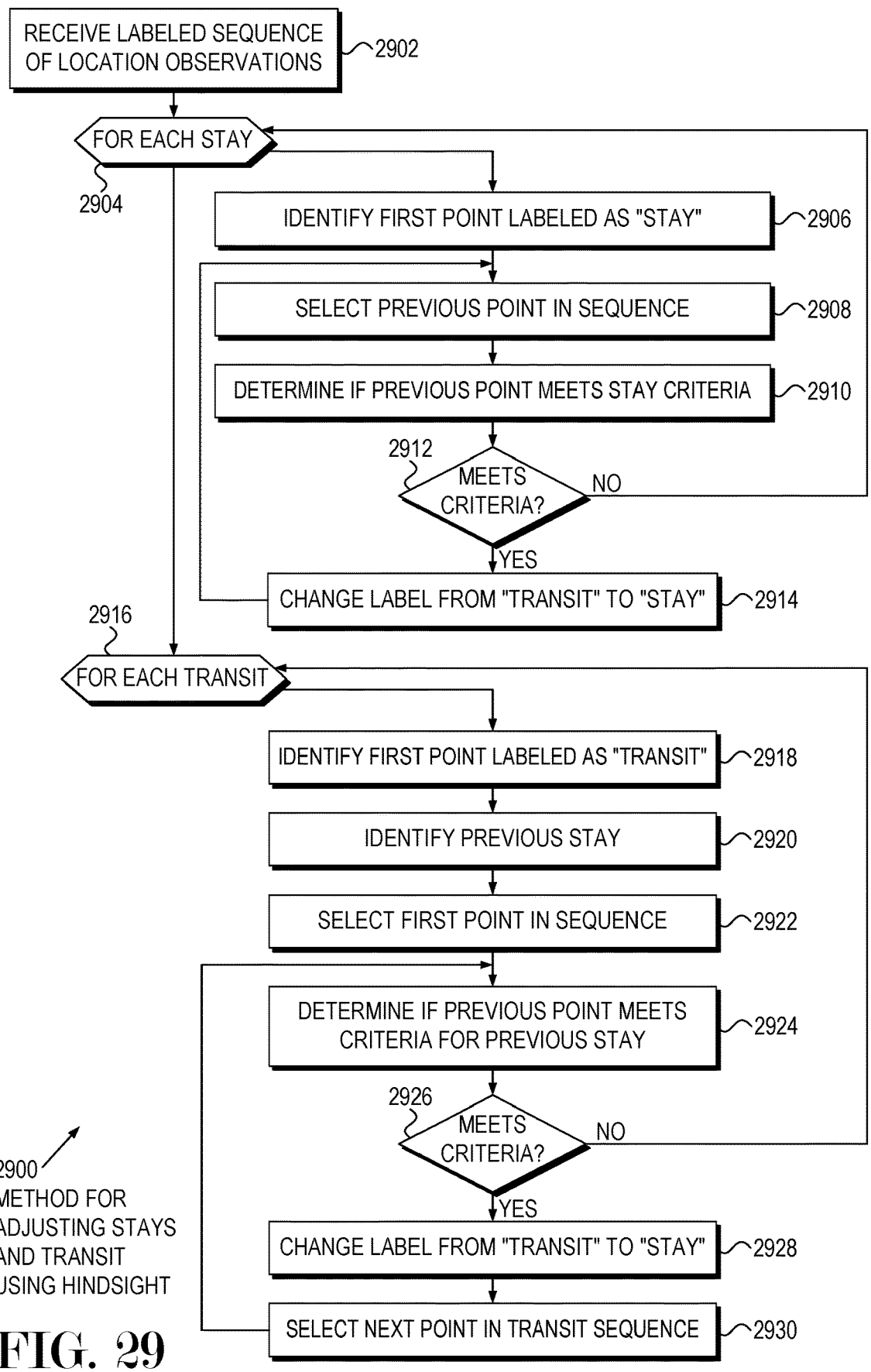
FIG. 29 is a flowchart illustration of an embodiment showing a method for cleaning up stay and transit beginning and ending points using hindsight.

FIG. 29 is a flowchart illustration of an embodiment 2900 showing a method for adjusting stays and transits using hindsight. The method of embodiment 2900 may be merely one example of how location data points may be processed.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 2900 is an example of corrections or cleaning that may be done with by adjusting some of the data points from "stay" to "transit" and vice versa.

The mechanism by which "stays" and "transits" are identified may have an inherent lag. Because a stay is defined by a succession of location observations that may indicate that a device is stationary, the stay may not be identified until several location observations indicate that the device has ceased moving. Similarly, the transition from a stay to a transit may not occur until after the device has already begun moving.

The method of embodiment 2900 may use the benefit of hindsight to make a more accurate determination when a stay actually begins and ends. The method is one way that the data may be cleaned up prior to further analysis.

A labeled sequence of location observations may be received in block 2902. In a typical use case, the labeled sequence of location observations may have been previously processed by the method of embodiment 2800.

For each stay in block 2904, the first point may be identified that has a label of "stay" in block 2906. The previous data point may be selected in block 2908, which would have been labeled "transit" in the earlier processing. Such a data point may be analyzed in block 2910 to determine if that data point may fit the conditions to be labeled a "stay". If the data point does not meet the criteria in block 2912, the point may be the last point in a trajectory prior to the stay. If the data point does meet the criteria in block 2912, the point may be relabeled as a stay in block 2914 and the process may return to block 2908 to analyze the next previous data point.

For each transit in block 2916, the first point may be identified that has a label of "transit" in block 2918. The previous stay may be identified in block 2920. The first data point from the transit sequence may be selected in block 2922, which would have been labeled "transit" in the earlier processing. Such a data point may be analyzed in block 2924 to determine if that data point may fit the conditions to be labeled a "stay". If the data point does not meet the criteria in block 2926, the point may be the last point in the previous stay. If the data point does meet the criteria in block 2926, the point may be relabeled as a "stay" in block 2928. The next data point in the transit sequence may be selected in block 2930, and the process may return to block 2922 to analyze the next data point.

Figure 30:
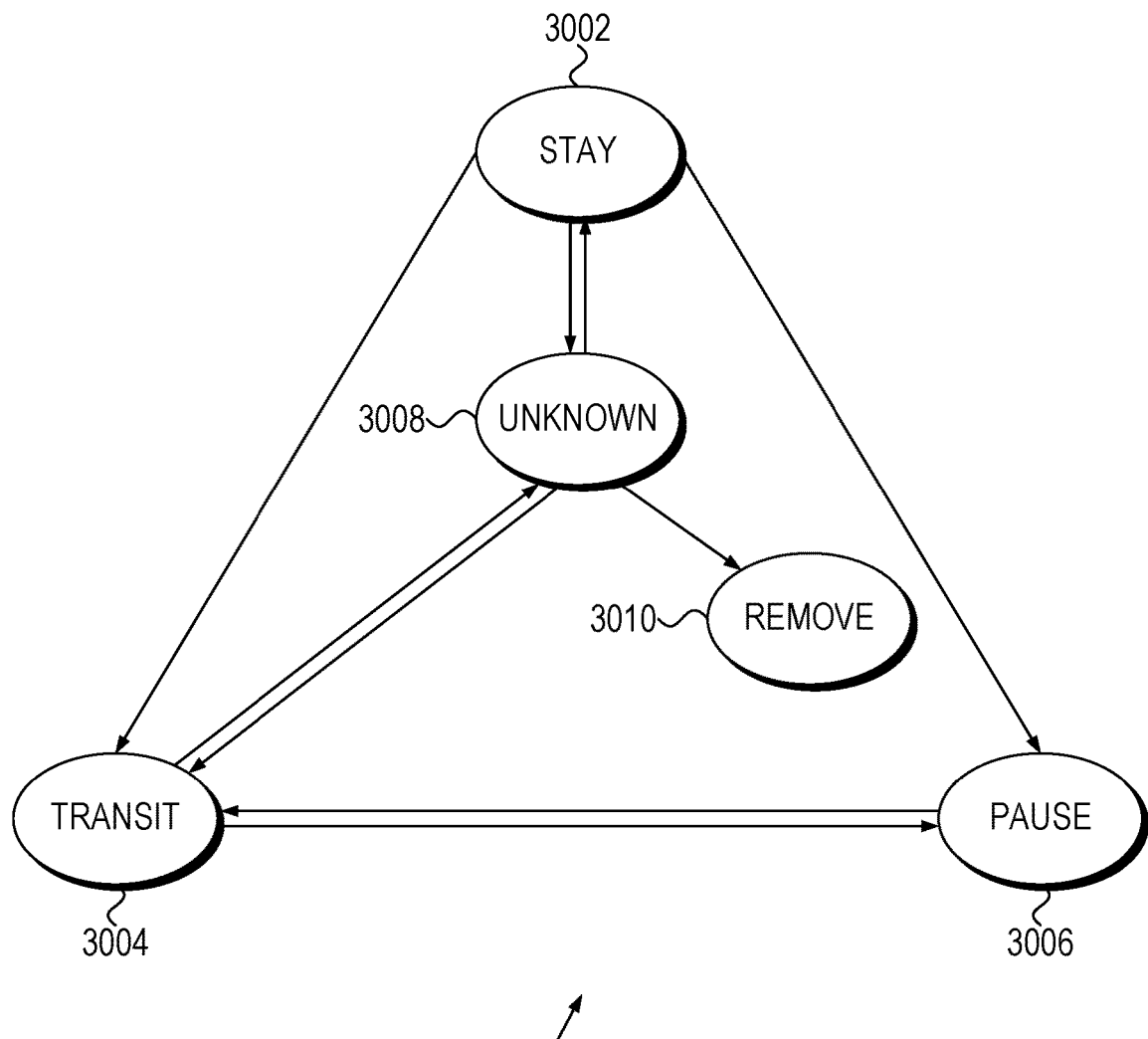
FIG. 30 is a diagram illustration of an embodiment showing a state diagram for real time or near-real time status determination.

FIG. 30 is a diagram illustration of an embodiment 3000 showing a state diagram for determining real-time status of a device. Embodiment 3000 is one example of a state diagram where devices may be classified as "stay", "transit", "unknown", or "pause".

Embodiment 3000 illustrates the various states of a device with respect to its mobility. As location observations are received, a device's state may be updated using various rules that may define how state transitions occur. The state transition rules may be applied without extensive computational power. This means that huge numbers of devices may have their state updated in real time or near-real time with a modest amount of computing power. In an example shown in a later figure, the location observations of 2.5 million devices may be updated in real time without large amounts of computing power expended.

Devices that may be in different states may have additional processing applied. The state assignment of embodiment 3000 may quickly categorize device for the subsequent processing. For example, devices in a transit state may be further analyzed to determine a transportation mode. Devices in a stay state may be analyzed to determine a user's affinity or association with the location, such as determining if a user is at home, at work, going shopping, at a recreational location, or some other purpose of the visit.

The fast categorization of the real time state of a device using embodiment 3000 may allow for certain analyses that may be time sensitive. For example, by quickly categorizing devices into a "transit" state, those devices may be analyzed to show real time traffic congestion in a metropolitan area. As those devices are further analyzed to identify the devices traveling by subway, for example, the traffic loading in the subway may be shown in real time or near-real time. The real time or near-real time analysis may help transit managers to dispatch trains, manage loading, or identify problems within the system as soon as possible.

The states may include stay 3002, transit 3004, pause 3006, unknown 3008, and remove 3010. The arrows in the diagram indicate the direction of a change from one state to another.

A stay 3002 may be defined by a predefined stay radius and a predefined stay time period. A cluster of observations spanning the predefined time period and being within the predefined stay radius may be considered a stay 3002. If an observation appears to be outside these constraints, the state may be changed to transit 3004.

A transit 3004 may be defined as location observations where a device moves more than the predefined stay radius, or when a device may be in a location for a short period of time. As a device stops moving, location observations may indicate that the motion is less than the stay radius, but not within the predefined stay time period. Such a condition may be pause 3006. As the observations in the pause 3006 state continue longer than the predefined stay time period, the state may be changed to stay 3002. If the device does not persist at the location of the pause 3006 longer than the predefined stay time period, the state may be changed back to transit 3004.

In some cases, observations may be discontinued. Observations may cease because a device may be turned off, run out of battery power, in an inaccessible location, or otherwise unavailable. In such cases, a device may be placed in an unknown 3008 state. The unknown 3008 state may return to either stay 3002 or transit 3004 when a new location observation may be received.

A new location observation may indicate that the device may have been in the same location as the last observation when the device as placed in the unknown 3008 state. In such a case, the device may be placed in a stay 3002 state.

Similarly, a new location observation may indicate that the device may have moved since the last observation when the device was placed in the unknown 3008 state. In such a case, the device may be placed in the transit 3004 state.

In some cases, a device may be in an unknown 3008 state for an extended period. Such a condition may be long enough to place the device in the remove 3010 state, where the device may not be further processed. Such devices may be, for example, devices with pre-paid SIM cards that expire, tourists who may be monitored for a period of time then return to their homes, devices that may be exchanged for new devices, or other situations. Without a remove 3010 state, devices in the unknown 3008 state may accumulate. The remove 3010 state may not actually be a state kept by the system, but may indicate that the device may be removed from further computations.

Figure 31A:
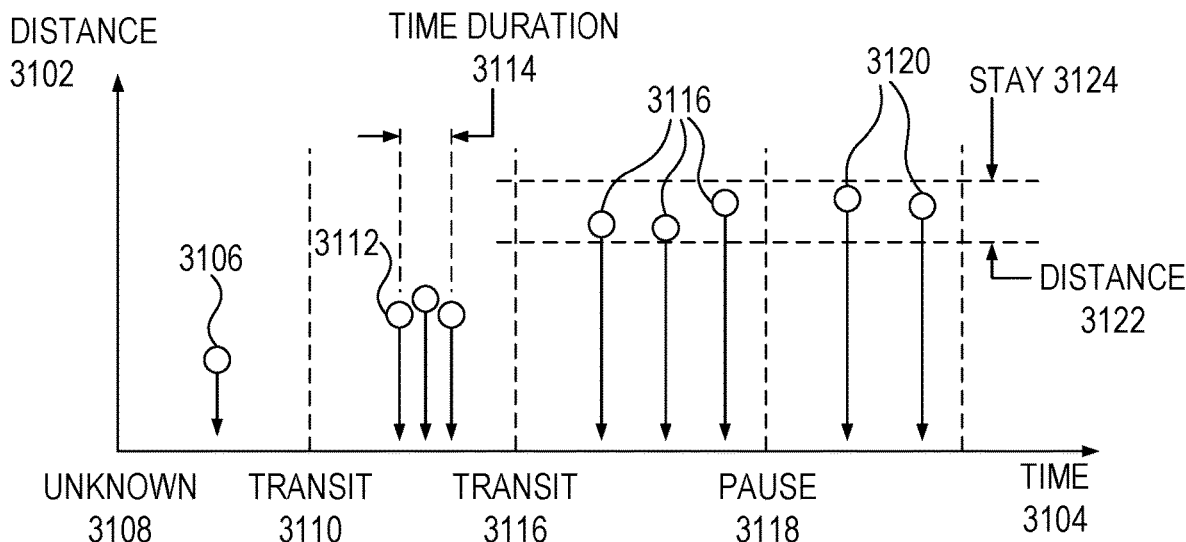
FIGS. 31A and 31B are diagram illustrations of embodiments showing transitions from unknown to transit to stay, and from unknown to transit to pause to transit, respectively. The diagrams are not to scale.
Figure 31B:
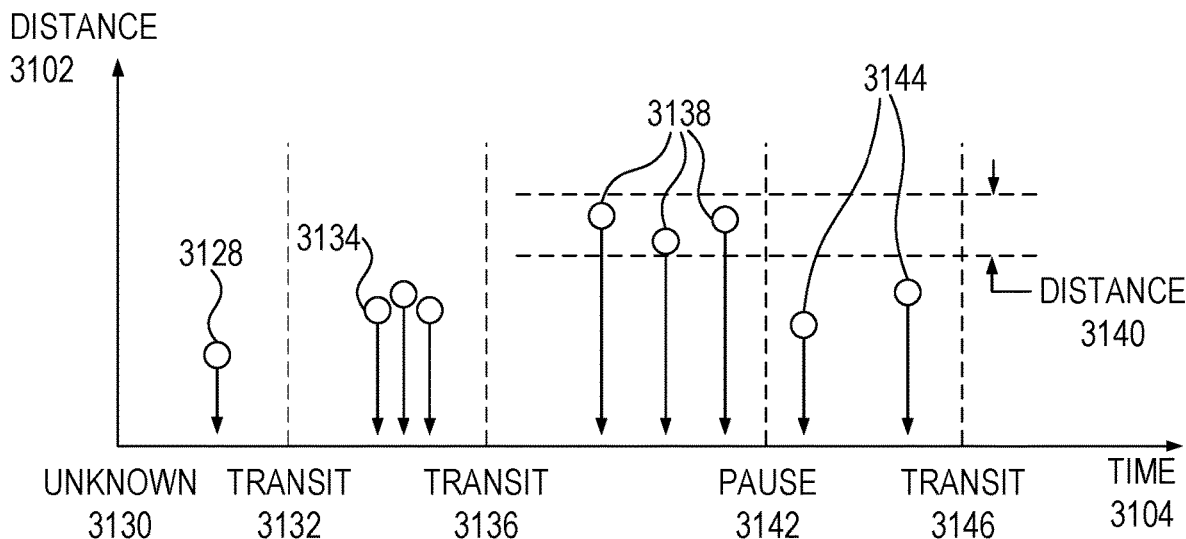

FIGS. 31A and 31B are diagram illustrations of embodiments 3100 and 3126 showing various transitions. FIG. 31A shows embodiment 3100 which illustrates transitions from unknown to transit to stay. FIG. 31B shows embodiment 3126 which illustrates transitions from unknown to transit to pause to transit. The diagrams are not to scale.

The diagram of embodiment 3100 shows distance 3102 verses time 3104. At each of the vertical dashed lines, the system may report the status of the device. At the beginning of the sequence, the state is unknown 3108. A first observation 3106 with no previous knowledge of the device may place the state into transit 3110.

A set of observations 3112 may be received and may have a short time duration 3114 and may further be far from point 3106, indicating a movement. The short time duration 3114 may not be long enough for a pause or a stay, and therefore the status may remain transit 3116. Such a situation may occur, for example, when a short burst of location observations may be received when a user may be on a subway platform changing trains.

The observations 3116 may be spread over enough time period and may be within a distance 3122 where the state may be set to pause 3118. As the observations 3120 are received, the time at the location may meet or exceed the stay time period, thereby causing the state to change to stay 3124.

The diagram of embodiment 3126 shows distance 3102 verses time 3104. At the beginning of the sequence, the state is unknown 3130. A first observation 3128 with no previous knowledge of the device may place the state into transit 3132. A group of close observations 3134 may continue the state of transit 3136. A set of observations 3138 may be sufficiently long in time and short in distance 3140 to change the state to pause 3142. A second set of observations 3144 may be outside the threshold of the stay radius and therefore the state may be changed back to transit 3146.

Figure 32A:
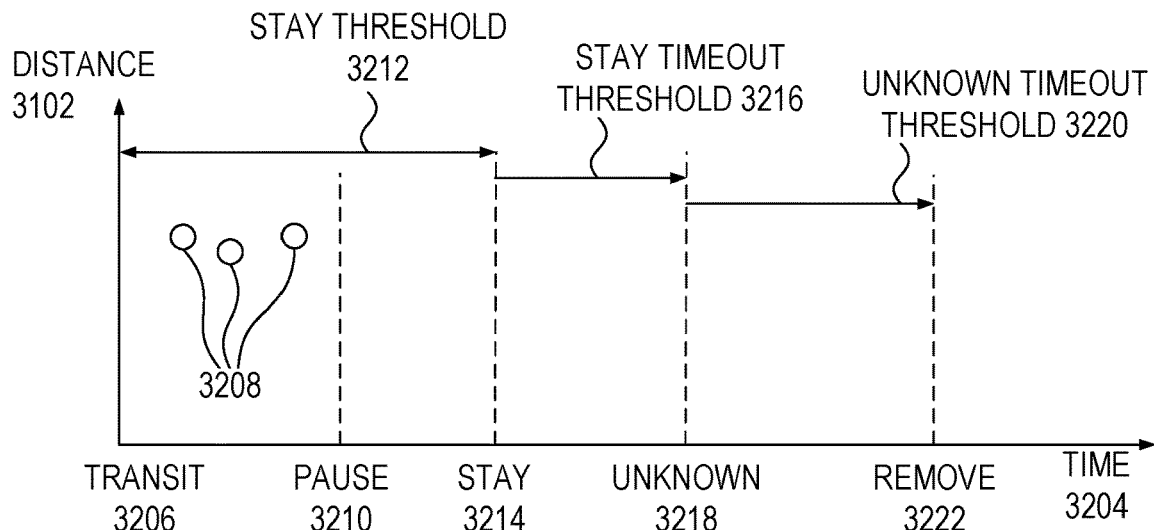
FIGS. 32A and 32B are diagram illustrations of embodiments showing transitions from transit to pause to stay to unknown to remove, and from transit to unknown to stay, respectively. The diagrams are not to scale.
Figure 32B:
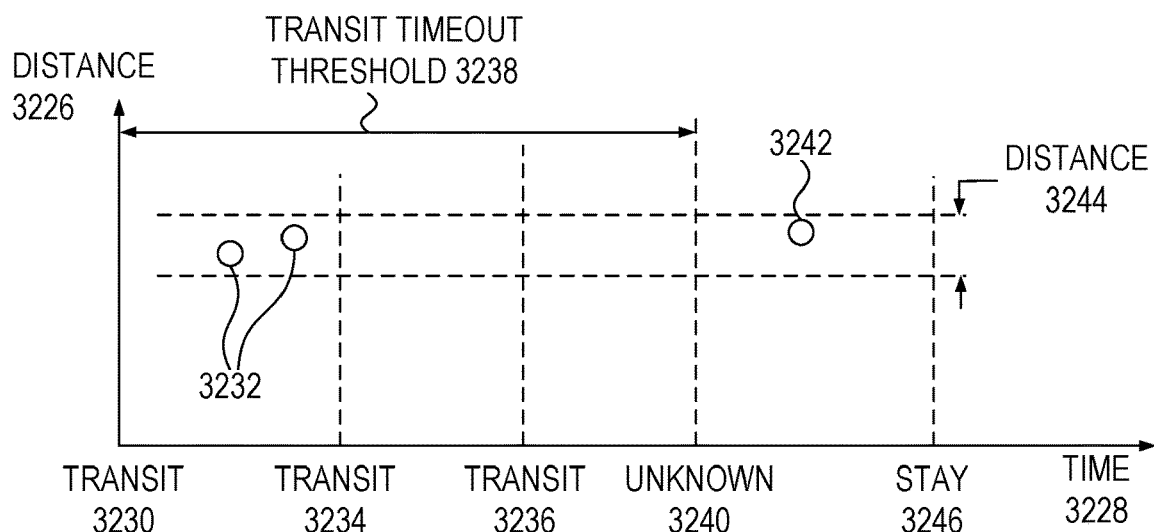

FIGS. 32A and 32B are diagram illustrations of embodiment 3200 and 3224 showing various transitions. FIG. 32A shows embodiment 3200 which illustrates transitions from transit to pause to stay to unknown to remove. FIG. 32B shows embodiment 3224 which shows transitions from transit to unknown to stay. The diagrams are not to scale.

The diagram of embodiment 3200 shows distance 3202 verses time 3204. At each of the vertical dashed lines, the system may report the status of the device. At the beginning of the sequence, the state is transit 3206. A set of observations 3208 may be close in distance such that the state may be updated to pause 3210. As time elapses and exceeds the stay threshold 3212 of a stay time period, the state may be changed to stay 3214.

As the time continues without any observations, time may exceed a stay timeout threshold 3216, whereby the state may be changed to unknown 3218. As time progresses even further without any further observations, time may exceed an unknown timeout threshold 3220, at which time the status may be set to remove 3222.

The diagram of embodiment 3224 shows distance 3226 verses time 3228. At the beginning of the sequence, the state is transit 3230. A pair of observations 3232 may be sufficiently close in time to cause the state to remain as transit 3234. No observations are received until the next analysis time, and the state may remain as transit 3236. At some point thereafter with no further observations, the time may pass a transit timeout threshold 3238, at which time the state may be changed to unknown 3240.

An observation 3242 may be received and may be within a stay distance 3244. The observation 3242, along with observations 3232, may be within the stay distance and longer than a stay time period, therefore the state may be set to stay 3246.

The parameters for determining the state of a device may vary from one data set to another. By varying the thresholds, different stays and transits may be identified. Cultural customs, demographics, types of available transportation, and other behavioral issues may play a role, such that thresholds for rural farmland may be different from urban settings, and even from one city to another, different thresholds may be appropriate. In many cases, a data scientist may adjust the thresholds manually to determine an optimum set of thresholds for a particular dataset.

The parameters for determining a stay may include a radius threshold or stay radius. For urban environments and while using tower locations or triangulated data, a radius threshold of 1000 meters has been shown to be effective. In areas with increased density of cell towers, a radius threshold of less than 1000 meters can be effective as well. Some instances of 750 meters, 500 meters, and even 250 meters has been effective. For rural areas, a radius threshold of 2000, 5000, and even 10,000 meters may be used. The stay radius threshold may depend on the separation of cell towers and the resolution or accuracy of the location data. The stay radius may be considered the maximum distance between two points so that the points may be considered part of the same cluster. The stay radius may be set The time parameters for determining a stay may be a stay dwell threshold or stay time period. For urban environments, a stay dwell threshold of 900 seconds (15 minutes) has been shown to be effective. In areas with increased density of cell towers and therefore increase accuracy or resolution of data, stay dwell threshold of 750 seconds, or even 600 seconds may be used. In more rural areas or areas with less concentration of cell towers, a stay dwell threshold of 1200, 1500, or 1800 seconds may be appropriate.

A pause dwell threshold may be the minimum amount of time that may be considered a pause. A typical pause dwell threshold may be approximately one third of a stay dwell threshold. In a typical urban environment, a pause dwell threshold may be 300 seconds (5 minutes), although pause dwell thresholds of 200 seconds, 120 seconds, or even 60 seconds may be used in areas with increased cell towers and higher resolution. In less populated areas, a pause dwell time of 400, 500, 600, 750, or even 900 seconds may be appropriate.

A stay timeout threshold may be the maximum duration for a user to remain in the stay state without any new updates. When the stay timeout threshold is exceeded, the state may be moved to unknown. A stay timeout threshold may be 21600 seconds (360 minutes or 6 hours). In many cases, the stay timeout threshold may be approximately the length of time a device may remain off when a user may be sleeping. In some cases, stay timeout thresholds of 12000, 15000, or 18000 seconds may be appropriate, while in other cases, stay timeout thresholds of 24000, 27000, or even 30000 seconds may be appropriate.

A transit timeout threshold may be the maximum duration for a user to remain in the transit state without any new updates. When the transit timeout threshold is exceeded, the state may be moved to unknown. A transit timeout threshold may be 900 seconds (15 minutes), which may be appropriate for urban environments, although transit timeout thresholds of 450 or even 300 seconds may be appropriate in areas with very dense cell coverage. For more rural areas, a transit timeout threshold of 1200, 1500, or 1800 seconds may be more appropriate.

An unknown timeout threshold may be the maximum duration for a user to remain in unknown state without any new updates. When the threshold is exceeded, the device may be removed from further analysis. An unknown timeout threshold of 86400 seconds (1440 minutes, 24 hours, or one day) may be appropriate in many circumstances.

The specific thresholds may vary from one mode of transport to another. For example, a public mode of transport, such as a bus or train, may have periods where a user may change busses or trains. During such periods, the user may appear to be either in a pause or stay status, but the user may actually be waiting for the next bus or train. In such a case, the stay time period may be longer, such as 20 or 30 minutes, to capture a meaningful stay. Such a stay may not capture the entire length of the user's commute, and therefore may contribute to inaccurate data.

Conversely, a person who may be traveling by car may not experience long periods where they are stationary, and therefore a stay time period may be reduced, such as 5 or 10 minutes, to capture a stop at a gas station or some other intermediate stop during transit.

FIG. 33 is a flowchart illustration of an embodiment 3300 showing a method for determining a status on a real time basis. The method of embodiment 3300 may be merely one example of how status may be updated in real time or near-real time.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 3300 may be a process that may be performed each time a group of location observations may be received. In many systems, location observations from a recent time period may be received in bulk, such as observations for the last minute or last 5 minutes. These location observations may be used to update a device's status, which may include unknown, transit, stay, pause, and remove.

In the example of embodiment 3300, a new device that has no previous stored state is started out as a unknown state. In other embodiments, a new device may be started out in a transit state or some other state. The appropriate selection may be a design choice.

Location observations may be received in block 3302, and observations for each device may be processed in block 3304.

If the device is a new device in block 3306, the device may be added to the active device list in block 3308 and the initial status may be set to unknown in block 3310. The process may return to block 3304.

If the device is on the list in block 3306, the previous status may be retrieved in block 3312. The elapsed time and distance traveled from the last observation may be determined in block 3314.

If the previous status in block 3316 was stay, a determination may be made in block 3318 if the elapsed time exceeds the stay timeout threshold. Similarly, if the previous status in block 3316 was transit, a determination may be made in block 3320 if the elapsed time exceeds the transit timeout threshold. If the timeout thresholds in blocks 3318 or 3320 are exceeded, then a determination may be made in block 3322 if the elapsed time exceeds the unknown timeout threshold. If so, the device may be removed in block 3324, and the process may return to block 3304. If not, the device status may be set to unknown in block 3326.

If the time does not exceed the stay timeout threshold in block 3318, the distance may be re-calculated from the center of the locations defining the stay cluster in block 3328, and the process may continue in block 3332. If the time does not exceed the transit timeout threshold in block 3320, the thresholds for the mode of transit may be retrieved in block 3330, and the process may continue in block 3332.

If the distance is greater than the stay radius in block 3332, the device status may be set to transit in block 3334. The mode of transport may be determined in block 3336, and the process may return to block 3304.

If the distance is less than the stay radius in block 3332, and the elapsed time is less than the stay time period in block 3338, the device status may be set to pause in block 3340, and the process may return to block 3304.

If the distance is less than the stay time period in block 3338, the device status may be set to stay in block 3342, and the process may return to block 3304.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
 a hardware platform comprising at least one computer processor;
 an analysis system executing on said hardware platform configured to:
  receive raw location observations, said raw observations comprising a device identifier, a timestamp and a location definition;
  process said raw location observations into a plurality of mobility genes, said mobility genes comprising visits, each of said visits being identified by:
   determining a distance traveled from a previous observation;
   determining whether said previous observation was classified as a stay;
   when said previous observation is classified as a stay, applying a first predefined radius and time period as a classification threshold;
   when said previous observation is not classified as a stay, applying a second predefined radius and time period as said classification threshold; and
   applying said classification threshold to identify each of said visits;
  store said mobility genes;
  receive a request for at least one of said mobility genes; and
  transmit said at least one of said mobility genes in response to said request.

2. The system of claim 1, said raw location observations comprising telecom location observations.

3. The system of claim 2, said telecom location observations comprising access point connection locations.

4. The system of claim 2, said telecom location observations comprising locations determined by mobile devices.

5. The system of claim 1, said analysis system further configured to:
 identify a first location;
 identify a subset of said raw location observations comprising said first location;
 generate a set of location statistics for said first location; and
 store said set of location statistics as one of said mobility genes.

6. The system of claim 5:
 said first location being a location type; and
 said subset of raw location observations being for locations comprising said location type, said subset of raw location observations being for a plurality of physical locations.

7. The system of claim 5, said location statistics comprising a length of stay.

8. The system of claim 5:
 said request comprising inbound trajectories; and
 said mobility genes comprising inbound trajectories.

9. The system of claim 8, said mobility genes further comprising at least one statistic representing said inbound trajectories.

10. The system of claim 5:
 said request comprising outbound trajectories; and
 said mobility genes comprising outbound trajectories.

11. The system of claim 10, said outbound trajectories being anonymized trajectories.

12. The system of claim 11, said anonymized trajectories being truncated trajectories.

13. The system of claim 10, said outbound trajectories comprising a transport mode.

14. A method performed on at least one computer processor, said method comprising:
 receiving raw location observations, said raw observations comprising a device identifier, a timestamp and a location definition;
 processing said raw location observations into a plurality of mobility genes, said mobility genes comprising visits, each of said visits being identified by:
  determining a distance traveled from a previous observation;
  determining whether said previous observation was classified as a stay;
  when said previous observation is classified as a stay, applying a first predefined radius and time period as a classification threshold;
  when said previous observation is not classified as a stay, applying a second predefined radius and time period as said classification threshold; and
  applying said classification threshold to identify each of said visits;
 storing said mobility genes;
 receiving a request for at least one of said mobility genes; and
 transmitting said at least one of said mobility genes in response to said request.

15. The method of claim 14 further comprising:
 identifying a first location;
 identifying a subset of said raw location observations comprising said first location;
 generating a set of location statistics for said first location; and
 storing said set of location statistics as one of said mobility genes.

16. The method of claim 15:
 said first location being a location type; and
 said subset of raw location observations being for locations comprising said location type, said subset of raw location observations being for a plurality of physical locations.

17. The method of claim 15:
 said request comprising inbound trajectories; and
 said mobility genes comprising inbound trajectories.

18. The method of claim 17, said mobility genes further comprising at least one statistic representing said inbound trajectories.

19. The method of claim 15:
 said request comprising outbound trajectories; and
 said mobility genes comprising outbound trajectories.

20. The method of claim 19, said outbound trajectories being anonymized trajectories.

* * * * *